United States Patent
Seo et al.

(10) Patent No.: US 7,782,373 B2
(45) Date of Patent: Aug. 24, 2010

(54) APPARATUS AND METHOD FOR DISPLAYING PICTURES IN A MOBILE TERMINAL

(75) Inventors: Jeong-Wook Seo, Daegu (KR); Chae-Whan Lim, Daegu (KR)

(73) Assignee: Samsung Electronics Co., Ltd., Suwon (KR)

( * ) Notice: Subject to any disclaimer, the term of this patent is extended or adjusted under 35 U.S.C. 154(b) by 1694 days.

(21) Appl. No.: 10/718,815

(22) Filed: Nov. 24, 2003

(65) Prior Publication Data

US 2004/0150723 A1 Aug. 5, 2004

(30) Foreign Application Priority Data

Nov. 25, 2002 (KR) ............... 10-2002-0073403
Dec. 28, 2002 (KR) ............... 10-2002-0086057

(51) Int. Cl.
*H04N 5/225* (2006.01)
(52) U.S. Cl. ............... 348/239; 348/231.99; 348/222.1
(58) Field of Classification Search ............. 348/220.1, 348/231.99, 231.3, 231.4, 231.5, 221.1, 239
See application file for complete search history.

(56) References Cited

U.S. PATENT DOCUMENTS

| | | | | |
|---|---|---|---|---|
| 4,982,291 | A | | 1/1991 | Kurahashi et al. ............ 358/355 |
| 5,550,593 | A | * | 8/1996 | Nakabayashi ............... 348/465 |
| 5,594,736 | A | * | 1/1997 | Tatsumi et al. .............. 370/474 |
| 5,640,202 | A | | 6/1997 | Kondo et al. |
| 5,719,987 | A | | 2/1998 | Kawamura et al. .......... 386/120 |
| 5,903,309 | A | * | 5/1999 | Anderson ............... 348/333.02 |
| 5,987,214 | A | * | 11/1999 | Iwamura ..................... 386/95 |
| 5,991,313 | A | | 11/1999 | Tanaka et al. ............... 370/537 |
| 6,728,471 | B1 | * | 4/2004 | Kaku ......................... 386/68 |
| 2002/0003577 | A1 | * | 1/2002 | Kitsugi et al. ............... 348/232 |
| 2002/0021843 | A1 | | 2/2002 | Fukuhara et al. |
| 2002/0062313 | A1 | * | 5/2002 | Lee et al. ....................... 707/3 |

(Continued)

FOREIGN PATENT DOCUMENTS

EP 0 601 766 6/1994

(Continued)

OTHER PUBLICATIONS

Takahiro Fukuhara et al.; Motion-JPEG2000 Standardization and Target Market; Home Network Company, Development Center; pp. 57-60.

*Primary Examiner*—Tuan Ho
(74) *Attorney, Agent, or Firm*—Roylance, Abrams, Berdo & Goodman, L.L.P.

(57) ABSTRACT

A method for generating a combined signal in a mobile terminal equipped with a camera that captures image signals. A captured image signal is coded into a still picture signal based upon a frame size. A received audio signal is coded. An image header containing image pattern information and frame size information is inserted into the still picture signal based upon the frame size. The still picture signal based upon the frame size into which the image header is inserted is combined with the coded audio signal. While the above-described operations are repeated, consecutive still picture signals based upon the frame size are combined with corresponding audio signals. When a recording operation is completed, a combined signal representative of a result of the combining is stored in a moving picture file.

5 Claims, 44 Drawing Sheets

U.S. PATENT DOCUMENTS

| | | | |
|---|---|---|---|
| 2002/0120681 A1 * | 8/2002 | Cho et al. | 709/203 |
| 2002/0140826 A1 | 10/2002 | Sato et al. | 248/222.1 |
| 2002/0146133 A1 | 10/2002 | Lee et al. | |

FOREIGN PATENT DOCUMENTS

| | | |
|---|---|---|
| EP | 0 661 881 | 1/1998 |
| EP | 0 751 684 | 1/1999 |
| GB | 2 259 219 | 3/1993 |
| JP | 06233226 | 8/1994 |
| JP | 6-276435 | 9/1994 |
| JP | 07050798 | 2/1995 |
| JP | 7-79411 | 3/1995 |
| JP | 07099624 | 4/1995 |
| JP | 07050798 | 12/1995 |
| JP | 8-181961 | 7/1996 |
| JP | 9008763 | 1/1997 |
| JP | 09331501 | 12/1997 |
| JP | 10164492 | 6/1998 |
| JP | 2000115704 | 4/2000 |
| JP | 2001119653 | 4/2001 |
| JP | 2001-174900 | 6/2001 |
| JP | 2001189909 | 7/2001 |
| JP | 2001251537 | 9/2001 |
| JP | 2001285841 | 10/2001 |
| JP | 2002033771 | 1/2002 |
| JP | 2002012335 | 2/2002 |
| JP | 2002057936 | 2/2002 |
| JP | 2002057977 | 2/2002 |
| JP | 2002203231 | 7/2002 |
| JP | 2002223403 | 8/2002 |
| KR | 2002-012335 | 2/2002 |

* cited by examiner

APPARATUS AND METHOD FOR DISPLAYING PICTURES IN A MOBILE TERMINAL

PRIORITY

This application claims priority to an application entitled "APPARATUS AND METHOD FOR DISPLAYING PICTURES IN MOBILE TERMINAL", filed in the Korean Intellectual Property Office on Nov. 25, 2002 and assigned Serial No. 2002-73403 and an application entitled "APPARATUS AND METHOD FOR DISPLAYING PICTURES IN MOBILE TERMINAL", filed in the Korean Intellectual Property Office on Dec. 28, 2002 and assigned Serial No. 2002-86057, the contents of which are incorporated herein by reference.

BACKGROUND OF THE INVENTION

1. Field of the Invention

The present invention relates to an apparatus and method for displaying pictures in a mobile terminal, and more particularly to an apparatus and method for displaying still pictures in the form of moving pictures.

2. Description of the Related Art

Mobile terminals have are now capable of transmitting high-speed data. In particular, mobile communication networks based upon an (IMT-2000) International Mobile Telecommunication-2000 (IMT-2000) standard can implement high-speed data communications as well as voice communications using mobile phones. The mobile terminals can process packet data and image or picture data.

A conventional image-processing device includes a camera for capturing an image and a display unit for displaying the image captured by the camera. The camera can use a charge coupled device (CCD) image sensor or a complementary metal oxide semiconductor (CMOS) image sensor. As small-sized camera devices have been developed, image capture devices have become miniaturized. The trend is to equip mobile terminals with camera devices. A mobile terminal can capture images, and display moving and still pictures. The mobile terminal can also transmit the captured images to a base station.

As the need for moving picture mail from communication carriers and consumers has increased, services for providing the moving picture mail are being implemented. It is expected that the moving picture mail services will increase. When moving pictures are transmitted, an image compression problem due to the large amount of data can occur. Furthermore, when the moving pictures are transmitted by the mobile terminal, the image compression problem is worse.

Conventional moving-picture signal compression is based upon Moving Picture Expert Group 4 (MPEG 4). When moving picture signals are compressed, an MPEG 4-based compression technique can appropriately compress a large amount of data but must handle a large number of million instructions per second (MIPS). It is difficult for the MPEG 4-based compression technique to be applied to ARM 7-based mobile terminals. For example, video on demand (VOD) service requires approximately 10 MIPS to perform an MPEG 4-based decoding operation. Approximately 200 MIPS are required to decode video mail using MPEG 4. For this reason, various coprocessors such as the Emblaze's chip, the Megapass's chip, the Alphamosaic's chip must be provided, such that there are problems in that the cost of hardware is increased and the size of hardware is increased.

Where the above-described image compression method is used, an image can be processed only by software. However, a solution having a high image update rate cannot be provided. A mobile terminal equipped with an internal camera or an external camera has a liquid crystal display (LCD) and a codec for compressing image data of still pictures. The codec for compressing the image data of still pictures can be a Joint Photographic Expert Group (JPEG) codec. Camera phones equipped with the above-described components are becoming generalized in a state in which broadband services such as IMT-2000 services are provided. Thus, moving picture signals received through the JPEG codec are consecutively compressed and stored as moving picture data, and, if necessary, the moving picture data can be transmitted in the form of moving picture mail.

SUMMARY OF THE INVENTION

Therefore, it is an object of the present invention to provide an apparatus and method for generating and displaying still picture signals that are captured by a camera provided in a mobile terminal, in the form of moving picture signals.

It is another object of the present invention to provide an apparatus and method for combining audio signals with moving picture signals captured by a camera provided in a mobile terminal and generating a combined signal based upon the audio and moving picture signals.

It is another object of the present invention to provide an apparatus and method for combining a text signal with moving picture signals captured by a camera provided in a mobile terminal and generating a combined signal based upon the text and moving picture signals.

It is another object of the present invention to provide an apparatus and method for combining audio signals and a text signal with moving picture signals captured by a camera provided in a mobile terminal and generating a combined signal based upon the audio, text and moving picture signals.

It is another object of the present invention to provide an apparatus and method for enabling a mobile phone, equipped with a camera and an image codec, to access a combined signal in which moving picture and audio signals are combined, to separate the combined signal into the moving picture and audio signals, and to reproduce the separated moving picture and audio signals.

It is another object of the present invention to provide an apparatus and method for enabling a mobile phone, equipped with a camera and an image codec, to access a combined signal in which moving picture and text signals are combined, to separate the combined signal into the moving picture and text signals, and to reproduce the separated moving picture and text signals.

It is another object of the present invention to provide an apparatus and method for enabling a mobile phone, equipped with a camera and an image codec, to access a combined signal in which moving picture, text and audio signals are combined, to separate the combined signal into the moving picture, text and audio signals, and to reproduce the separated moving picture, text and audio signals.

It is another object of the present invention to provide an apparatus and method for enabling a mobile phone, equipped with a camera and an image codec, to transmit a combined signal through a communication channel.

It is yet another object of the present invention to provide an apparatus and method for enabling a mobile phone, equipped with a camera and an image codec, to receive a combined signal from a base station and to store and reproduce the received combined signal.

In accordance with one aspect of the present invention, the above and other objects can be substantially accomplished by a method for generating a combined signal in a mobile terminal equipped with a camera that captures image signals. The method comprises the steps of: (a) coding a captured image signal into a still picture signal based upon a frame size; (b) coding a received audio signal; (c) inserting an image header containing image pattern information and frame size information into the still picture signal based upon the frame size; (d) combining the still picture signal based upon the frame size into which the image header is inserted, with the coded audio signal; (e) combining consecutive still picture signals based upon the frame size with corresponding audio signals while the steps (a) to (d) are repeated; and (f) when a recording operation is completed, storing a combined signal representative of a result of the combining in a moving picture file.

In accordance with another aspect of the present invention, there is provided an apparatus for generating a combined signal in a mobile terminal, the apparatus comprising: a camera module for capturing image signals; an image processor equipped with an image codec that codes the captured image signals based upon a frame size, the image processor processing moving picture signals generated from the camera module according to a display screen based upon the frame size; a display unit for displaying the image signals processed by the image processor; a data processor equipped with an audio codec that codes received audio signals, the data processor processing data; a buffer unit comprising an image buffer for buffering the image signals based upon the frame size coded by the image codec and audio buffers for buffering the audio signals coded by the audio codec; a header generator for inserting an image header containing image pattern information and frame size information into each coded image signal when the image signals based upon the frame size are output from the image buffer and outputting each coded image signal into which the image header is inserted; a combiner for combining an output of the header generator and an output of the audio buffer and outputting a result of the combining; and a memory for storing an output of the combiner as a combined signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
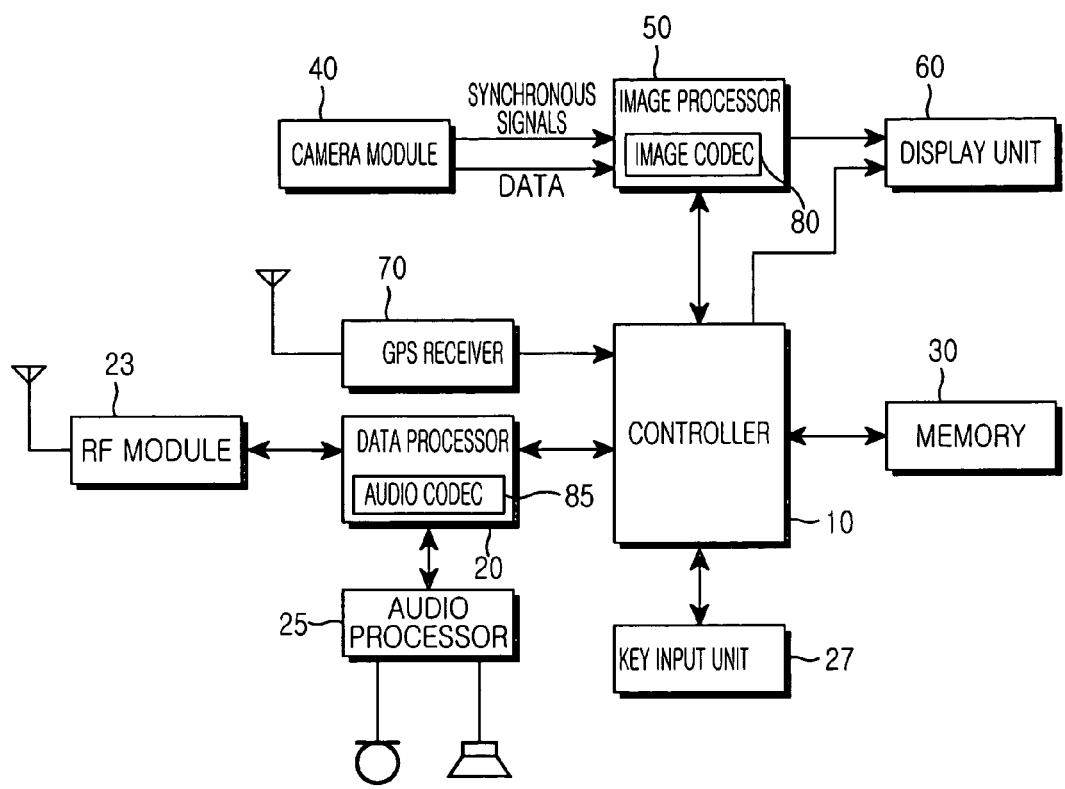
FIG. 1 is a block diagram illustrating the configuration of a mobile terminal for performing the operation of the present invention.

Several embodiments of the present invention will be described in detail with reference to the accompanying drawings. In the drawings, the same or similar elements are denoted by the same reference numerals In the following description, specified details relating to an image compression technique, a transmission rate of moving picture signals, a format of image data, a size of image signals are described as an example. It will be obvious to those skilled in the art that the present invention can be implemented using various modifications without the specified details.

It is assumed that a Joint Photographic Expert Group (JPEG) coding technique is employed as an image signal coding technique in accordance with an embodiment of the present invention. Alternatively, another image coding technique can be employed in the embodiment of the present invention. In accordance with the embodiment of the present invention, received moving picture signals are coded at predetermined time intervals by means of the JPEG coding technique as a still-picture signal coding technique so that coded image data can be generated. Then, a combined signal in which audio or text data is combined with the coded image data can be generated. Furthermore, a combined signal in which audio data and text data are combined with the coded image data can be generated.

In accordance with the embodiment of the present invention, the combined signal can be generated as described above, the combined signal can be disassembled and reproduced, and the combined signal can be transmitted/received through a communication module.

The term "still-picture signals" refers to image signals capable of being generated in the form of moving picture signals. In this case, an image codec consecutively codes still pictures in units of set times and the consecutively coded still pictures are generated in the form of moving picture signals. That is, the image codec codes the still picture signals in units of frames during each set time. Here, the preset time indicates a time period during which the image codec codes image signals of one frame. The image codec can be a JPEG codec. Furthermore, the term "combined signal" refers to a signal in which audio signals or a text signal is combined with moving picture signals or a signal in which audio and text signals are combined with moving picture signals in accordance with an embodiment of the present invention.

The term "combining mode" refers to an operating mode for combining image signals captured by the camera with audio signals or a text signal or with audio and text signals. In this case, the image codec consecutively codes still pictures in units of set times to output coded image signals and the image signals consecutively coded by the image codec are combined with the audio signals or the text signal or with the audio and text signals. The term "playback mode" refers to an operating mode for accessing and displaying combined data in which coded image signals are combined with the audio signals or the text signal or with the audio and text signals. The term "transmission mode" refers to an operating mode for consecutively transmitting combined signals after performing the combining mode or for selectively transmitting the combined signals stored in a memory. The term "reception mode" refers to an operating mode for receiving and storing a combined signal from a base station. The playback mode can be performed while the reception mode is performed.

It is assumed that a mobile terminal for processing moving picture signals is a mobile phone in accordance with the embodiment of the present invention. The mobile terminal in accordance with the embodiment of the present invention can be applied to a mobile communication device for displaying pictures using the camera other than the mobile phone.

FIG. 1 is a block diagram illustrating the configuration of a mobile terminal or mobile phone in accordance with an embodiment of the present invention.

Referring to FIG. 1, a radio frequency (RF) module 23 performs a radio communication function for the mobile phone. The RF module 23 includes an RF transmitter (not shown) for up-converting and amplifying a frequency of a signal to be transmitted, an RF receiver (not shown) for performing a low noise amplification for a received signal and down-converting a frequency of the amplified received signal, etc. A data processor 20 includes a transmitter (not shown) for coding and modulating the transmission signal, a receiver (not shown) for demodulating and decoding the received signal, etc. That is, the data processor 20 can be a modem and a codec. Here, the codec provided in the data processor 20 includes a data codec (not shown) for processing packet data, etc. and an audio codec 85 for processing audio signals such as speech, etc. In accordance with an embodiment of the present invention, it is assumed that the audio codec 85 is a speech codec embedded in the mobile phone. Where the audio codec 85 is based upon a rate of 8 Kbps, a coded audio signal of one frame (20 bytes) is generated every 20 msec. An audio processor 25 reproduces an audio signal output from the audio codec 85 provided in the data processor 20 or performs a function for transferring an audio signal from the microphone to the audio codec 85 provided in the data processor 20.

A key input unit 27 includes keys for inputting numeric and character information and function keys for setting various functions. In accordance with an embodiment of the present invention, the key input unit 27 can include function keys for controlling a moving picture mode and a capture key for driving the camera. In an embodiment of the present invention, a text signal can be input through the key input unit 27 so that the text signal is combined with image or moving picture signals.

A memory 30 can be a program memory, a data memory and a moving picture memory for storing combined signals generated and received in accordance with an embodiment of the present invention. The program memory can store programs for controlling an overall operation of the mobile phone, and programs for controlling a path of an image signal applied to a display unit in accordance with an embodiment of the present invention. Further, the data memory temporarily stores data generated while the programs are executed. Furthermore, the data memory includes a text buffer for storing a text signal input through the key input unit 27; an image buffer for storing moving picture signals; and an audio buffer for storing audio signals generated from the audio codec 85. In accordance with an embodiment of the present invention, the moving picture memory stores combined data in which coded image data is combined with the text signal (or audio signals).

A controller 10 controls the overall operation of the mobile phone. In an embodiment of the present invention, the controller 10 can be provided in the data processor 20. In addition, the controller 10 controls operations for generating, storing, reproducing, transmitting and receiving the combined signals according to an operating mode command set by the key input unit 27. The controller 10 outputs user data to a display unit 60 so that the display unit 60 can display the user data. The user data to be displayed by the mobile phone includes the first user data indicating a current time, reception sensitivity and a remaining amount of battery power and the second user data set by a user. The second user data can be a text signal of the combined signal selected or input by the user in accordance with an embodiment of the present invention. In the embodiment of the present invention, it is assumed that the second user data is a text signal of the combined signal.

A camera module 40 includes a camera sensor for converting an optical signal having an image signal into an electric signal, and a signal processor for converting an analog image signal captured by the camera sensor into digital data. It is assumed that the camera sensor is a charge coupled device (CCD) image sensor. The signal processor can be implemented by a digital signal processor (DSP). The camera sensor and the signal processor can be combined or separate.

An image processor 50 generates screen data so that image signals output from the camera module 40 can be displayed. The image processor 50 processes the image signals output from the camera module 40 in units of frames. Frame image data is output on the basis of the characteristics and size of the display unit 60. Furthermore, the image processor 50 includes an image codec 80. The image codec 80 codes the image signals in a set coding manner or decodes coded frame image data into original frame image data. The image processor 50 generates and reproduces moving picture signals in response to an operating mode set under the control of the controller 10.

The display unit 60 displays frame image signals output from the image processor 50 on a screen, and displays user data output from the controller 10. The display unit 60 displays moving picture signals reproduced under the control of the controller 10. The display unit 60 can employ a liquid crystal display (LCD). In this case, the display unit 60 includes an LCD controller, a memory capable of storing image data and LCD elements. When the LCD is implemented with a touch screen, the touch screen serves as an input unit.

A global positioning system (GPS) receiver 70 receives GPS information from a GPS satellite and transmits the received GPS information to the controller 10. The GPS information can be information indicating a current position of the mobile phone. In an embodiment of the present invention, position (or place) and time information associated with currently acquired moving pictures can be received through the GPS receiver 70.

The operation of the mobile terminal or mobile phone will now be described with reference to FIG. 1. If the user performs a dialing operation through the key input unit 27 at the time of transmitting an outgoing call signal, the controller 10 detects a call-signal transmission mode, processes dialing information received from the data processor 20, converts the dialing information into an RF signal through the RF module 23 and outputs the RF signal. Then, if a called party generates a response signal, the controller 10 detects the response signal from the called party through the RF module 23 and the data processor 20. Then, the controller 10 establishes a communication path based upon the RF module 23, the data processor 20 and the audio processor 25 to perform a communication function. At the time of receiving an incoming call signal, the controller 10 detects a call-signal reception mode through the data processor 20, controls the audio processor 25 and generates a ring signal. Then, if the user responds to the ring signal, the controller 10 detects the response to the ring signal. Similarly, the controller 10 establishes a communication path based upon the audio processor 25, the data processor 20 and the RF module 23 and performs a communication function. Voice communication in the call-signal transmission and reception modes have been described as an example. However, a data communication function for communicating packet data and image data other than the voice communication can be performed. Furthermore, when a standby mode or text communication is performed, the controller 10 enables the display unit 60 to display character or text data processed by the data processor 20.

When the mobile phone uses code division multiple access (CDMA) channels, the data processor 20 includes channel transmitting/receiving devices based upon CDMA. The data processor 20 includes the audio codec 85 for coding and decoding audio signals to be combined with moving picture signals in accordance with an embodiment of the present invention.

In accordance with an embodiment of the present invention, the mobile phone can capture an image of a person or peripheral environment, and display or transmit the image. First, the camera module 40 is mounted in the mobile phone or connected to the mobile phone at its predetermined external position. That is, the camera module 40 can be an internal or external camera. The camera module 40 can include a sensor for capturing image signals, a signal processor for converting the image signals captured by the sensor into digital data, and others. The sensor can use a charge coupled device (CCD) image sensor or a complementary metal oxide semiconductor (CMOS) image sensor. After an image signal captured by the camera module 40 is converted into an electric signal, the signal processor converts an analog image signal into digital image data and then outputs the digital image data and synchronous signals to the image processor 50. Here, the synchronous signals can be a horizontal synchronization signal Hsync and a vertical synchronization signal Vsync.

Figure 2:
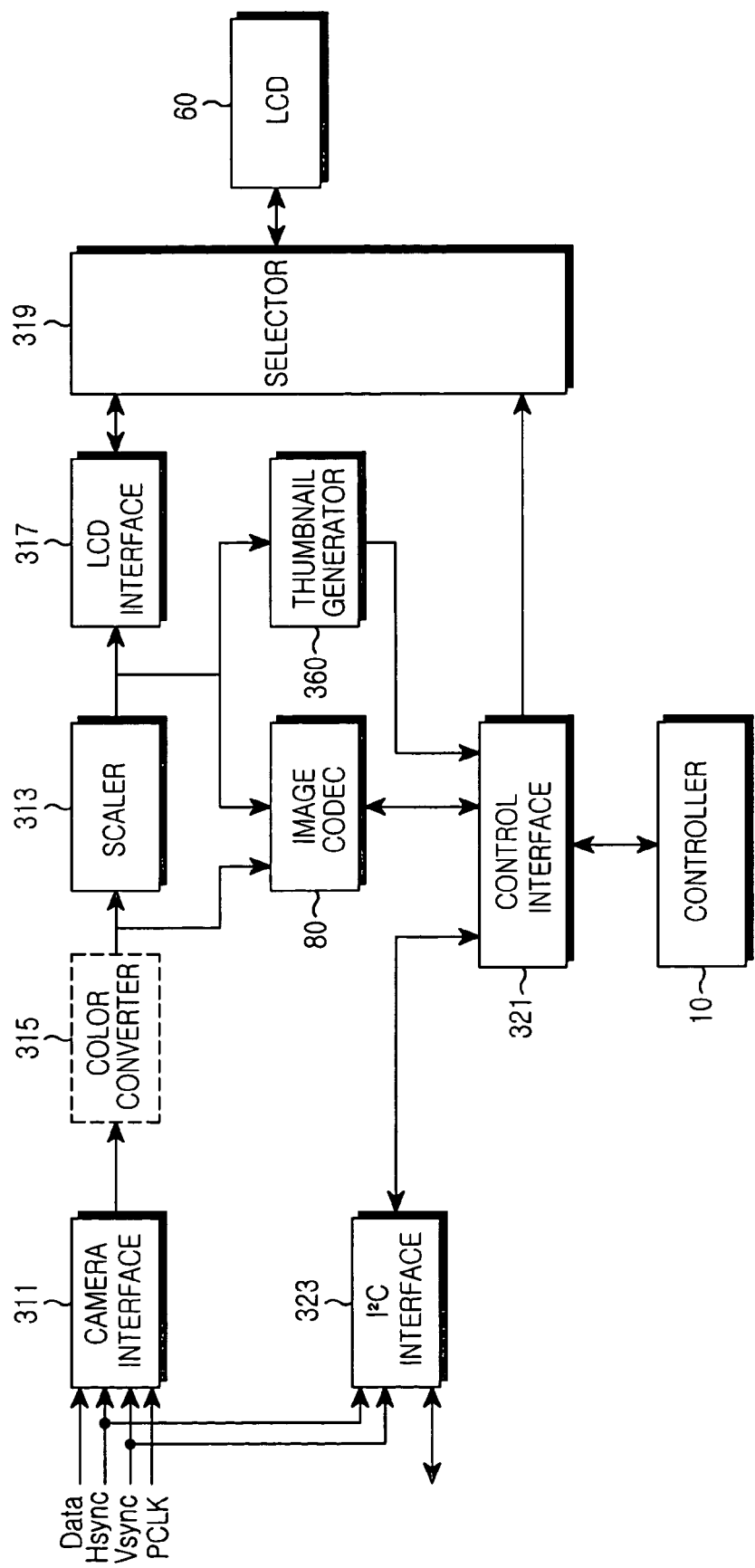
FIG. 2 is a block diagram illustrating the detailed configuration of an image processor shown in FIG. 1.

FIG. 2 is a block diagram illustrating a configuration of the signal processor 50 shown in FIG. 1. The image processor 50 performs an interface function between the camera module 40 and the display unit 60 and simultaneously performs a function for coding image signals input from the camera module 40 and a decoding function. Furthermore, the image processor 50 performs decimation and cropping operations for pixels and lines of image data contained in a coded main picture to generate a thumbnail picture. As described above, the image processor 50 includes the image codec 80 for coding and decoding image signals. In an embodiment of the present invention, it is assumed that the image codec 80 is a Joint Photographic Expert Group (JPEG) codec.

Referring to FIG. 2, a camera interface 311 performs an interface function for image data output from the camera module 40. It is assumed that the image data output from the camera module 40 is based on a YUV format, and the display unit 60 displays image data of an RGB format. In an embodiment of the present invention, it is assumed that the image data output from the camera module 40 is based on a YUV 211 (16 bits) format and fixed to a common intermediate format (CIF) size of 352×288 pixels. Moreover, it is assumed that the display unit 60 based upon the RGB format has a size of 128×112 pixels.

In response to a control signal output from the controller 10, a scaler 313 scales data of the image signals captured by the camera module 40 such that the image data can be displayed on the display unit 60. That is, as described above, the number of pixels of the image signals captured by the camera module 40 is the CIF size of 352×288 pixels, and the number of pixels of image data capable of being displayed is 128×1112 pixels or 128×96 pixels. Thus, the scaler 313 reduces and crops the pixels of the image signals output from the camera module 40 to the number of the pixels of the image data capable of being displayed on the display unit 60. However, if the display unit 60 can display image data having a size larger than the number of the pixels of the image signals output from the camera module 40, the scaler 313 can be designed such that the pixels of the image signals output from the camera module 40 can be enlarged and displayed under the control of the controller 10. A method for displaying the enlarged image pixels selects the number of pixels capable of being displayed from the image data output from the camera module 40, and displays the selected pixels.

A color converter 315 converts YUV data received from the scaler 313 into RGB data, and then outputs the RGB data. When the camera module 40 generates the image data in the RGB format or the display unit 60 can display image data of the YUV format, the configuration of the color converter 315 can be omitted.

A liquid crystal display (LCD) interface 317 performs an interface function for image data to be output to the display unit 60. The LCD interface 317 includes an internal buffer, and buffers the image data interfaced with the display unit 60.

Under the control of the controller 10, the image codec 80 can code the captured image data or decode the coded image data. In an embodiment of the present invention, it is assumed that the image codec 325 is the JPEG codec. Under the control of the controller 10, the image codec 80 receives camera image signals from the color converter 315 or image signals to be displayed on the display unit 60, and performs a JPEG coding operation for the received image signals. Furthermore, the image codec 80 decodes JPEG coded image signals and outputs the decoded image signals to the scaler 313 or the LCD interface 317. The image codec 80 can code or decode camera images or displayed images.

A control interface 321 performs an interface function between the image processor 50 and the controller 10, and performs an interface function between the display unit 60 and the controller 10.

A selector 319 selects data output from the image processor 50 or data output from the controller 10 in response to a path control signal output from the controller 10, and outputs the selected data to the display unit 60. The path control signal includes the first path control signal indicating a signal for activating a bus between the image processor 50 and the display unit 60; and the second path control signal indicating a signal for activating a path between the controller 10 and the display unit 60. Furthermore, the controller 10 can communicate with the display unit 60 through the selector 319, bidirectionally.

The operation for transferring image data acquired by the camera to the display unit 60 will now be described with reference to FIG. 2. The image processor 50 controls a transmission rate of moving picture data captured by the camera module 40, and stores input image data in a memory of the display unit 60 through the LCD interface 317. The number of pixels of the image signals corresponding to one frame output from the camera module 40 is a CIF size of 352×288 pixels, and pixels of the image data from the camera are reduced and partially cropped on the basis of the number of pixels (128× 112 pixels or 128×96 pixels) of image data corresponding to one frame capable of being displayed. Thus, the scaler 313 of the image processor 50 partially crops the pixels of the image signals output from the camera module 40 or selects a partial area of the pixels such that the display unit 60 can appropriately display the pixels of the image signals from the camera module 40 on a zoom screen. The transmission rate of the image data is fixedly designated on the basis of a master clock. The flow of image signals or data between the camera module 40, the image processor 50 and the display unit 60 is affected by an access rate for the display unit 60. Thus, the LCD interface 317 includes a buffer for temporarily buffering the image signals or data such that a rate of the image signals to be read from the camera module 40 and a rate of the image data to be written to the display unit 60 can be adjusted.

In a process for displaying image signals captured by the camera module 40 on the display unit 60 in the form of moving pictures, the user allows a displayed picture to be captured as a still picture and allows the captured picture to be stored. That is, the user can store a displayed picture as a photo using a photo capture key. In this case, when a photo capture command is generated, the controller 10 stops the operation of the image processor 50, reproduces a picture displayed on the display unit 60 as a still picture, and drives the image codec 80. Then, the image codec 80 receives an image output from the camera module 40 or image data of one frame displayed on the display unit 60, codes the received image data in the JPEG format, and outputs the coded image data to the control interface 321. The controller 10 stores received coded image data as a photo in a memory 30.

The detailed configuration of the image processor 50 shown in FIG. 2 is disclosed in Korean Patent Application Nos. 2002-22066 and 2002-22844, which are incorporated herein by reference and assigned to Samsung Electronic Co., Ltd.

Figure 3:
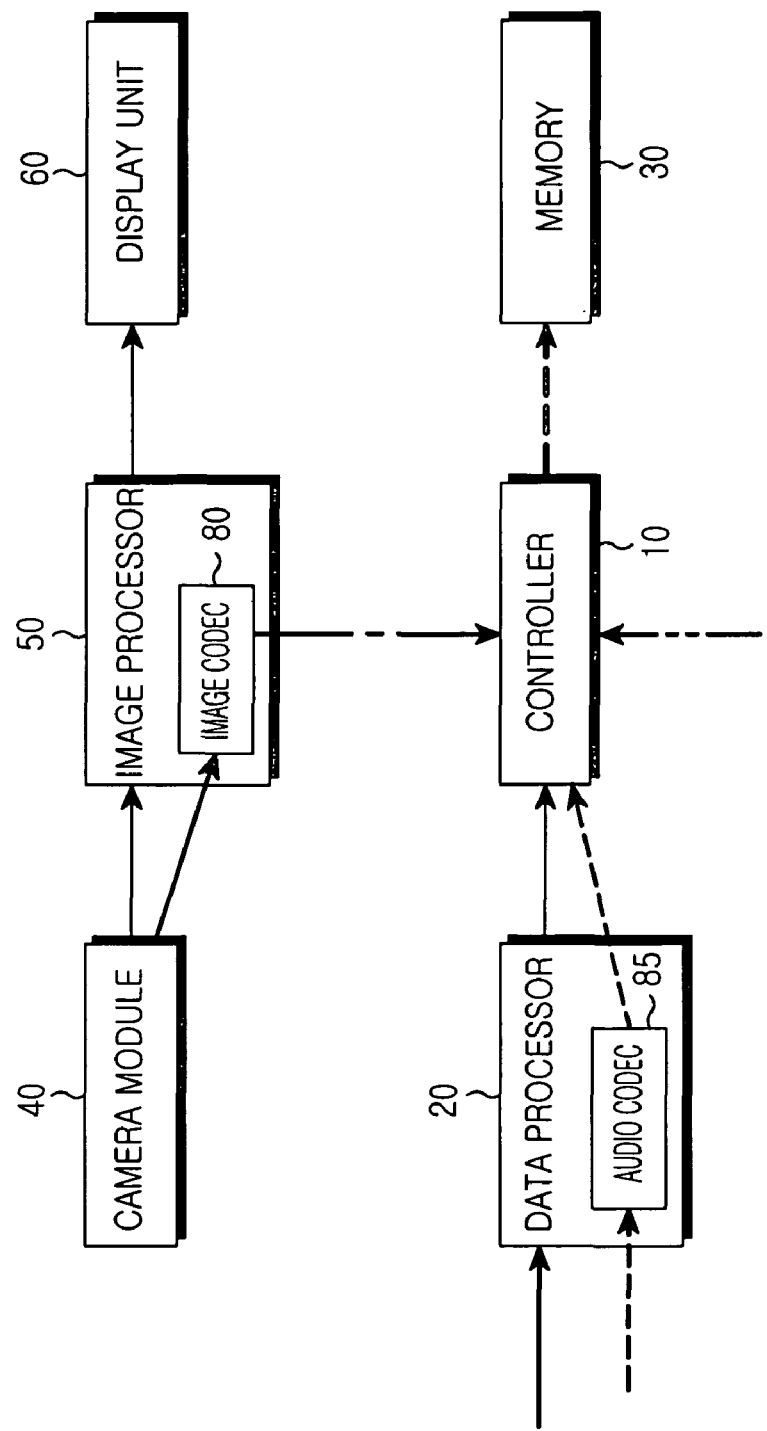
FIG. 3 is a block diagram illustrating a process for generating and storing a combined signal in accordance with an embodiment of the present invention.

FIG. 3 is a block diagram illustrating a process for coding consecutive image signals, captured by the camera module provided in the mobile phone equipped with the camera and the image codec, in the form of still-picture signals, generating a combined signal in which moving picture signals are combined with audio signals or a text signal and storing the generated combined signal in accordance with the first embodiment of the present invention.

Referring to FIG. 3, the image signals captured by the camera module 40 are applied to the image codec 80. The image codec 80 codes the image signals in the form of JPEG image data. The JPEG image data is applied to the controller 10. At this time, the image codec 80 generates the JPEG image data while skipping some frames among the image signals output from the camera module 40 according to coding performance. That is, the image codec 80 performs an operation for coding the consecutive image signals in the form of still picture signals according to its coding capability. Furthermore, the audio codec 85 of the data processor 20 codes audio signals according to moving picture signals, and the coded audio signals are applied to the controller 10. Then, the controller 10 generates a combined signal in which the moving picture signals output from the image codec 80 are combined with the audio signals output from the audio codec 85. Then, the generated combined signal is stored in the memory 30. When the above-described process is repeated, combined signals in which moving picture signals are combined with audio signals are stored in the memory 30.

Furthermore, the controller 10 combines moving picture signals output from the image codec 80 with a text signal output from the data processor 20, and generates a combined signal. The generated combined signal is stored in the memory 30. At this point, the text signal can be directly input by the user through the key input unit 27. Alternatively, a pre-stored text signal can be selected as the text signal to be combined with the moving picture signals. In a method for combining the moving picture signals with the text signal, a text input operation and a moving-picture signal input operation can be independently performed. When the moving-picture signal input operation is completed, the moving picture signals can be combined with the text signal.

Information indicating a name, place, time, etc. associated with the combined signal is stored along with the combined signal. Here, where the mobile phone is equipped with the GPS receiver, place and time information associated with the captured moving picture signals can be automatically registered using place and time information received from the GPS. In this case, the user can additionally input a name of the combined signal and employs the name of the combined signal as menu information in future. Furthermore, when the mobile phone is not equipped with the GPS receiver, the user inputs the name, place and time associated with the captured moving picture signals that can be used as the menu information.

The above-described operation has been described in relation to the mobile phone equipped with the camera and the image codec. The mobile terminal equipped with a software-based JPEG codec without the image codec can implement the above-described operation. A time period required for coding and decoding JPEG images by means of software is longer than that required for coding and decoding image signals by means of a hardware-based image codec embedded in the mobile phone. Thus, when JPEG data is decoded while some frames are skipped in relation to video of received moving picture mail and audio signals all are decoded, a frame update rate is lowered but audio and image messages can be sufficiently transmitted.

Figure 4:
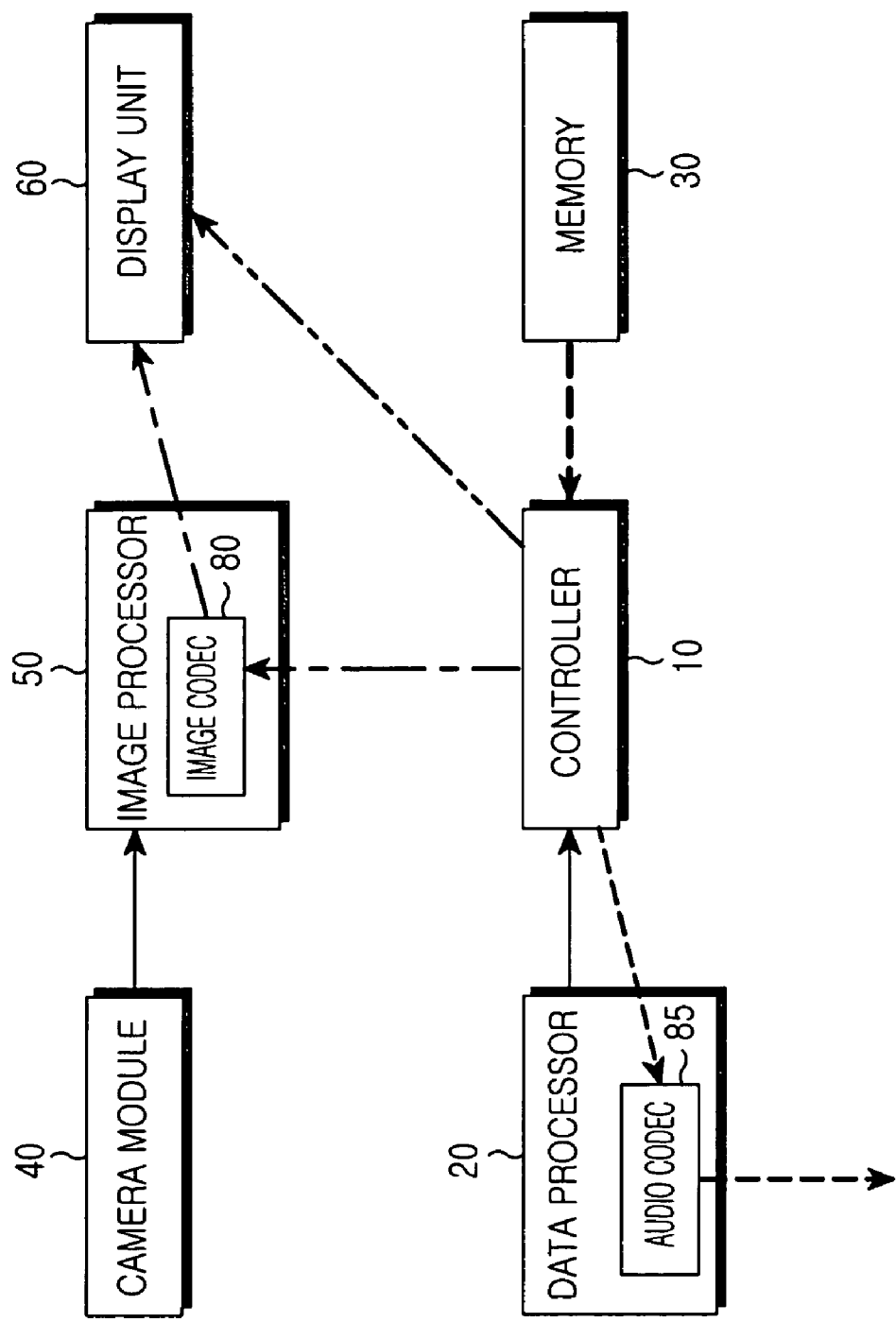
FIG. 4 is a block diagram illustrating a process for reproducing the combined signal in accordance with an embodiment of the present invention.

FIG. 4 is a block diagram illustrating a process for accessing stored combined signal stored by the process associated with FIG. 3, separating the combined signal into moving picture signals, audio signals and/or a text signal, and reproducing the moving picture signals, the audio signals and/or the text signal.

Referring to FIG. 4, the controller 10 accesses a combined signal selected from the memory 30 when a playback operation for the combined signal is requested, performs a header analysis operation, and separates image signals, audio signals and/or a text signal from the combined signal. Then, the controller 10 transmits the audio signals and/or the text signal to the audio codec 85 and/or the display unit 60, and transmits the moving picture signals to the image codec 80. Then, the image codec 80 recovers the original image signals from the JPEG image signals. The image processor 50 processes the recovered image signals on the basis of the size of the display unit 60, and transmits the processed recovered image signals to the display unit 60 so that it can display the image signals. In this case, the text signal output from the controller 10 can be the second user data, and is displayed according to a designated display type while the moving picture signals are displayed. The display type will be described below. After the audio codec 85 recovers original audio signals from the coded audio signals, the audio processor 25 reproduces the audio signals.

Figure 5:
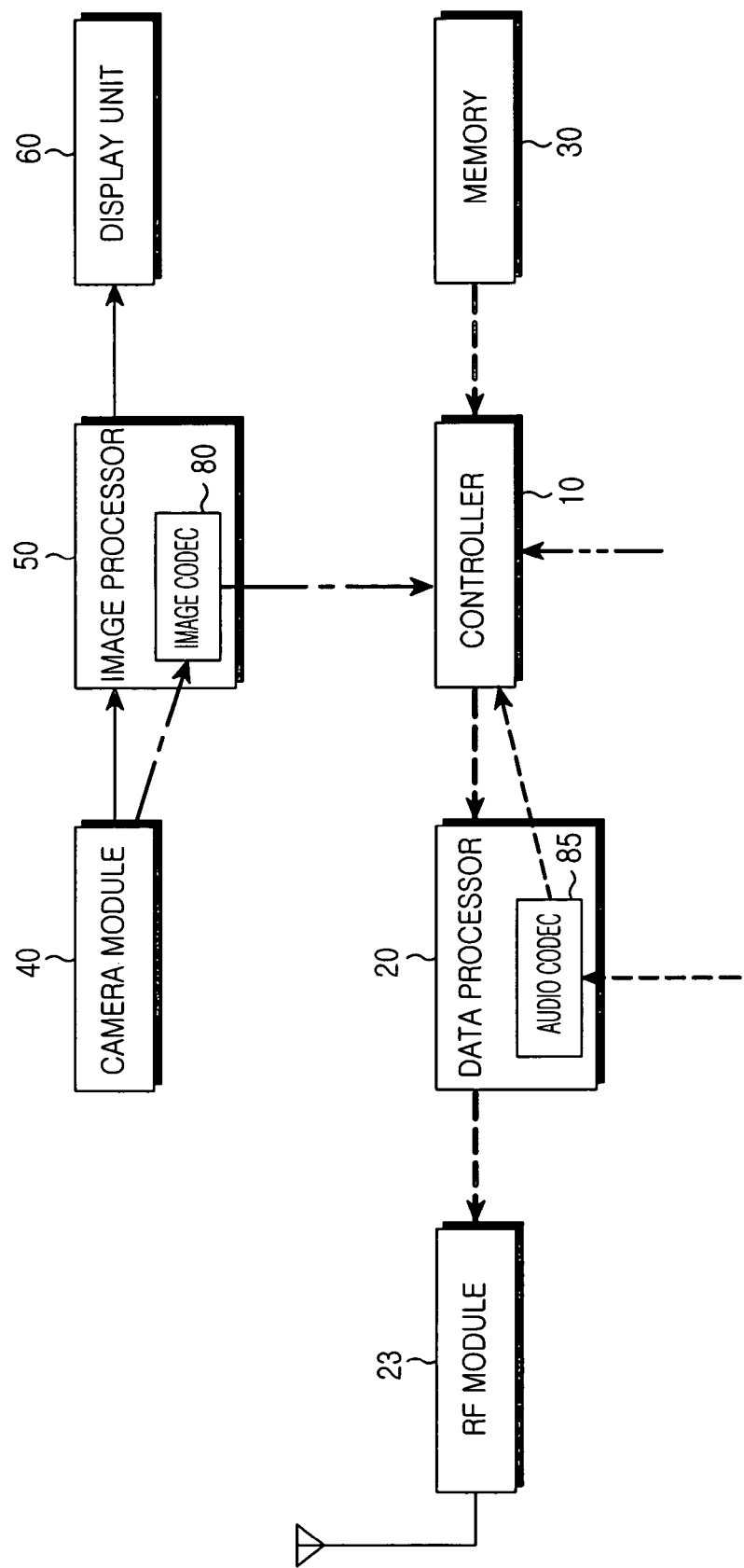
FIG. 5 is a block diagram illustrating a process for transmitting the combined signal in accordance with an embodiment of the present invention.

FIG. 5 is a block diagram illustrating a process for transmitting a combined signal in the mobile phone equipped with the camera and the image codec in accordance with a third embodiment of the present invention. In a method for transmitting the combined signal, the combined signal stored in the memory 30 is accessed and transmitted. Alternatively, the combined signal can be transmitted in real time during the process associated with FIG. 3. It is assumed that the combined signal is a signal in which moving picture signals, audio signals and/or a text signal are combined.

The operation for transmitting the combined signal stored in the memory 30 will now be described. The memory 30 can store at least one combined signal. Thus, the user can select a desired combined signal by means of a menu. When the desired combined signal is selected, the controller 10 accesses the combined signal stored in the memory 30, generates packet data based upon the combined signal to be transmitted, and outputs the packet data to the data processor 20. The data processor 20 assigns a data channel, performs a channel coding and modulation operation for the combined signal, and transmits a result of the channel and modulation operation to the RF module 23. The RF module 23 converts the result of the channel and modulation operation into a radio signal and transmits the radio signal.

Next, the operation for transmitting moving picture signals captured by the camera module 40 in real time will now be described. The image codec 80 performs the JPEG coding operation for the moving picture signals captured by the camera module 40, and the audio codec 85 codes audio signals. The controller 10 combines the coded moving picture and audio signals with a text signal. In the combining process, the text and image signals have headers. Since the image and audio signals must be processed in real time, the image and audio signals are interlaced and combined. The text signal is combined at a specific location such as the head or tail of a combined signal. In an embodiment of the present invention, it is assumed that the text signal is located at the head of the combined signal and the interlaced image and audio signals are stored. The controller 10 stores the combined signal in the memory 30, generates packet data based upon the combined signal and transmits the packet data to the data processor 20. The data processor 20 assigns a data channel, performs a channel coding and modulation operation for the combined signal, and transmits a result of the channel coding and modulation operation to the RF module 23. The RF module 23 converts the result of the channel coding and modulation operation into a radio signal, and transmits the radio signal.

Figure 6:
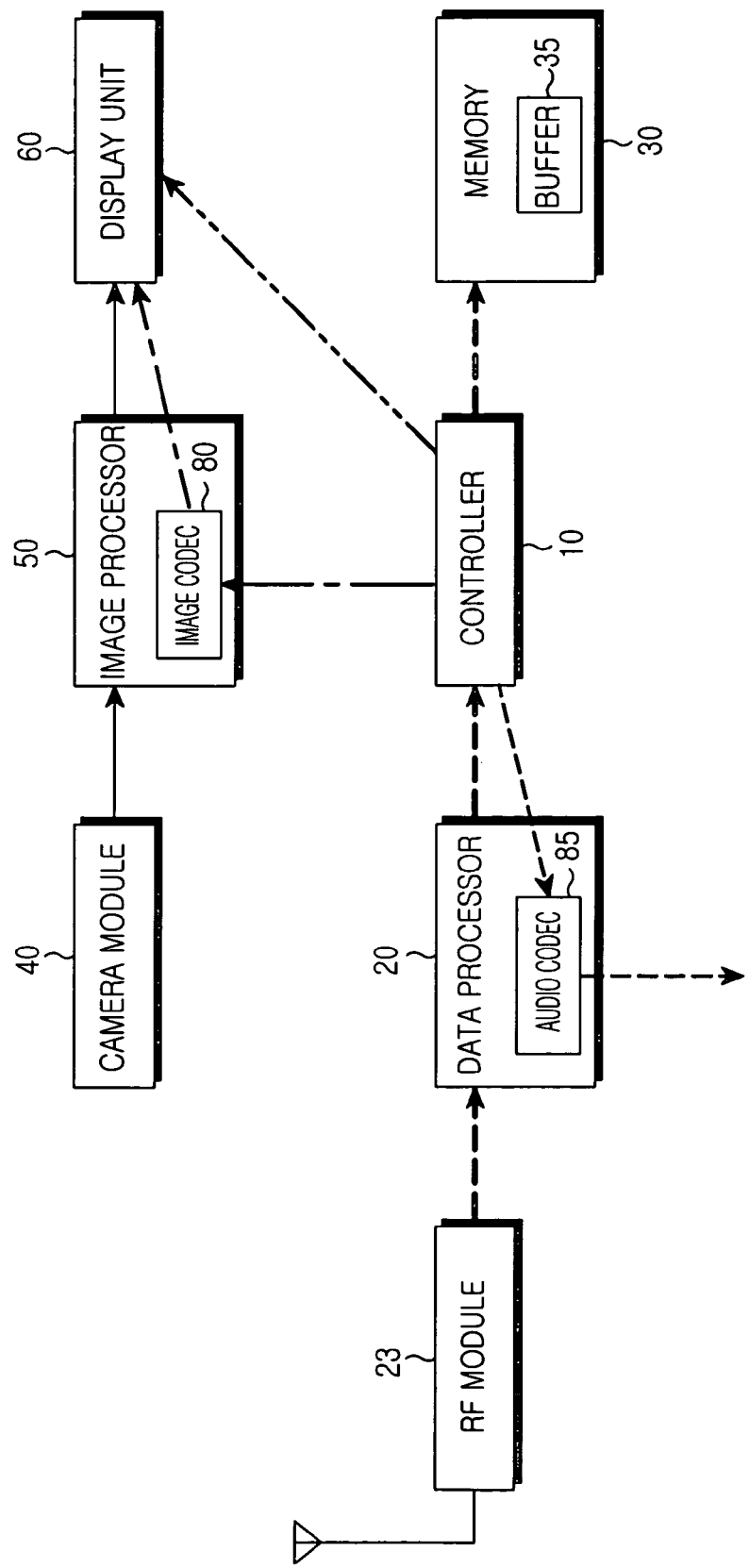
FIG. 6 is a block diagram illustrating a process for receiving the combined signal in accordance with an embodiment of the present invention.

FIG. 6 is a block diagram illustrating a process for receiving a combined signal in the mobile phone equipped with the camera and the image codec in accordance with a fourth embodiment of the present invention. In a method for receiving the combined signal, the combined signal received from a base station is stored in the memory 30 or can be displayed in real time during the process shown in FIG. 4. It is assumed that the combined signal is a signal in which moving picture signals, audio signals and a text signal are combined.

The operation for storing the received combined signal in the memory 30 will now be described. The RF module 23 converts a received radio signal into a baseband signal. The data processor 20 carries out a channel demodulation and decoding operation for the received combined signal and transmits a result of the channel demodulation and decoding operation to the controller 10. Since the received combined signal is based upon packets, the controller 10 analyzes headers of the packets, converts the packets into the combined signal and stores the combined signal in the memory 30. In accordance with an embodiment of the present invention, it is assumed that the text signal is located at the head of the first moving picture signal in the combined signal and the image and audio signals are interlaced. As described in relation to FIG. 4, a name of the received combined signal is registered, and will be able to be utilized as menu information.

Information stored in the memory 30 can be reproduced in real time. In this case, the controller 10 stores the received combined signal in the memory 30 and simultaneously performs the process associated with FIG. 4, such that the moving picture and audio signals can be reproduced.

Next, the processes in accordance with the embodiments shown in FIGS. 3 to 6 will now be described in detail.

Figure 7:
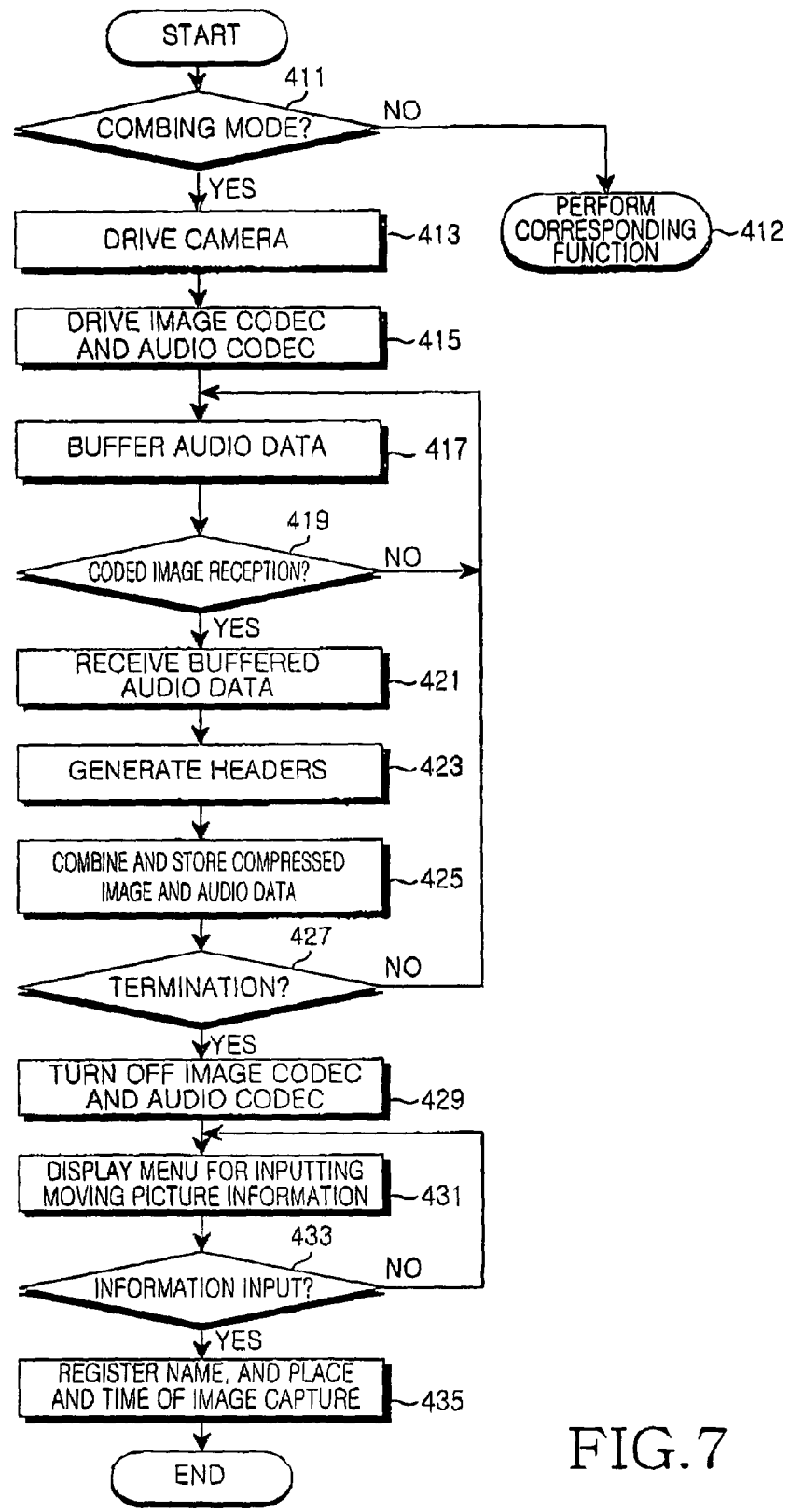
FIG. 7 is a flow chart illustrating a procedure for acquiring image and audio signals and generating and storing a combined signal based upon the image and audio signals in accordance with an embodiment of the present invention.
Figure 8:
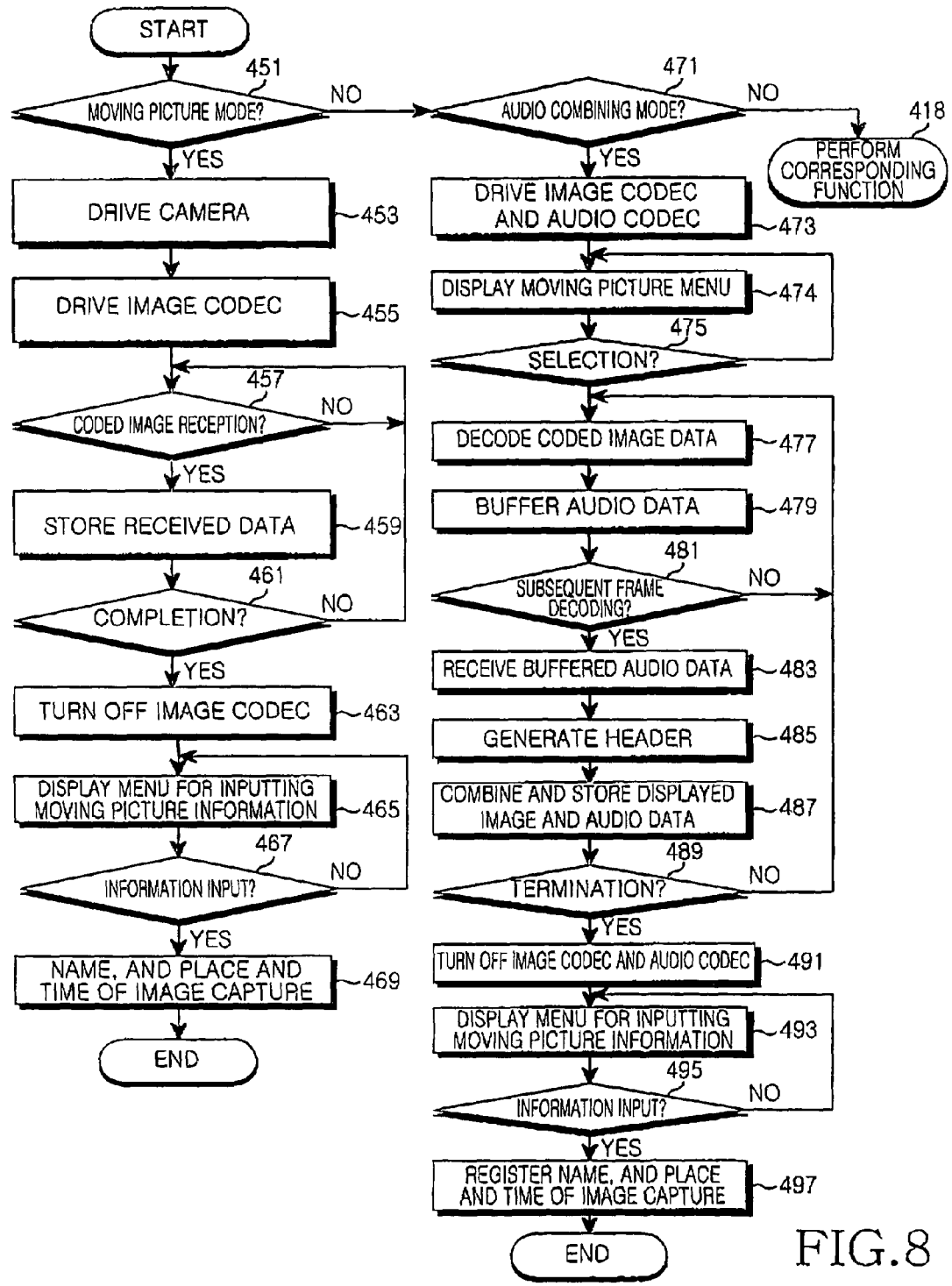
FIG. 8 is a flow chart illustrating a procedure for acquiring image and audio signals and generating and storing a combined signal based upon the image and audio signals in accordance with another embodiment of the present invention.
Figure 9:
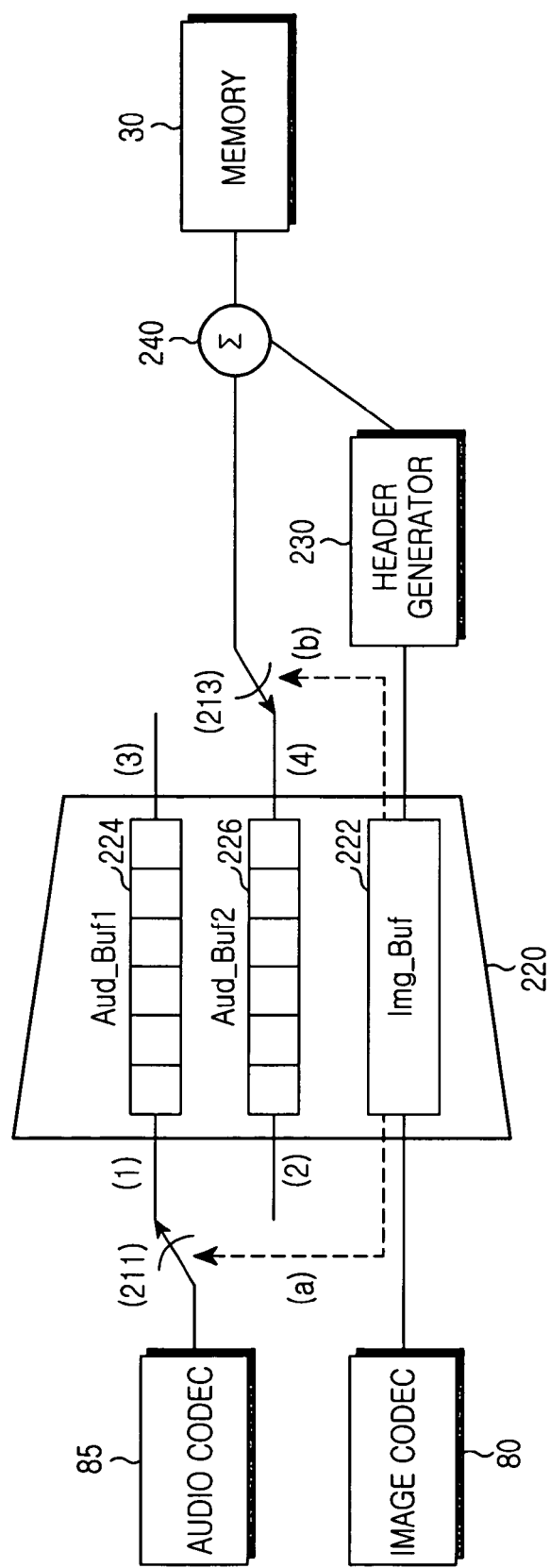
FIG. 9 is a block diagram illustrating components for acquiring image and audio signals and generating and storing a combined signal based upon the image and audio signals in accordance with another embodiment of the present invention.

FIG. 7 is a flow chart illustrating a procedure for enabling the image codec 80 of the image processor 50 to generate JPEG coded data of consecutive still pictures from moving picture signals captured by the camera module 40, enabling the audio codec 85 of the data processor 20 to generate coded audio data, combining the generated moving picture data and audio data, and storing combined data in the memory 30 in accordance with the first embodiment of the present invention. Further, FIG. 8 is a flow chart illustrating a procedure for generating and storing moving picture signals when a combined signal is generated and stored, generating audio signals based upon the stored moving picture signals, combining the moving picture signal and the audio signals and storing the combined signal. Furthermore, FIG. 9 is a block diagram illustrating an apparatus for performing the procedure shown in FIG. 7.

Referring to FIG. 7, the user inputs an instruction necessary for performing a combining mode that combines moving picture and audio signals by means of the key input unit 27. Then, the controller 10 detects the input instruction for the combining mode at step 411. If the input instructions are not detected, other corresponding functions are performed at step 412. The controller 10 drives the camera module 40 so that a capture operation can start at step 413. The controller 10 controls the image processor 50 so that it can start a JPEG coding operation for the moving picture signals captured by the camera module 40, and drives the audio codec 85 of the data processor 20 so that the audio codec 85 starts a coding operation for the audio signals based upon the moving picture signals captured by the camera module 40 at step 415. At this point, the moving picture signals captured by the camera module 40 are applied to the display unit 60 through the image processor 50 so that the display unit 60 can display the moving picture signals.

The image codec 80 performs the JPEG coding operation for image data of a frame size. At steps 417 and 419, coded audio data output from the audio codec 85 is buffered while the image codec 80 performs the JPEG coding operation for image data of one frame. Then, when JPEG coded image data of one frame is received, the controller 10 detects the received image data at the above step 419 and accesses the audio data buffered at the above step 417. At step 423, headers necessary for combining the JPEG coded image data and audio data are generated. Then, the controller 10 combines the headers generated as shown in FIG. 10B, the JPEG coded image data and the audio data and stores combined data in the memory 30. Before the user releases the combining mode, the headers, the image data and the audio data are combined in a unit of one frame, and combined data is stored in the memory 30 while the above-described operations are repeated.

Figure 10A:
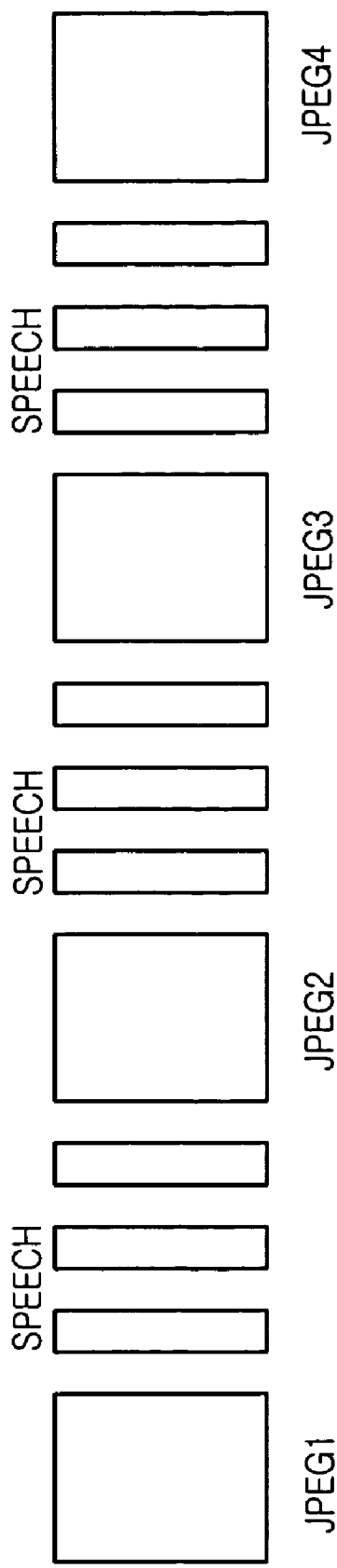
FIGS. 10A and 10B are block diagrams illustrating formats of combined data generated by the procedures and components shown in FIGS. 7 to 9.
Figure 10B:
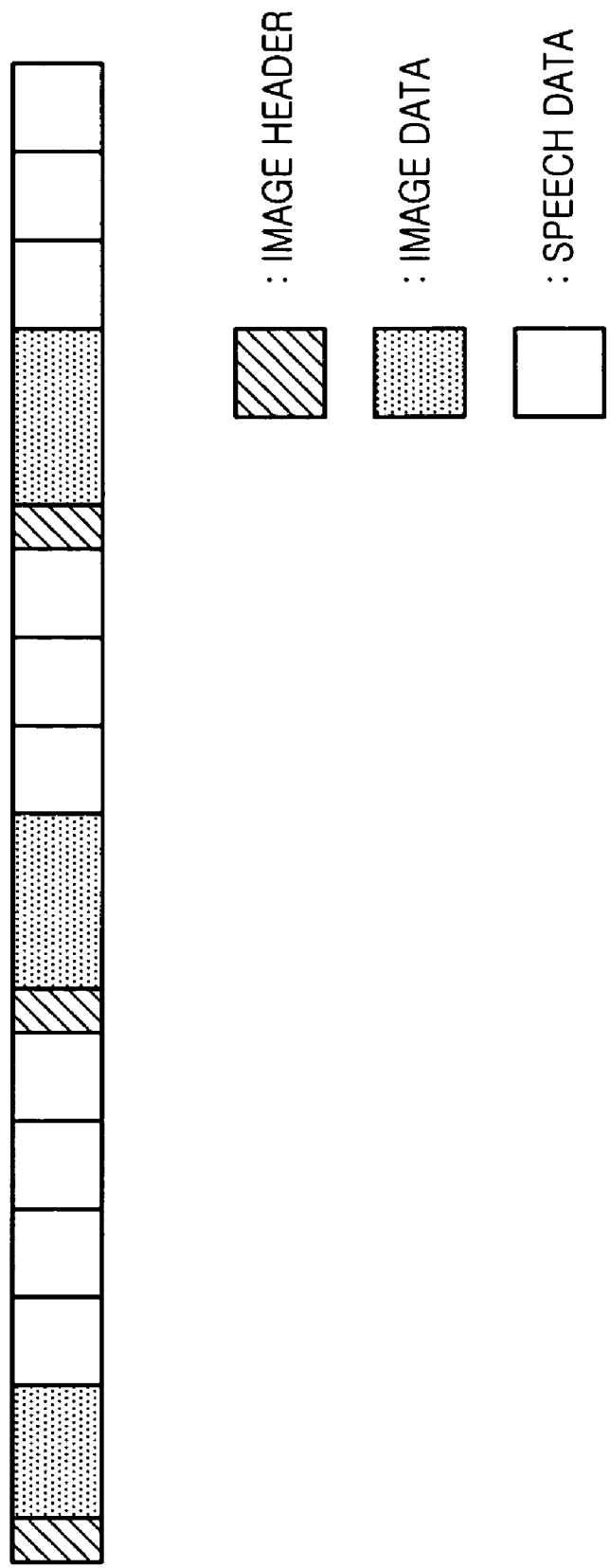

The combined data stored in the memory 30 contains consecutively stored still-picture data units JPEG 1, JPEG 2 and others as shown in FIG. 10A. Thus, the still-picture data stored in the memory 30 corresponds to moving picture data. At this point, the coded still-picture data units JPEG 1, JPEG 2, JPEG 3 and others can be decided according to the coding capability as described above. That is, assuming that the camera module 40 can capture image data at twenty frames per second, and the image codec 80 can code image data at five frames per second, the JPEG 1 can be image data of the first frame output from the camera module 40, the JPEG 2 can be image data of the fifth frame output from the camera module 40, the JPEG 3 can be image data of the ninth frame output from the camera module 40, and the JPEG 4 can be image data of the thirteenth frame output from the camera module 40. The controller 10 can use a method for varying a coding rate of the image codec 80 according to the user's selection. That is, a control operation can be performed so that a coding rate of the image codec 80 can be set lower than the maximum coding rate and JPEG image data can be generated according to the set coding rate. For example, assuming that the camera module 40 can pick up image data at twenty frames per second and the image codec 80 codes image data at five frames per second, the user can control the image codec 80 so that the image codec 80 can have a coding rate capable of coding one frame, two frames, three frames or four frames per second.

When a request for a combining mode termination is received from the user while combined data coded in units of frames is generated, the controller 10 detects the request of the combining mode termination at step 427, and turns off the image codec 80 and the audio codec 85 at step 429. At this point, the camera module 40 can be independently controlled according to an operating state of the mobile phone. That is, the mobile phone can perform a preview mode for displaying an image signal captured by the camera module 40 on the display unit 60. In this case, the image codec 80 and the audio codec 85 do not operate, and the image signal captured by the camera module 40 is displayed on the display unit 60 through a screen display generator of the image processor 50. Thus, where the mode for moving pictures is performed in the preview mode, the controller 10 turns off the image codec 80 when the mode for moving pictures is terminated. The image signals output from the camera module 40 are applied to the display unit 60 through the camera interface 311, the color converter 315, the scaler 313 and the LCD interface 317 and are displayed as a preview image screen. Where the mode for moving pictures is performed while the preview mode does not operate, the controller 10 turns off the camera module 40 at the above step 429.

After the above step 429 is performed, the controller 10 enables the display unit 60 to display information for registering the name of moving picture signals stored in the memory 30. If the mobile phone is not equipped with the GPS receiver, a guide menu is displayed so that a place and time of moving picture capture and the name of a combined signal stored in the memory 30 can be manually input. Alternatively, where the mobile phone is equipped with the GPS receiver, a guide menu is displayed so that the name of the combined signal stored in the memory 30 can be automatically input. The controller 10 generates the menu information, and the generated menu information is displayed on the display unit 60 as user data.

When the name of the combined signal is input through the key input unit 27 while the menu information is displayed, the controller 10 detects the input name at step 433. At step 435, name, place and time information corresponding to the combined signal stored in the memory 30 is input. At this point, the user may input only the name of the combined signal without inputting the place and time information of image capture. When the user inputs the name and presses an "END" key, the controller 10 registers only the name through information input into a name menu in response to the pressed "END" key.

FIG. 7 shows the procedure for enabling the controller 10 to generate and store the combined signal. However, the operation shown in FIG. 7 can be implemented by the configuration shown in FIG. 9. FIG. 9 is a block diagram illustrating components for generating and storing the combined signal in the mobile phone. As the components shown in FIG. 9, a buffer unit 220, switches 211 and 213, a header generator 230 and a combiner 240 can be used in the controller 10.

Referring to FIG. 9, the audio codec 85 codes audio signals output from the audio processor 25 and generates coded audio data. The image codec 80 codes image data captured by the camera module 40 and generates JPEG image data. An image buffer (Img_Buf) 222 provided in the buffer unit 220 buffers the JPEG image data output from the image codec 80. First and second audio buffers (Aud_Buf) 224 and 226 provided in the buffer unit 220 buffer coded audio data output from the audio codec 85. A common terminal is connected between the switch 211 and an output terminal of the audio codec 85. The first output terminal of the switch 211 is connected to an input terminal of the first audio buffer 224, and the second output terminal of the switch 211 is connected to an input terminal of the second audio buffer 226. Furthermore, the first input terminal of the switch 213 is connected to an output terminal of the first audio buffer 224 and the second input terminal of the switch 213 is connected to an output terminal of the second audio buffer 226. A common terminal is connected between the switch 213 and the combiner 240. The switches 211 and 213 can be controlled according to an output of the image buffer 222. When JPEG image data is output from the image buffer 222, the header generator 230 inserts headers into the JPEG image data, and outputs a result of the inserting operation. The combiner 240 combines the coded audio signals output from the switch 213 and the JPEG image data output from the image buffer 222 and outputs combined data. Under the control of the controller 10, the memory 30 stores the combined data output from the combiner 240.

The operation shown in FIG. 9 will now be described. Audio data and image data are coded by the audio codec 85 and the image codec 80, respectively. The coded audio and image data are input into the buffer unit 220 through corresponding paths. In this case, it is assumed that the first input of the combined data is fixed as image data. The buffer unit 220 includes the two audio buffers (Aud_Buf1 and Aud_Buf2) 224 and 246 and the one image buffer (Img_Buf) 222. An operation sequence of these components is as follows.

The image buffer 222 first receives image data JPEG 1 of one frame output from the image codec 80. At this time, the image buffer 222 performs a switching control operation so that the first switch or speech input switch 211 is switched to a point (1) through a path (a). Thus, the audio data output from the audio codec 85 is applied to the first audio buffer (Aud_Buf1) so that it can buffer the audio data. Then, the JPEG-1 image data buffered in the image buffer 222 is applied to the header generator 230. The header generator 230 inserts a header into the JPEG-1 image data. The JPEG-1 image data having the inserted header is sent to the memory 30 through the combiner 240. Then, the image buffer 222 prepares an operation for buffering JPEG-2 image data of a subsequent frame. A switching control operation is performed so that the first switch 211 is switched to a point (2) through the path (a), and simultaneously a switching control operation is performed so that the second switch or speech output switch 213 can be switched to a point (3) through a path (b). The audio data buffered in the first audio buffer 224 is applied to the combiner 240, and the second audio buffer 226 buffers audio data output from the audio codec 85. Upon completing a buffering operation for JPEG-2 image data, the image buffer 222 outputs the JPEG-2 image data to the header generator 230. The header generator 230 inserts a header into the JPEG-2 image data. The JPEG-2 image data having the inserted header is sent to the memory 30 through the combiner 240. Then, the image buffer 222 prepares an operation for buffering JPEG-3 image data of a subsequent frame. A switching control operation is performed so that the first switch 211 is switched to the point (1) through the path (a), and simultaneously a switching control operation is performed so that the second switch 213 is switched to the point (4) through the path (b). Then, the audio data buffered in the second audio buffer 226 is applied to the combiner 240, and the first audio buffer 224 buffers audio data output from the audio codec 85.

When the above-described operations are repeated, the header generator 230 inserts a header into each of the coded image data units JPEG 1, JPEG 2, JPEG 3, JPEG 4 and others. The combiner 240 combines sequentially received coded image and audio data and then sequentially outputs the header 1, the JPEG 1, the output of the first audio buffer 224, the header 2, the JPEG 2, and the output of the second audio buffer 226. While the image buffer 222 controls the switches 211 and 213, the first and second audio buffers 224 and 226 output buffered audio data. Thus, the combined data stored in the memory 20 has a form of moving picture data as shown in FIG. 10B.

FIG. 8 is a flow chart illustrating another procedure for generating and storing combined data. FIG. 8 shows another procedure for enabling the image codec 80 to code moving picture signals captured by the camera module 40 in the form of JPEG image data, enabling the memory 30 to store the JPEG image data, combining the JPEG image data stored in the memory 30 with audio data and generating combined data.

Referring to FIG. 8, the user inputs an instruction necessary for performing a moving picture mode by means of the key input unit 27. The controller 10 detects the input instruction for the moving picture mode at step 451. The controller 10 drives the camera module 40 so that a capture operation can start at step 453. The controller 10 controls the image processor 50 so that it can start a JPEG coding operation for moving picture signals captured by the camera module 40 at step 455. At this point, the moving picture signals captured by the camera module 40 are applied to the display unit 60 through the image processor 50 so that the display unit 60 can display the moving picture signals.

The image codec 80 performs the JPEG coding operation for image data based upon a frame size and the controller 10 waits for the JPEG image data to be received. Then, when JPEG coded image data of one frame is received, the controller 10 detects the received image data at step 457 and stores the JPEG image data in the memory 30 at step 459. The controller 10 repeatedly performs the above-described operations until the moving picture mode is completed. At this time, a plurality of data units stored in the memory 30 are JPEG image data units.

When the user requests that the moving picture mode be terminated, the controller 10 detects the request and turns off the image codec at step 463. Through steps 465 to 469, information indicating a name of moving pictures stored in the memory 30 and place and time information of image capture are registered. The operations of the above steps 465 to 469 are the same as those of the above steps 431 to 435 shown in FIG. 7.

While the above steps 451 to 469 are performed, only the JPEG image data is stored in the memory 30. When the JPEG image data is combined with audio, the user inputs an audio combining mode through the key input unit 27. Then, the controller 10 detects the input audio combining mode at step 471 and drives the image codec 80 and the audio codec 85 at step 473. If the input audio combining is not detected, other corresponding functions are performed at step 418. Then, the controller 10 enables the display unit 60 to display moving pictures stored in the memory 30 through a menu and waits for the user to select a moving picture at step 474. At this point, when the user selects a specified one of the displayed moving pictures, the controller 10 detects the selected moving picture at step 475, and enables the first JPEG frame associated with the selected moving picture to be decoded at step 477. The decoding process will now be described. The JPEG image data is applied to the image codec 80. The image codec 80 decodes received JPEG image data into original image data. A screen image generator of the image processor 50 scales the decoded image data on the basis of a size of the display unit 60 and outputs the scaled image data. Thus, the display unit 60 displays the scaled image data. Furthermore, while the image codec 80 decodes the image data of one frame, the controller 10 enables coded audio data output from the audio codec 85 to be buffered. When the JPEG coded image data of one frame is decoded, the controller 10 detects the decoded image data at step 481, accesses the buffered audio data at step 483, and enables a header necessary for combining the JPEG coded image data and the audio data to be generated at step 485. At step 487, the controller 10 stores the generated header, the JPEG coded image data and the audio data in the memory 30. Until the user releases the combining mode, the operation for combining the header, JPEG image data and audio data to store combined data in the memory 30 while decoding and displaying the JPEG image data in unit of frames is repeatedly performed.

The combined data stored in the memory 30 corresponds to consecutively stored still picture data units JPEG 1, JPEG 2 and others as shown in FIG. 10A. Thus, the image data stored in the memory 30 has a format of moving picture data.

If a termination request is made so that the operation for combining the JPEG image and the audio data can be terminated, the controller 10 detects the termination request at step 489, and registers a name of the combined data while steps 493 to 497 are performed. The operations of the above steps 493 to 497 are the same as those of the above steps 431 to 435. The above steps 493 to 497 can be omitted where the name of the moving picture data registered at the above steps 465 to 469 is used as the name of the combined data.

Figure 11:
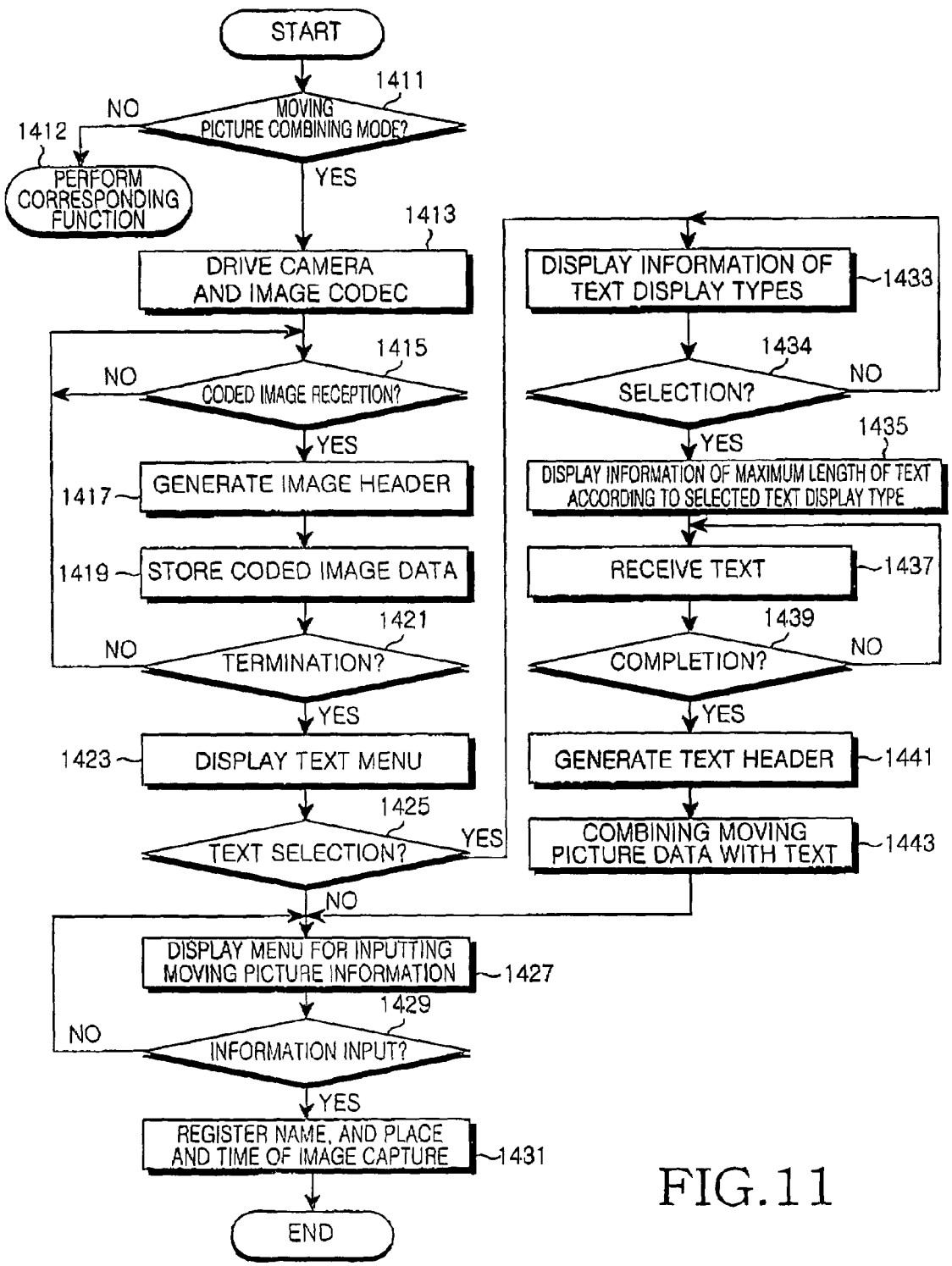
FIG. 11 is a flow chart illustrating a procedure for combining moving picture and text signals and generating and storing a combined signal based upon the moving picture and text signals in accordance with another embodiment of the present invention.
Figure 12:
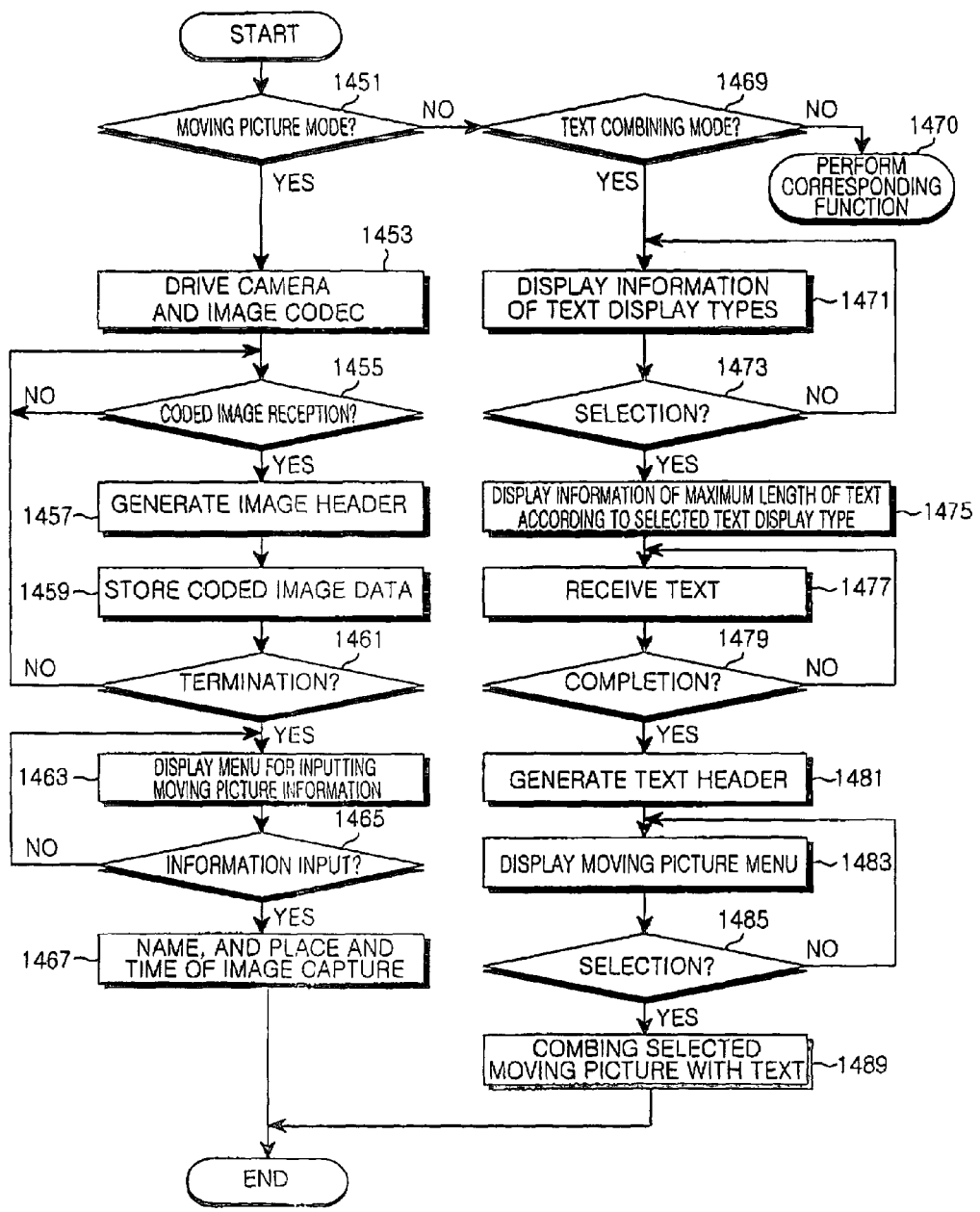
FIG. 12 is a flow chart illustrating a procedure for combining moving picture and text signals and generating and storing a combined signal based upon the moving picture and text signals in accordance with another embodiment of the present invention.
Figure 13:
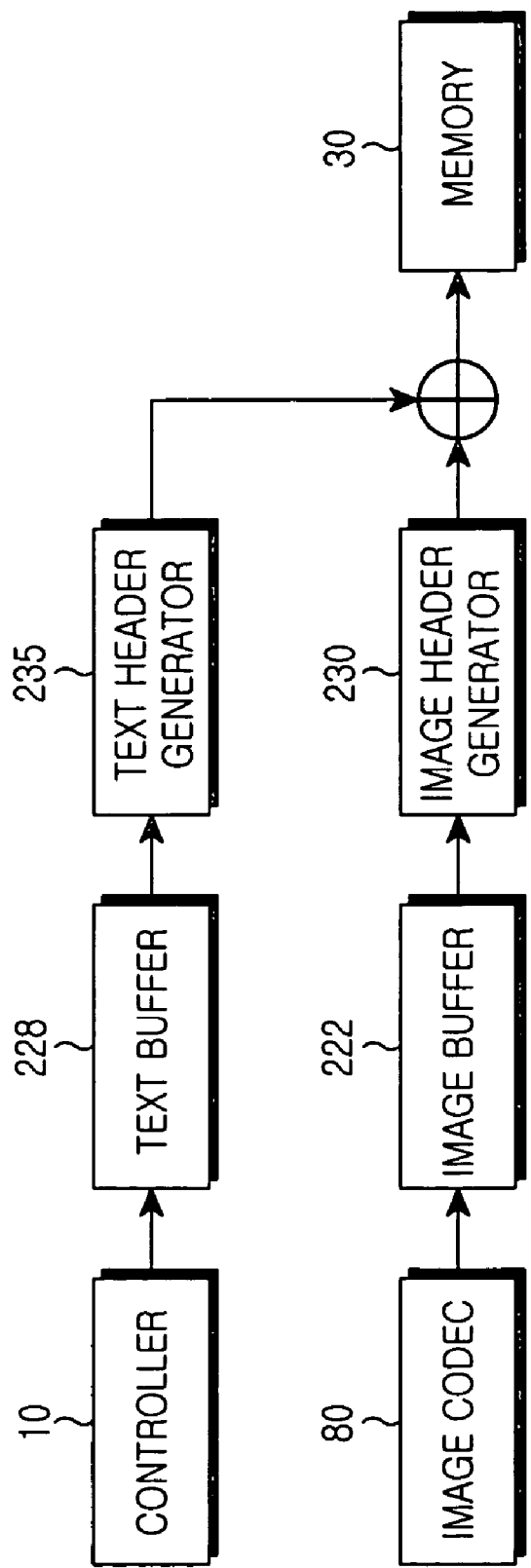
FIG. 13 is a schematic diagram illustrating components for acquiring image and text signals and generating and storing a combined signal based upon the image and text signals in accordance with another embodiment of the present invention.

FIG. 11 is a flow chart illustrating a procedure for enabling the image codec 80 of the image processor 50 to generate JPEG coded image data of consecutive still pictures from moving picture signals captured by the camera module 40, generating a text signal based upon the generated JPEG coded image data, combining the generated image and text signals, and storing a combined signal in the memory 30 in accordance with the embodiment of the present invention. Further, FIG. 12 is a flow chart illustrating a procedure for generating and storing moving picture signals when a combined signal is generated and stored, generating a text signal based upon the stored moving picture signals, combining the moving picture and text signals and storing the combined signal. Furthermore, FIG. 13 is a schematic diagram illustrating an apparatus for performing the procedure shown in FIG. 11.

Referring to FIG. 11, the user inputs an instruction necessary for performing a moving picture combining mode that combines moving picture and text signals by means of the key input unit 27. Then, the controller 10 detects the input instruction for the moving picture combining mode at step 1411. If the input instructions are not detected, other corresponding functions are performed at step 1412. The controller 10 drives the camera module 40 so that a capture operation can start at step 1413. The controller 10 controls the image processor 50 so that it can start a JPEG coding operation for moving picture signals captured by the camera module 40. At this point, the moving picture signals captured by the camera module 40 are applied to the display unit 60 through the image processor 50.

The image codec 80 carries out the JPEG coding operation for image data of one frame and then transmits a result of the JPEG coding operation to the controller 10. Then, upon receiving JPEG coded image data of one frame, the controller 10 detects the received image data at the above step 1415 and generates a header of the JPEG coded image data to insert the generated header into the image data at step 1417. At this time, information of the generated header can be a pattern signal indicating the existence of an image and a signal indicating a size of an image signal corresponding to one frame. Then, the controller 10 stores the JPEG image data having the inserted header in the memory 30 at step 1419. The JPEG image data can be stored in an image buffer of the memory 30. The above-described moving picture coding operation can be repeated until the user releases a moving picture receiving operation.

The combined data stored in the memory 30 indicates consecutively stored still-picture data units JPEG 1, JPEG 2 and others. Thus, the image data stored in the memory 30 corresponds to moving picture data. At this point, the coded image data units JPEG 1, JPEG 2, JPEG 3 and others depend upon the coding capability as described above.

When a request of a combining mode termination is received from the user while combined data coded in unit of frames is generated, the controller 10 detects the request of the combining mode termination at step 1421, and enables the display unit 60 to display menu information so that a text signal to be combined with the stored moving picture signals can be selected. At this point, when the user selects a text signal input, the controller 10 detects the selected text signal input at step 1425, and enables the display unit 60 to display text display type information at step 1433. Then, when the user selects one of text display types, the controller 10 detects the selected text display type at step 1434, and indicates the maximum length of displayable text based upon the selected text display type at step 1437. Here, the text display types can be a top display type, a bottom display type, a slide display type, a pile-up display type and others.

First, the top display type means a method for displaying a text signal before moving picture signals are displayed. If the top display type is selected, the controller 10 does not indicate the maximum length of displayable text.

Second, the bottom display type means a method for displaying the text signal after moving picture signals are displayed. If the bottom display type is selected, the controller 10 does not indicate the maximum length of displayable text.

Third, the slide display type means a method for sliding and displaying the text signal at a specified location of the display unit 60 while reproducing the moving picture signals. A rate of sliding the text signal is determined on the basis of a total playback time required for reproducing the moving picture signals. When the slide display type is selected, the maximum number of characters capable of being input needs to be limited so that the text signal is synchronized with the moving picture signals. Assuming that the sliding rate of one character is 0.5 sec, the maximum length of text can be calculated as in the following.

$$\text{Total number of input characters} = 2 \text{ characters}/\text{sec} * \text{Total playback time required for reproducing image signals} \quad \text{Equation 1}$$

For example, where the playback time required for reproducing the stored image signals is 10 sec, the maximum number of characters capable of being input is 20. After the controller 10 calculates the playback time required for reproducing the image signals stored in the memory 30. According to a result of the calculation, the controller 10 calculates the maximum number of characters capable of being input in the slide display method. Further, the specified location of the display unit 60 can be a top or bottom end or a left or right side. Furthermore, the display unit 60 can display the text signal on a text display area other than an image display area or display the text signal on the image display area in an onscreen mode.

Fourth, the pile-up display type is similar to the slide display type. The pile-up display type means a method for displaying a text signal of a set size at a specified location of the display unit 60 at one time while the moving picture signal is reproduced. That is, the pile-up display method displays subsequent characters after the set number of characters is displayed on the display unit 60 until a predetermined time elapses. In this case, the number of characters capable of being displayed at one time can be decided according to a size of the display unit 60. If the pile-up display type is selected, the maximum number of characters capable of being input needs to be limited so that the text signal is synchronized with the moving picture signals. Assuming that the time required for displaying 10 characters is 2 sec, the maximum length of text can be calculated as in the following.

$$\text{Total number of input characters} = 10 \text{ characters}/2 \text{ sec} * \text{Total playback time required for reproducing image signals} \quad \text{Equation 2}$$

For example, where the playback time required for reproducing the stored image signals is 10 sec, the maximum number of characters capable of being input is 50. After the controller 10 calculates the playback time required for reproducing the image signals stored in the memory 30. According to a result of the calculation, the controller 10 calculates the maximum number of characters capable of being input in the pile-up display method. Further, the specified location of the display unit 60 can be a top or bottom end or a left or right side. Furthermore, the display unit 60 can display the text signal on a text display area other than an image display area or display the text signal on the image display area in an onscreen mode.

When the user inputs text, the controller 10 receives the input text and stores the received text in the memory 30 at step 1437. The text can be stored in a text buffer of the memory 30. When the text input is completed, the controller 10 detects the completed text input at step 1439 and inserts a header into the received text at step 1441. The text header includes information associated with a pattern indicating the existence of text, the length of the received text, etc.

Figure 14A:
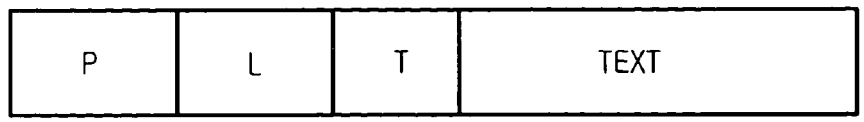
FIGS. 14A to 14C are block diagrams illustrating formats of the combined signal in which the image and text signals are combined by the procedures and components shown in FIGS. 11 to 13.
Figure 14B:
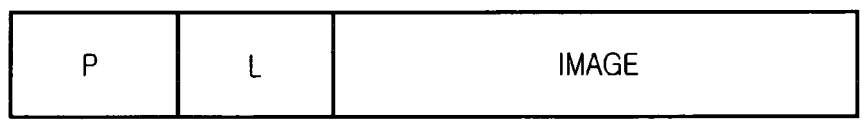
Figure 14C:
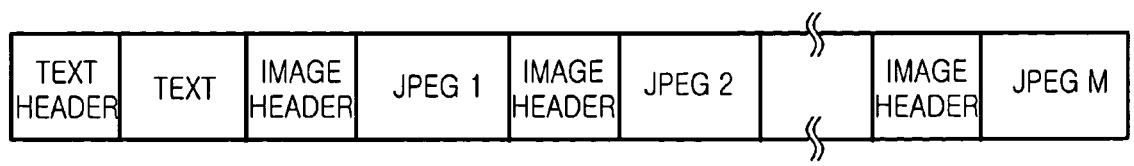

FIG. 14A shows the format of a text signal; FIG. 14B shows the format of a JPEG image signal; and FIG. 14C shows the format of a signal in which text and moving picture signals are combined.

Referring to FIG. 14A, P denotes a field into which a pattern signal is inserted, and the pattern signal indicating that subsequent data is text is inserted into the P field. L denotes a field into which information indicating the total length of text is inserted. T denotes a field into which information indicating a display type is inserted. A value of the T field, that is, "0000" indicates a top display type, "0001" indicates a bottom display type, "0010" indicates a slide display type, and "0011" indicates a pile-up display type. A field subsequent to the T field can be a field into which a text signal is inserted. The P, L and T fields correspond to the text header.

Referring to FIG. 14B, P denotes a field into which a pattern signal is inserted, and the pattern signal indicating that subsequent data is a JPEG image signal is inserted into the P field. L denotes a field into which information indicating the total size of the JPEG image signal is inserted. Here, the P and L fields correspond to an image header.

If the text input is completed, the controller 10 combines moving picture signals stored in the image buffer of the memory 30 with a text signal stored in the text buffer of the memory 30. At this point, the moving picture signals must be consecutively processed. However, the text signal needs to be appropriately processed, if necessary. Thus, the text signal does not need to be interlaced and combined with the moving picture signals, differently from the audio signal. In this embodiment of the present invention, it is assumed that the text signal is inserted before the moving picture signals and then a combined signal is generated. FIG. 14C shows the format of a combined signal in which text and moving picture signals are combined.

After the moving picture signals and the text signal are combined and the combined signal is generated, the controller 10 enables the display unit 60 to display information necessary for registering a name of the moving picture at step 1427. If the mobile phone is not equipped with the GPS receiver, a guide menu is displayed so that a place and time of moving picture capture and the name of a combined signal stored in the memory 30 can be manually input. Alternatively, where the mobile phone is equipped with the GPS receiver, a guide menu is displayed so that the name of the combined signal stored in the memory 30 can be automatically input. The controller 10 generates the menu information, and the generated menu information is displayed on the display unit 60 as user data.

When the name of the combined signal is input through the key input unit 27 while the menu information is displayed, the controller 10 captures the input name at step 1429. At step 1431, name, place and time information corresponding to the combined signal stored in the memory 30 is input. At this point, the user may input only the name of the combined signal without inputting the place and time information of image capture. In this case, when the user inputs the name and presses an "END" key, the controller 10 registers only the name through information input into a name menu in response to the pressed "END" key.

FIG. 11 illustrates the procedure for enabling the controller 10 to generate and store the combined signal. However, the operation shown in FIG. 11 can be implemented by the configuration shown in FIG. 9. FIG. 13 is a block diagram illustrating components for generating and storing the combined signal in the mobile phone. In FIG. 13, the controller 10 can include a buffer unit 220, switches 211 and 213, a header generator 230 and a combiner 240.

Referring to FIG. 13, the image codec 80 codes image data captured by the camera module 40 and generates JPEG image data. An image buffer (Img_Buf) 222 buffers the JPEG image data output from the image codec 80. When the JPEG image data is output from the image buffer 222, the header generator 230 generates a header and inserts the header into the JPEG image data. The controller 10 generates text to be combined with the moving picture signals. The controller 10 processes a text signal input by the user or can generate the text signal as a designated text memo is selected by the user. A text buffer 228 stores the text generated by the controller 10. A text header generator 235 generates a header for the text signal output from the text buffer 228 and inserts the generated header into the text signal. The combiner 240 combines the text signal output from the text header generator 235 with the JPEG image data output from the image header generator 230, and outputs combined data. Under the control of the controller 10, the memory 30 stores the combined data output from the combiner 240.

FIG. 12 is a flow chart illustrating another procedure for generating and storing combined data. FIG. 12 shows another procedure for enabling the image codec 80 to code moving picture signals captured by the camera module 40 into JPEG image data, enabling the memory 30 to store the JPEG image data, combining the JPEG image data stored in the memory 30 with a text signal and generating combined data.

Referring to FIG. 12, the user inputs an instruction necessary for performing a moving picture mode by means of the key input unit 27. The controller 10 detects the input instruction for the moving picture mode at step 1451. The controller 10 drives the camera module 40 so that a capture operation can start at step 1453. The controller 10 controls the image processor 50 so that it can start a JPEG coding operation for moving picture signals captured by the camera module 40. At this point, the moving picture signals captured by the camera module 40 are applied to the display unit 60 through the image processor 50 so that the display unit 60 can display the moving picture signals.

The image codec 80 carries out the JPEG coding operation for image data of one frame, and then transmits a result of the JPEG coding operation to the controller 10. Then, when JPEG coded image data of one frame is received, the controller 10 detects the received image data at step 1455, and generates a header of the JPEG coded image data to insert the generated header into the JPEG coded image data at step 1457. At this time, the information of the generated header can be a pattern signal indicating the existence of an image signal and a signal indicating a size of the image signal corresponding to one frame. Then, the controller 10 stores the JPEG image having the inserted header in the memory 30 at step 1459. The JPEG image data can be stored in an image buffer of the memory 30. The above-described moving picture coding operation can be repeated until the user releases a moving picture receiving operation.

When the user requests that the moving picture mode be terminated, the controller 10 detects the request at step 1461 and enables the display unit 60 to display menu information indicating that moving picture information can be input at step 1463. At steps 1465 to 1467 are performed, information associated with a name of a moving picture stored in the memory 30 and place and time information of moving picture capture are registered. The operations of the above steps 1465 to 1467 are the same as those of the above steps 1429 to 1431 shown in FIG. 11.

While the above steps 1451 to 1467 are performed, only the JPEG image data is stored in the memory 30. When the JPEG image data is combined with a text signal, the user inputs a combining mode through the key input unit 27 at step 1469. If the input instructions are not detected, other corresponding functions are performed at step 1470. Upon sensing the input combining mode, the controller 10 displays text display type information on the display unit 60 at step 1471. When the user selects one of the text display types, the controller 10 detects the selected text display type at step 1473, and enables the display unit 60 to display the maximum length of displayable text on the basis of the selected text display type at step 1475. Here, the text display types can be a top display type, a bottom display type, a slide display type, a pile-up display type and others.

When the user inputs text, the controller 10 receives the input text and stores the received text in the memory 30 at step 1477. At this point, the text can be stored in a text buffer of the memory 30. When the text input is completed, the controller 10 detects the completed text input at step 1479 and inserts a header into the received text at step 1481. The text header includes information associated with a pattern indicating the existence of text, a signal indicating the length of the received text, etc. as shown in FIG. 14A.

When the text input is completed, the controller 10 enables the display unit 60 to display menu information so that a text signal to be combined with the stored moving picture signals can be selected. That is, the memory 30 can store a plurality of moving picture signals. When a moving picture signal is combined with the text signal, the controller 10 enables the display unit 60 to display the stored moving picture signals at step 1483. When an arbitrary moving picture signal is selected, the controller 10 detects the selected moving picture signal at step 1485, and combines the selected moving picture signal with the text signal at step 1489.

Figure 15:
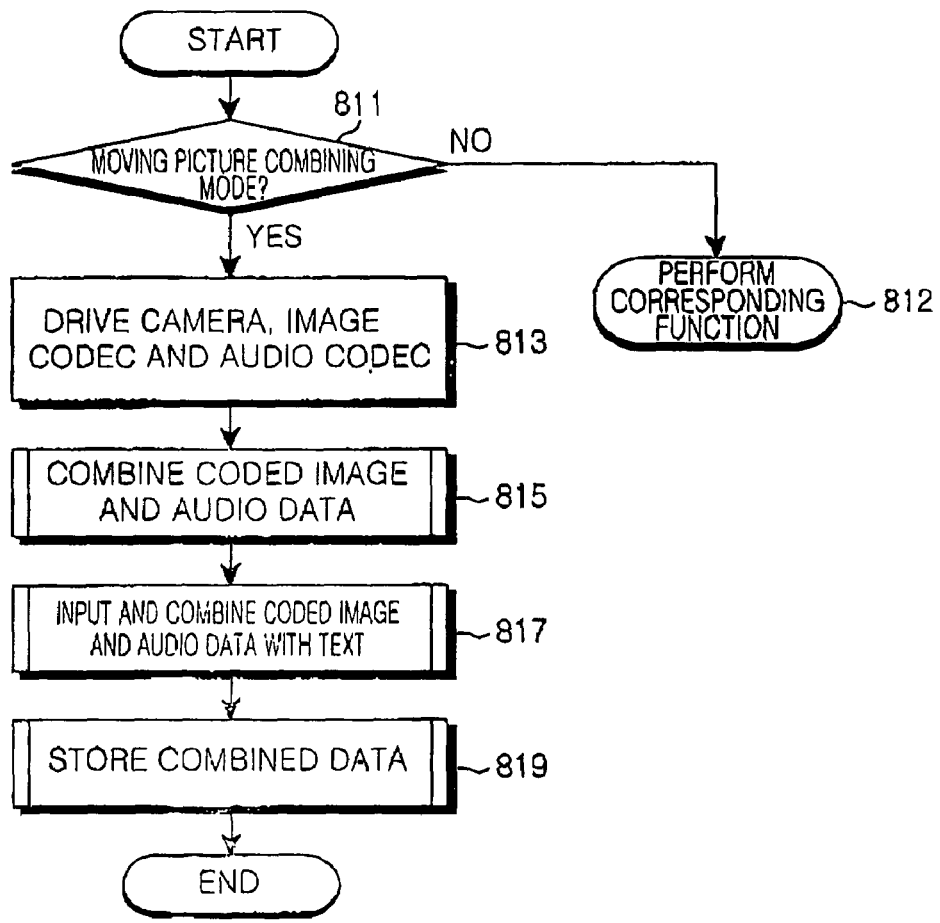
FIG. 15 is a flow chart illustrating a procedure for combining moving picture, audio and text signals and generating and storing a combined signal based upon the moving picture, audio and text signals in accordance with another embodiment of the present invention.

FIG. 15 is a flow chart illustrating a procedure for coding image signals captured by the camera module 40 in the form of consecutive moving picture signals, and combining the moving picture signals with audio signals and a text signal in accordance with another embodiment of the present invention. The procedure shown in FIG. 15 can be performed according to the combining procedure shown in FIG. 7 and the combining procedure shown in FIG. 11. Components shown in FIG. 17 generate a combined signal according to the procedure shown in FIG. 15.

Referring to FIG. 15, when a moving picture combing mode is selected to combine the moving picture signals with the audio and text signals, the controller 10 detects the selected combing mode at step 811, and drives the camera module 40, the image codec 80 and the audio codec 85 at step 813. If the selected combining mode is not detected, other corresponding functions are performed at step 812. Then, the controller 10 combines consecutively coded moving picture signals with a coded audio signal at step 815 as in the operations of the above steps 417 to 427 shown in FIG. 7. Then, the controller 10 combines a combined signal based upon the moving picture and audio signals with the text signal at step 817 as in the operations of the above steps 1423 to 1443. The controller 10 stores the combined signal in which the moving picture signals are combined with the audio and text signals at step 819. The above step 819 involves the operations of the above steps 431 to 435 shown in FIG. 7 or the operations of the above steps 1427 to 1431 shown in FIG. 11.

Figure 17:
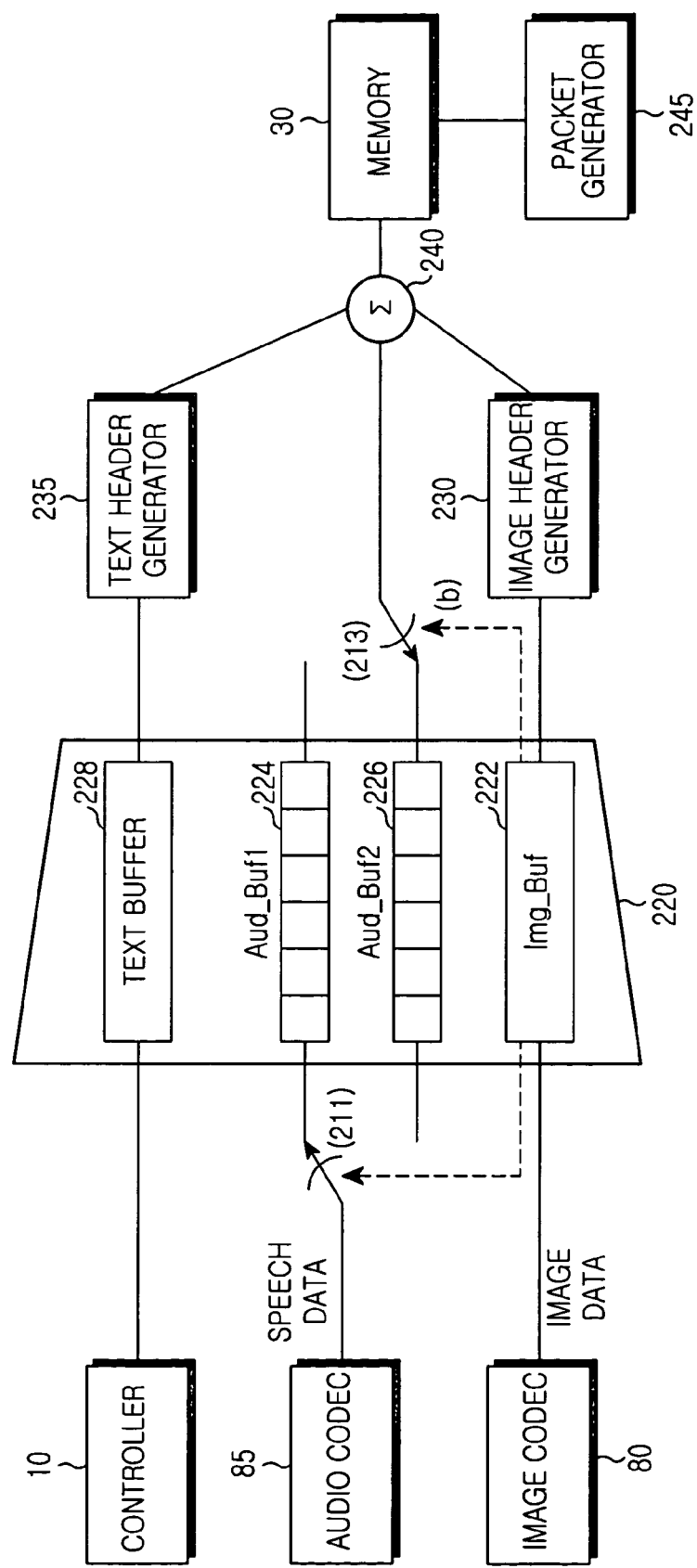
FIG. 17 is a schematic diagram illustrating components for acquiring image, audio and text signals and generating and storing a combined signal based upon the image, audio and text signals in accordance with another embodiment of the present invention.
Figure 18:
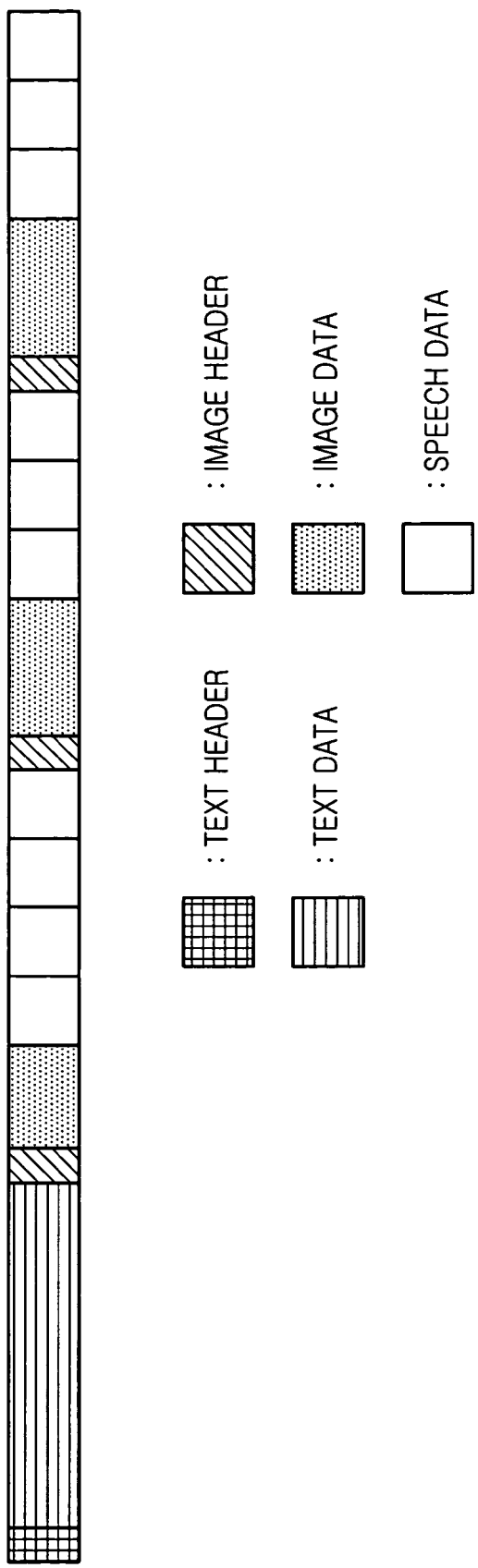
FIGS. 18 is a block diagram illustrating a format of the combined signal in which the image, audio and text signals are combined by the procedures and components shown in FIGS. 15 to 17.

Furthermore, the apparatus shown in FIG. 17 can implement the combined signal generated by the procedure shown in FIG. 15. A format of the combined signal is shown in FIG. 18.

Figure 16:
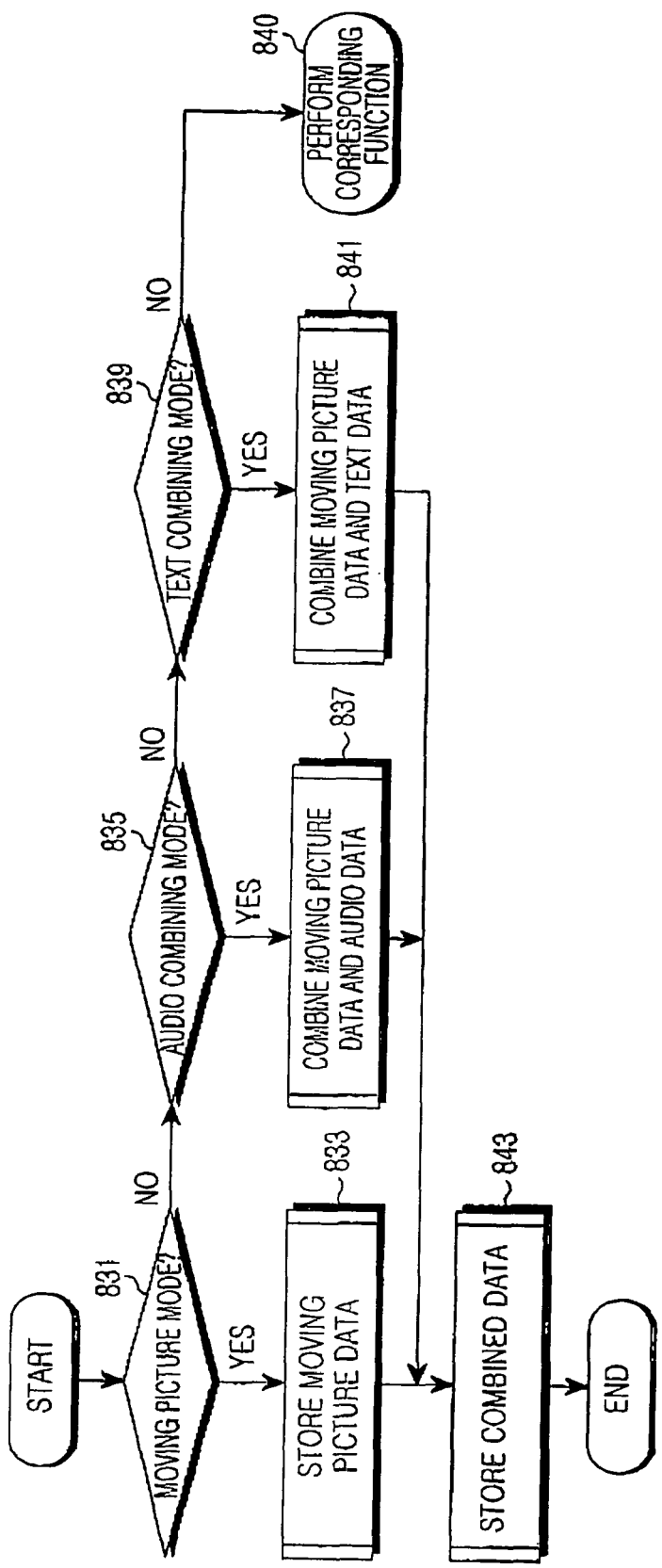
FIG. 16 is a flow chart illustrating a procedure for combining moving picture, audio and text signals and generating and storing a combined signal based upon the moving picture, audio and text signals in accordance with another embodiment of the present invention.

FIG. 16 is a flow chart illustrating another procedure for coding image signals captured by the camera module 40 in the form of consecutive moving picture signals, and combining the moving picture signals with audio and text signals in accordance with another embodiment of the present invention. The procedure shown in FIG. 16 can be performed according to the combining procedure shown in FIG. 8 and the combining procedure shown in FIG. 12.

Referring to FIG. 16, when a moving picture mode is selected, the controller 10 detects the selected moving picture mode at step 831 and moving picture signals are consecutively coded and the coded moving picture signals are generated at step 833 as in the operations of the above steps 453 to 463 shown in FIG. 8. Further, when an audio combing mode is selected, the controller 10 detects the selected audio combing mode at step 835 and combines at least one selected moving picture signal with an audio signal at step 837 as in the operations of the above steps 473 to 491 shown in FIG. 8. Furthermore, when a text combining mode is selected, the controller 10 detects the selected text combining mode at step 839 and combines at least one selected moving picture signal with a text signal at step 841 as in the operations of the above steps 1471 to 1481. If the selected text combining mode is not selected, other corresponding functions are performed at step 840. At this time, the selected moving picture signal can contain the audio signal. After the selected moving picture signal is combined with the audio signal and/or the text signal, the controller 10 can store a combined signal at step 843 as in the operations of the above steps 465 to 469 shown in FIG. 8 or the above steps 1463 to 1467 shown in FIG. 12.

The combined signal generated by the method shown in FIGS. 15 to 17 can be a signal in which moving picture signals are audio and text signals. Here, a format of the combined signal is shown in FIG. 18.

Figure 19:
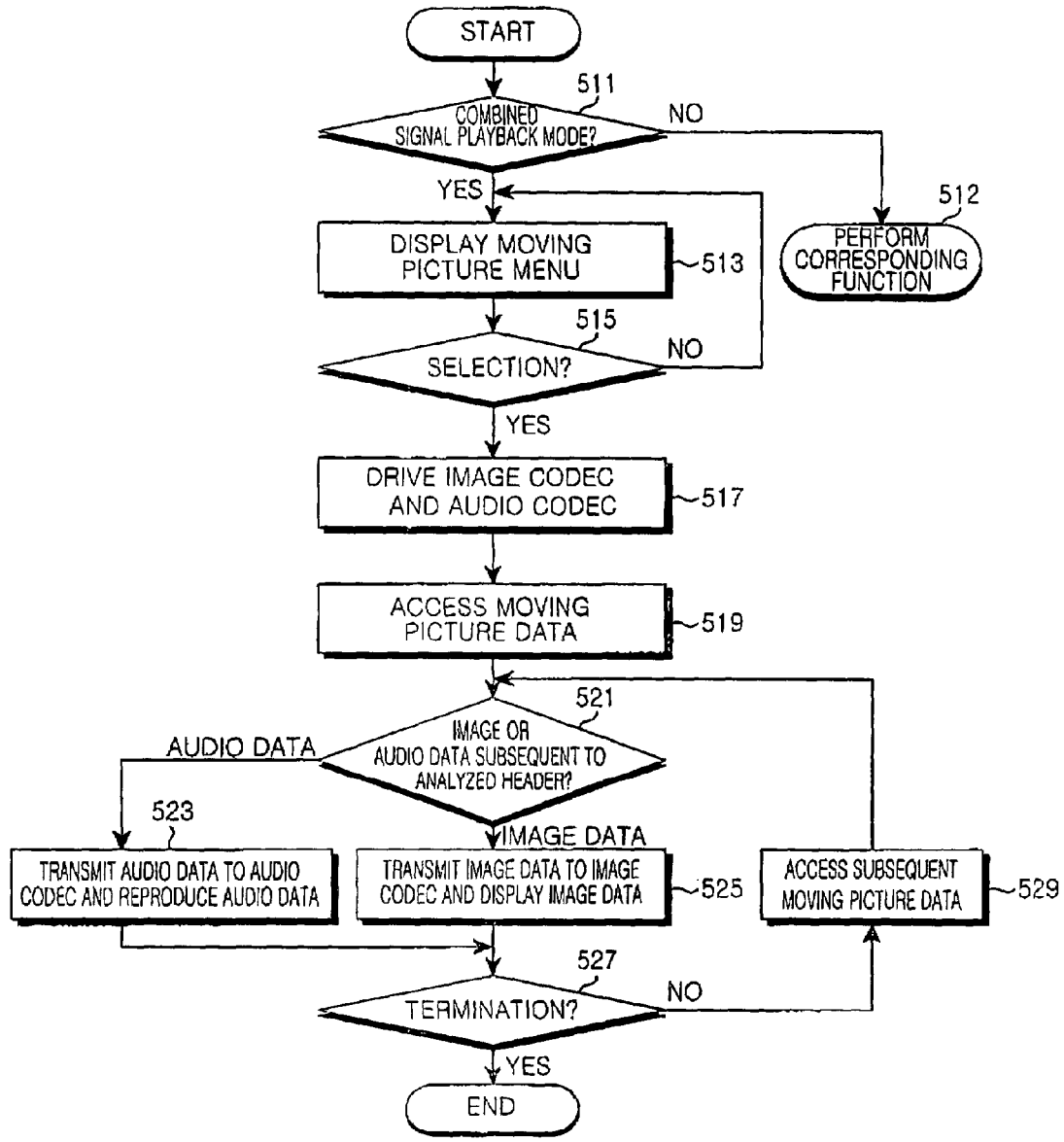
FIG. 19 is a flow chart illustrating a procedure for separating and reproducing a combined signal in accordance with another embodiment of the present invention.

FIG. 19 is a flow chart illustrating a procedure for reproducing combined data stored in the memory 30 in accordance with the second embodiment of the present invention.

Referring to FIG. 19, when the user inputs a combined signal playback mode through the key input unit 27, and the controller 10 detects the input moving picture playback mode at step 511 and enables the display unit 60 to display a moving picture menu at step 513. If the input instructions are not detected, other corresponding functions are performed at step 512. Information of the moving picture menu can contain a name of at least one moving picture or can contain the name of the moving picture and a place and time of moving picture capture. When the user selects a desired moving picture while the moving picture menu is displayed, the controller 10 detects the selected moving picture at step 515. The controller 10 drives the image codec 80 and the audio codec 85 and accesses information of combined data selected from the memory 30 at steps 517 and 519.

Then, the controller 10 analyzes headers of accessed combined data and separates the combined data into JPEG image data and audio data at step 521. Then, the controller 10 sends the JPEG image data to the image codec 80 at step 525 and sends the audio data to the audio codec 85 at step 523. The JPEG image data is processed through the display screen generator of the image processor 50 and is displayed on the display unit 60. Furthermore, the audio processor 25 reproduces the audio data and a speaker outputs the reproduced audio data. The controller 10 accesses combined data of a subsequent frame at step 529, and the above steps 521 to 525 are repeated. Combined data units stored in the memory 30 are consecutively reproduced and the reproduced combined data units are consecutively output to the display unit 60 and the speaker. The combined data is reproduced in the form of moving pictures. When combined data of the last frame stored in the memory 30 is reproduced or a playback stop command is input from the user, the controller 10 detects the reproduced last frame or the received playback stop command and terminates the combined signal playback mode at step 527.

Figure 20:
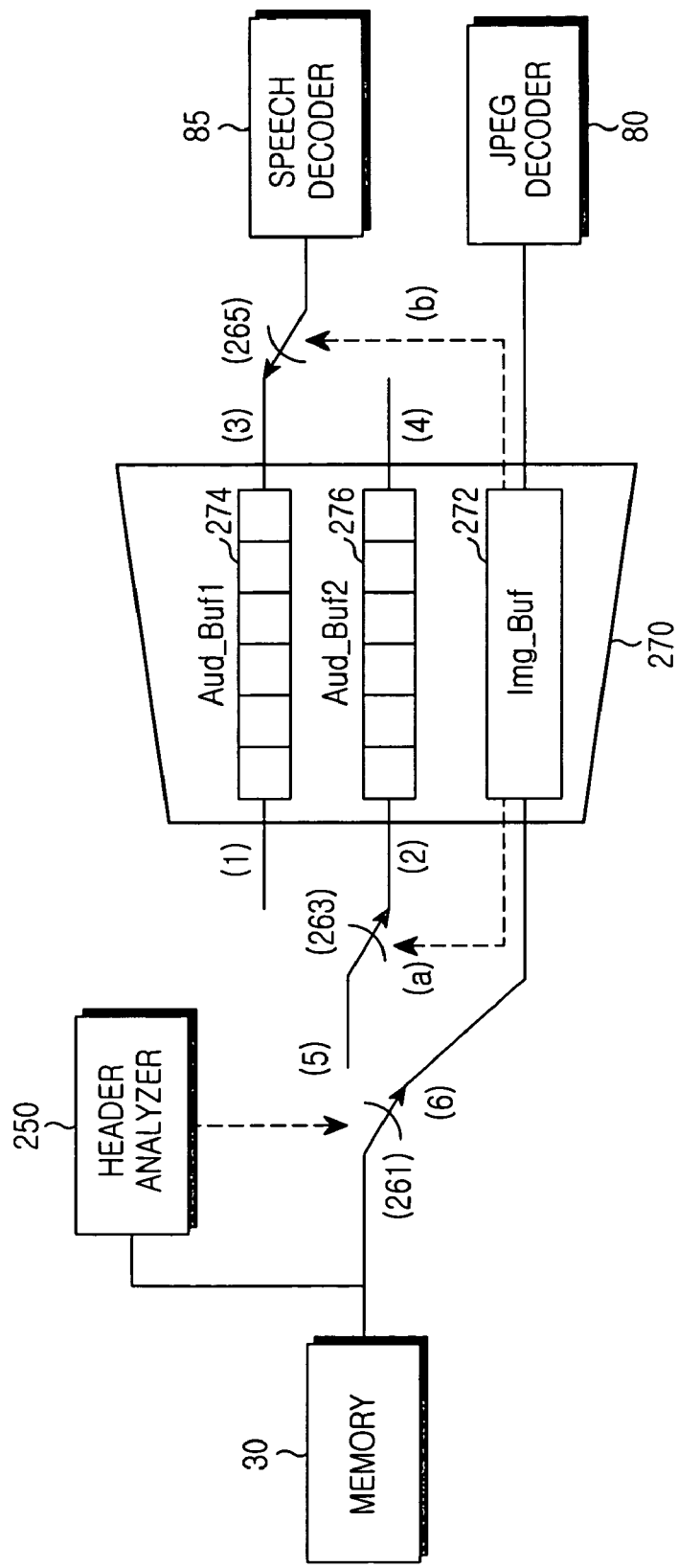
FIG. 20 is a block diagram illustrating components for separating and reproducing the combined signal in accordance with another embodiment of the present invention.

FIG. 19 is a flow chart illustrating the procedure for enabling the controller 10 to generate and store the combined signal. The procedure shown in FIG. 19 can be implemented by the configuration shown in FIG. 20. FIG. 20 is a block diagram illustrating components for generating and storing a combined signal in the mobile phone. As the components shown in FIG. 20, a header analyzer 250, switches 261, 263 and 265 and a buffer unit 270 can be included in the controller 10.

Referring to FIG. 20, the memory 30 stores combined signals, and the combined signals selected under the control of the controller 10 are accessed. The header analyzer 250 analyzes headers of a combined signal accessed in the memory 30 and generates a switch control signal for separating the combined signal into JPEG image data and audio data. A common terminal is connected between the switch or A/V switch 261 and the memory 30. The first output terminal of the switch 261 is connected to a common terminal for the switch or speech input switch 263 switching the audio data, and the second output terminal of the switch 261 is connected to an image buffer 272. The image buffer (Img_Buf) 272 provided in the buffer unit 270 buffers JPEG image data output from the switch 261. The first and second audio buffers (Aud_Buf) 274 and 276 buffer coded audio data. The common terminal for the switch 263 is connected to the first output terminal of the switch 261. The first output terminal of the switch 263 is connected to an input terminal of the first audio buffer 274, and the second output terminal of the switch 263 is connected to an input terminal of the second audio buffer 276. Furthermore, the first input terminal of the switch or speech output switch 265 is connected to an output terminal of the first audio buffer 274 and the second input terminal of the switch 265 is connected to an output terminal of the second audio buffer 276. A common terminal is connected between the switch 265 and the audio codec or speech decoder 85. The switches 263 and 265 are controlled by an output of the image buffer 272. Thus, the buffer unit 270 performs a splitter function for splitting audio data and JPEG image data from the combined signal. The audio codec or speech decoder 85 decodes coded audio data output from the switch 265 and outputs the decoded audio signals. The image codec or JPEG decoder 80 decodes JPEG image data output from the image buffer 272 and outputs the decoded image data.

The operation shown in FIG. 20 will now be described. Audio data and image data are coded by the audio codec 85 and the image codec 80, respectively. The coded audio and image data are input into the buffer unit 270 through corresponding paths. In this case, it is assumed that the first input of the combined data is fixed as image data. The buffer unit 270 includes the two audio buffers (Aud_Buf1 and Aud_Buf2) 274 and 276 and the one image buffer (Img_Buf) 272. An operation sequence of these components is as follows.

First, a combined signal selected from the combined signals stored in the memory 30 is output. The combined signals stored in the memory 30 contain JPEG image data with image headers and coded audio or speech data as shown in FIG. 10B and are stored in units of frames. Thus, when a moving picture playback mode is operated, the selected combined signal is separated into JPEG image data and audio data. The JPEG image data and audio data are reproduced. The header analyzer 250 analyzes the headers of a combined signal shown in FIG. 10B that is output from the memory 30 and generates the switch control signal for separating the combined signal into the JPEG image data and the audio data. It is assumed that the combined signal is stored in order of a header, JPEG image data and audio or speech data.

The header analyzer 250 analyzes headers of the combined data and controls the A/V switch 261 that is connected to a point (5) or (6). The image buffer 272 controls the speech input switch 263 that is connected to a point (1) or (2). The JPEG image data output from the memory 30 is stored in the image buffer 272 through the switch 261. At this time, the header analyzer 250 controls the switch 261 so that it switches the JPEG image data of one frame to the point (6) and the JPEG image data is applied to the image buffer 272. Thus, the JPEG image data is stored in the image buffer (1 mg_Buf) 272. When the output of the JPEG image data from the memory 30 is terminated, the header analyzer 250 enables the A/V switch 261 to connect to the point (5). At this time, the switch 263 connects to the point (1), and the audio data output from the memory 30 is stored in the first audio buffer (Aud_Buf1) 274.

The image buffer (Img_Buf) 272 applies the buffered JPEG image data to the image codec 80, and enables the speech output switch 265 to connect to the point (3). The audio data is output from the first audio buffer (Aud_Buf1) 274 to the audio codec 85. The image codec 80 decodes the JPEG image data and then outputs the decoded image data to the display unit 60. The audio codec 85 decodes the coded audio data and then outputs the decoded audio data to the speaker.

Then, when combined data of a subsequent frame is output from the memory 30, the header analyzer 250 enables the switch 261 to connect to the point (6). When the buffered JPEG image data is completely output from the image buffer 272, the image buffer 272 enables the switch 263 to connect to the point (2). When the JPEG image data of the subsequent frame output from the memory 30 is buffered in the image buffer 272 and the buffered JPEG image data is completely output as described above, the header analyzer 250 enables the A/V switch 261 to connect to the point (5). While the switch 263 connects to the point (2), the audio data output from the memory 30 is stored in the second audio buffer (Aud_Buf2). While the above-described operations are repeated, the combined data stored in the memory 30 is reproduced.

Figure 21:
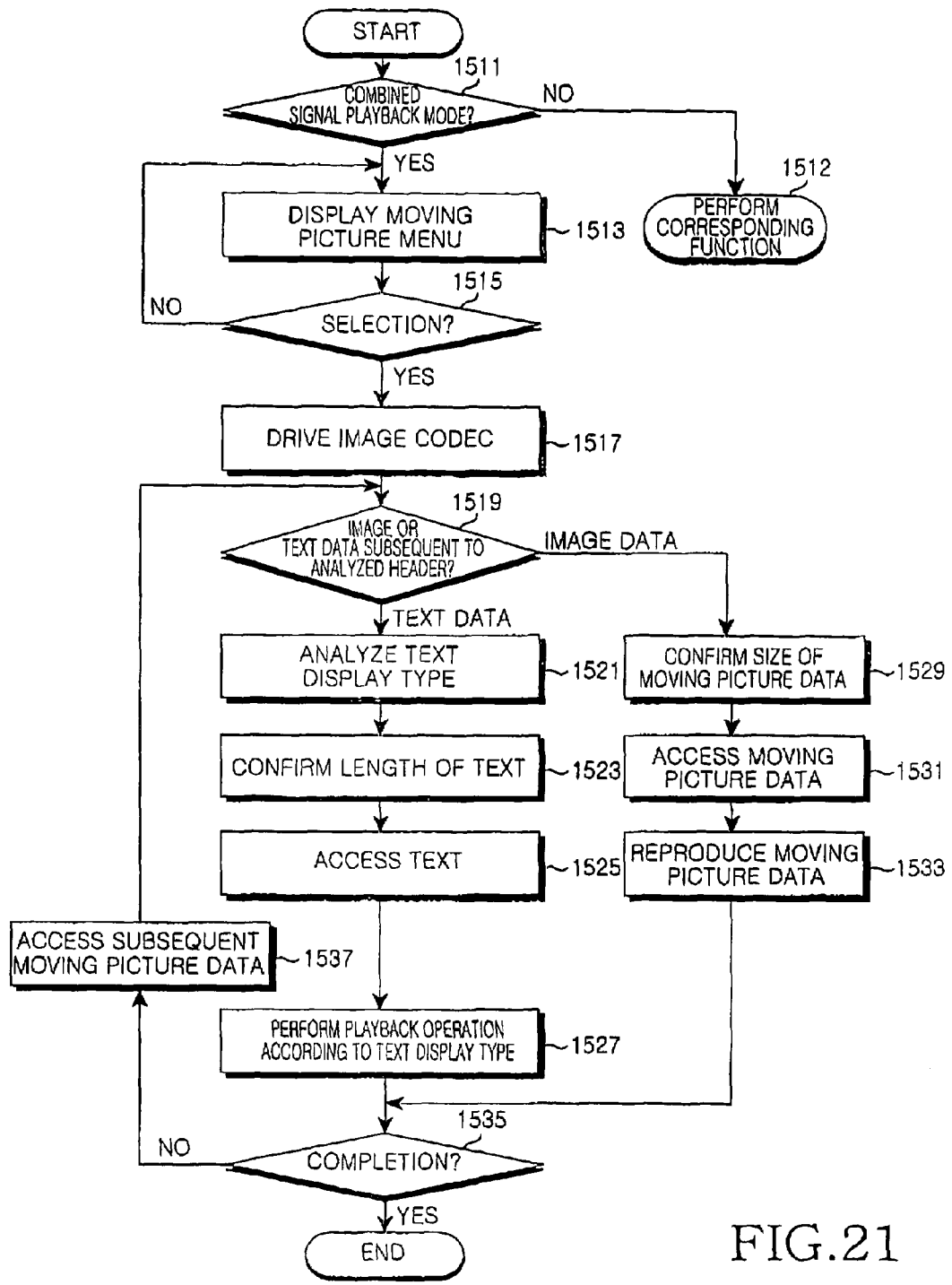
FIG. 21 is a flow chart illustrating a procedure for separating and reproducing a combined signal in which image and text signals are combined in accordance with another embodiment of the present invention.

FIG. 21 is a flow chart illustrating a procedure for reproducing a combined signal stored in the memory 30 in accordance with another embodiment of the present invention. It is assumed that the combined signal is a signal in which moving picture signals are combined with a text signal.

Referring to FIG. 21, when the user inputs a combined signal playback mode through the key input unit 27, and the controller 10 detects the input combined signal playback mode at step 1511 and enables the display unit 60 to display a moving picture menu at step 1513. If the input instructions are not detected, other corresponding functions are performed at step 1512. Information of the moving picture menu can contain a name of at least one moving picture or can contain the name of the moving picture, and a place and time of moving picture capture. When the user selects a desired moving picture while the moving picture menu is displayed, the controller 10 detects the selected moving picture at step 1515. The controller 10 drives the image codec 80 and accesses headers of a combined signal selected from the memory 30 at step 1517.

Then, the controller 10 analyzes the accessed combined signal's headers and separates the combined signal into JPEG image signals and a text signal at step 1519. If a text header is detected as a result of the header analysis, the controller 10 analyzes a text display type and text length at steps 1521 and 1523. Then, the controller 10 accesses the text signal at step 1525 and enables the display unit 60 to display the text signal based upon the text display type at step 1527. Then, if a moving picture header is detected as the result of the header analysis, the controller 10 confirms the moving picture header and a moving picture size at step 1529. Upon accessing the moving picture signal at step 1531, the controller 10 sends the accessed moving picture signals to the image codec 80 at step 1533. The image codec 80 decodes the JPEG image signal to obtain an original image signal and the image processor 50 scales the decoded JPEG image data on the basis of a size of the display unit 60 so that the display unit 60 can output and display the scaled decoded JPEG image data. When the playback operation for moving picture signals is completed, the procedure shown in FIG. 21 is terminated.

If the text display type is a top display type, the controller 10 enables the display unit 60 to first display the text signal, and then consecutively accesses moving picture signals to output the consecutively accessed moving picture signals to the image codec 80. After first displaying the text signal, the display unit 60 displays consecutively received still-picture signals in the form of moving picture signals. On the other hand, if the text display type is a bottom display type, the controller 10 consecutively accesses the moving picture signals and outputs the consecutively accessed moving picture signals to the image codec 80. After the image signals are completely output, the text signal is output to the display unit 60. The display unit 60 consecutively receives and displays still-picture signals and then receives and displays the text signal. On the other hand, if the text display type is a slide display type, the image signal is output to the image codec 80 and the text signal is output to the display unit 60 during a time period decided by the above Equation 1. While the display unit 60 consecutively receives the still-picture signals and displays the consecutively received still-picture signal in the form of moving picture signals, the text signal is slid and displayed at a specific location of the display unit 60. On the other hand, if the text display type is a pile-up display type, the controller 10 outputs the image signal to the image codec 80 and simultaneously enables the set number of characters to be sent to the display unit 60 during a time period decided by the above Equation 2. Thus, while the display unit 60 consecutively receives the still-picture signals and displays the consecutively received still-picture signals in the form of moving picture signals, the preset number of characters output from the controller 10 is displayed at a specific location of the display unit 60.

Figure 22:
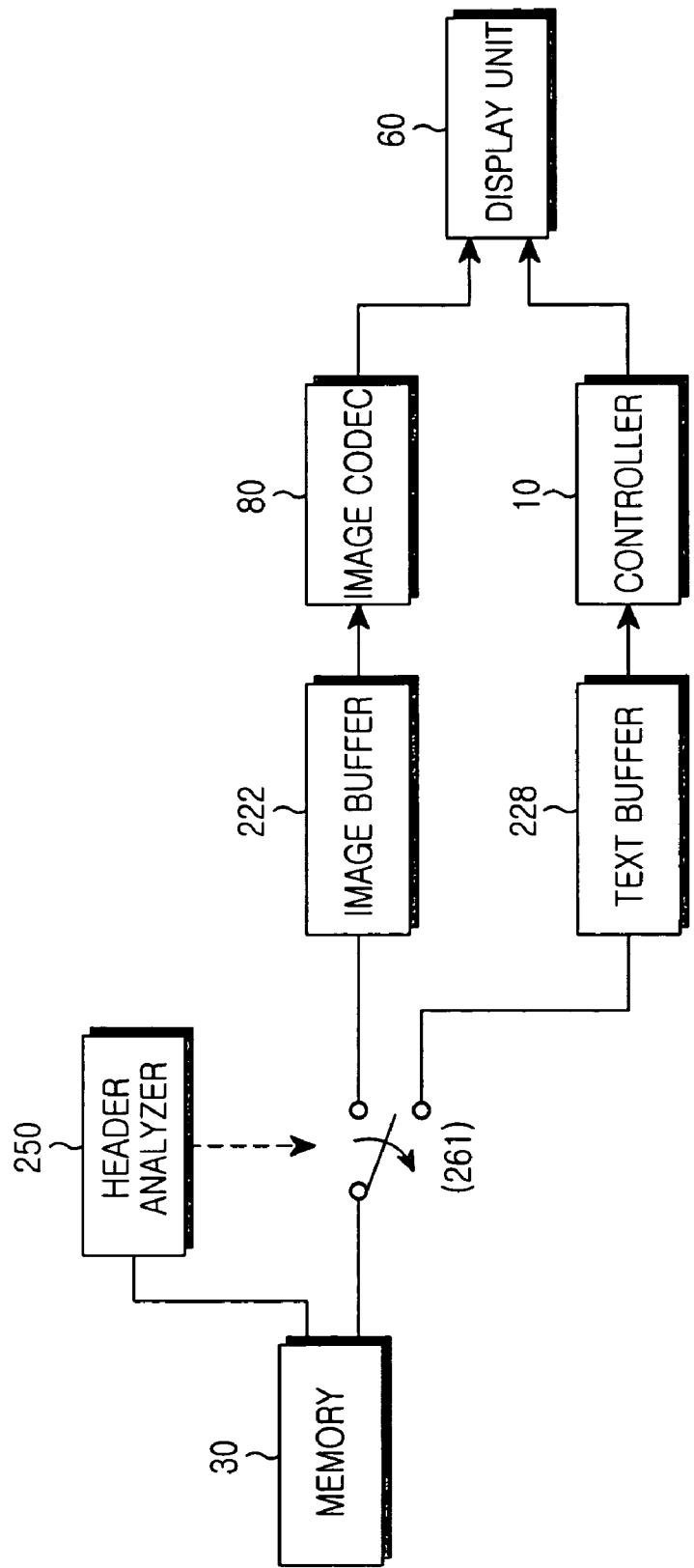
FIG. 22 is a schematic diagram illustrating components for reproducing the combined signal in which the image and text signals are combined in accordance with another embodiment of the present invention.

FIG. 21 shows the procedure for generating and storing a combined signal in the controller 10. The procedure shown in FIG. 21 can be implemented by the configuration shown in FIG. 22. FIG. 22 shows a block diagram illustrating components for reproducing the combined signal in the mobile phone.

Referring to FIG. 22, the memory 30 stores combined signals and the combined signals selected under the control of the controller 10 are accessed. A header analyzer 250 analyzes headers of a combined signal accessed in the memory 30 and generates a switch control signal for separating JPEG image signals and a text signal. A common terminal is connected between a switch 261 and the memory 30. The first output terminal of the switch 261 is connected to a text buffer 228, and the second output terminal of the switch 261 is connected to an image buffer 222. The image buffer 222 buffers the JPEG image signals output from the switch 261 and the text buffer 228 buffers the text signal output from the switch 261.

The header analyzer 250, the switch 261 and the buffers 222 and 228 perform a splitter function for separating the combined signal into the JPEG image signals and the text signal output from the memory 30. The image codec 80 decodes JPEG image data output from the image buffer 222 and outputs the decoded image data. Under the control of the controller 10, the display unit 60 displays the moving picture signals and the text signal according to the text display type.

Referring to FIG. 22, the memory 30 outputs at least one selected from the combined signals stored therein. The combined signal stored in the memory 30 contains a text signal with a text header shown in FIG. 14A and a JPEG image signal with an image header shown in FIG. 14B. When a moving picture playback mode is operated, the JPEG image signals and the text signal are separated from the combined signal to be reproduced. The header analyzer 250 analyzes a header of the text signal and headers of image signals from the combined signal shown in FIG. 14C that is output from the memory 30. When the header analysis operation is performed, the text header is configured as shown in FIG. 14A and the image header is configured as shown in FIG. 14B. If the combined signal is based upon the format shown in FIG. 14C, the header analyzer 250 detects the existence of a text signal by detecting a pattern signal of the text header and reads an "L" value subsequent to the pattern signal in order to confirm the length of the text signal. The switch 261 is controlled so that the output of the memory 30 is coupled to the text buffer 228. Then, the header analyzer 250 controls the memory 30 so that a text signal corresponding to the "L" value can be output. Thus, the text signal output from the memory 30 is applied to the text buffer 228, and the text signal buffered in the text buffer 228 is applied to the controller 10. Furthermore, if the image header is input, the header analyzer 250 detects the existence of a JPEG image signal by detecting a pattern signal of the image header and reads an "L" value subsequent to the pattern signal in order to confirm a size of the JPEG image signal. The switch 261 is controlled so that the output of the memory 30 is coupled to the image buffer 222. Then, the header analyzer 250 controls the memory 30 so that a JPEG image signal corresponding to the "L" value can be output. Thus, the JPEG image signal output from the memory 30 is applied to the image buffer 222, and the JPEG image signal buffered in the image buffer 220 is applied to the image codec 80. The JPEG image signal applied to the image codec 80 is based upon a frame size. The header analyzer 250 performs a control operation so that consecutive JPEG image signals based upon the frame size can be output.

Upon receiving the text signal, the controller 10 confirms information of the display type T of the text header. The controller 10 controls the image processor 50 so that the text signal and moving picture signals are reproduced according to the designated display type. FIG. 21 shows the method for enabling the controller 10 to control the image processor 50 and the display unit 60 so the text and moving picture signals can be reproduced.

Figure 23:
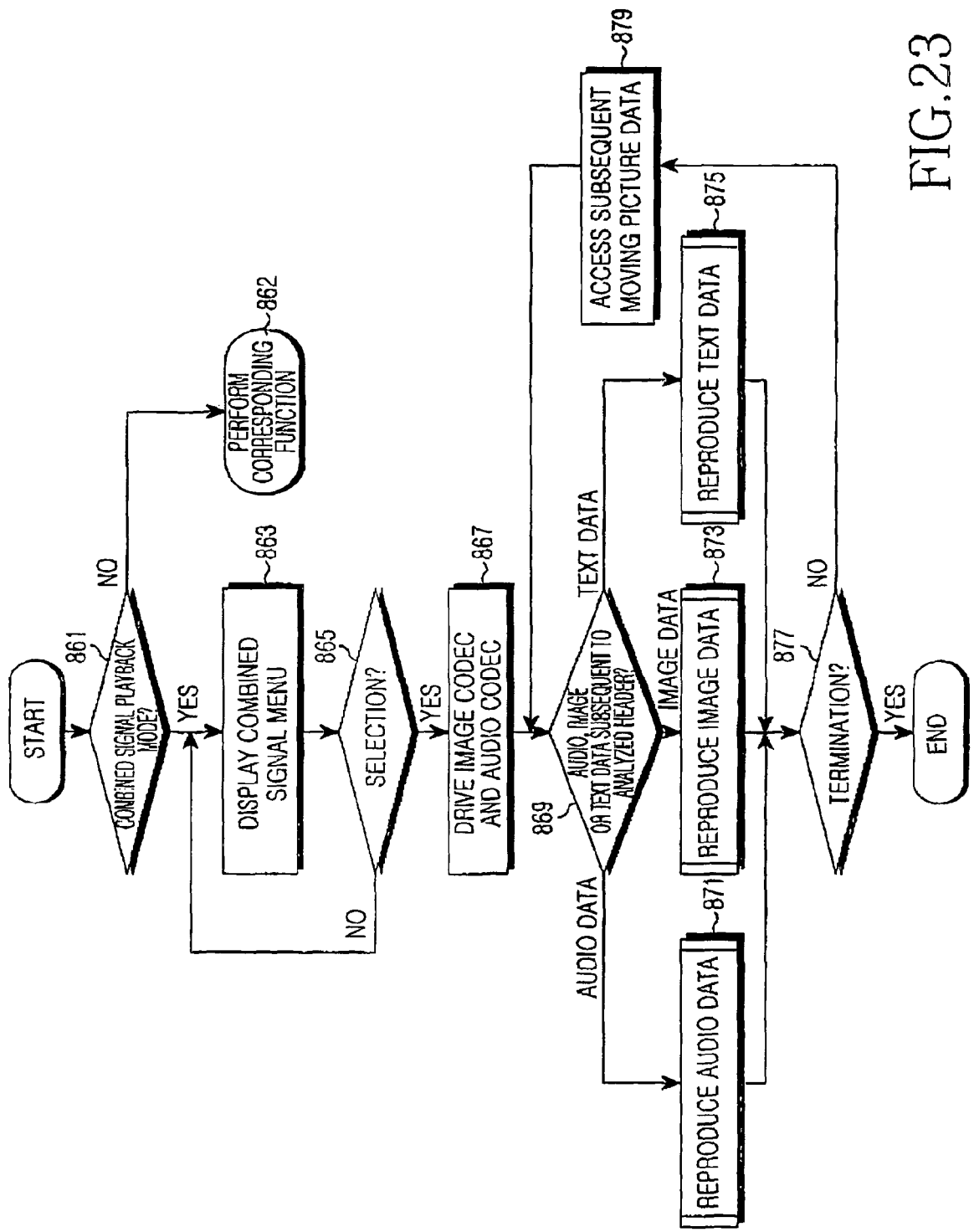
FIG. 23 is a flow chart illustrating a procedure for combining image, audio and text signals and reproducing a combined signal based upon the image, audio and text signals in accordance with another embodiment of the present invention.
Figure 24:
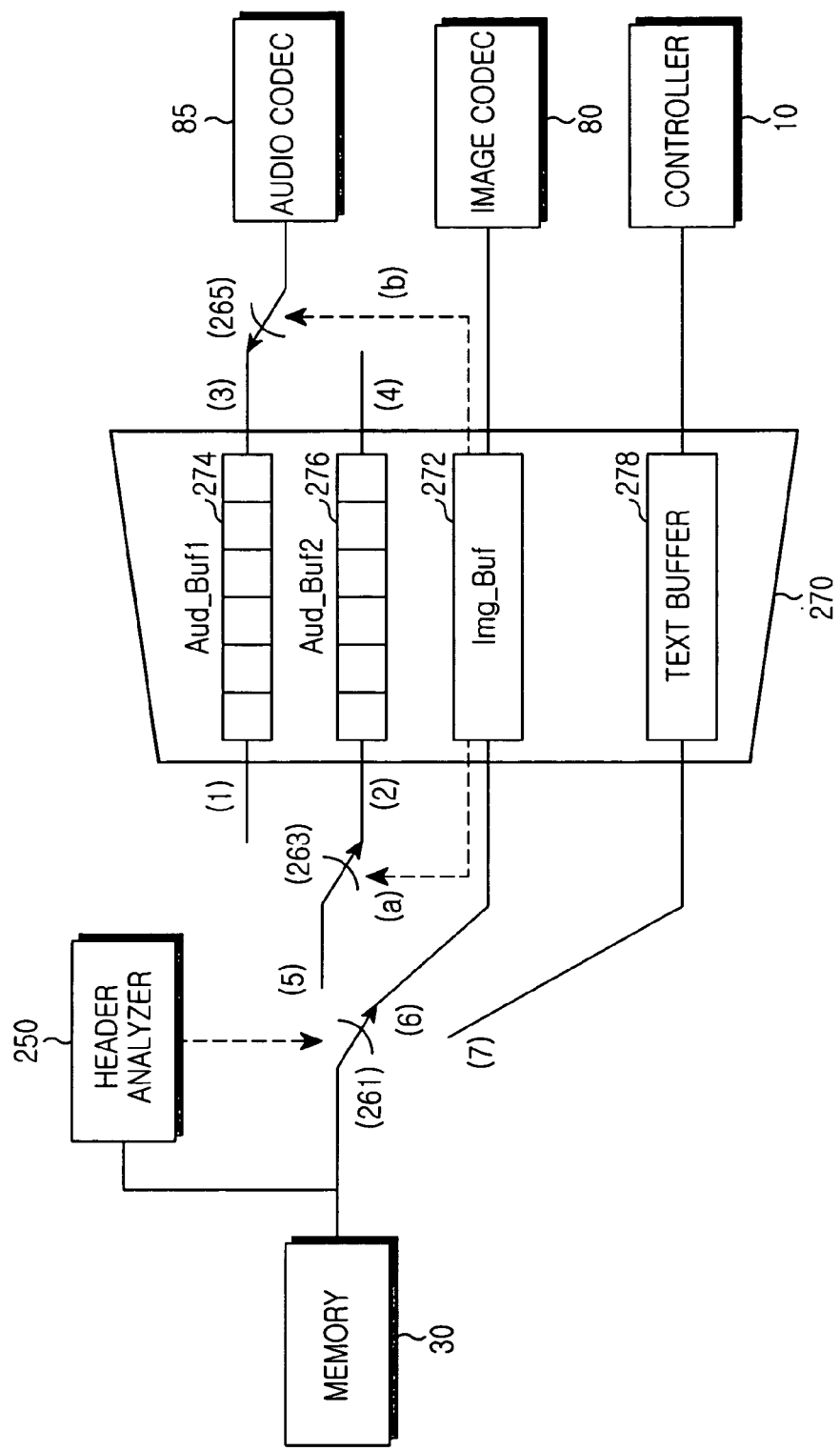
FIG. 24 is a block diagram illustrating components for combining the image, audio and text signals and reproducing the combined signal based upon the image, audio and text signals in accordance with another embodiment of the present invention.

FIG. 23 is a flow chart illustrating a procedure for reproducing moving picture signals combined with audio and text signals in accordance with another embodiment of the present invention. Furthermore, FIG. 24 is a block diagram illustrating components for an apparatus that reproduces a combined signal in which moving picture signals are combined with the audio and text signals.

Referring to FIG. 23, when a combined signal playback mode is input, the controller 10 detects the input combined signal playback mode at step 861, and displays a combined signal menu at step 863. If the input instructions are not detected, other corresponding functions are performed at step 862. A desired combined signal is selected while the combined signal menu is displayed, the controller 10 detects the selected combined signal at step 865, and drives the image codec 80 and the audio codec 85 at steps 867. At this time, information of the selected combined signal is accessed.

The controller 10 analyzes headers of the accessed combined signal and separates JPEG image data and audio data from the analyzed combined signal at step 869. Then, upon detecting the JPEG image data, the controller 10 outputs the JPEG image data to the image codec 80 so that the JPEG image data can be displayed at step 873. Upon detecting the audio data, the controller 10 outputs the audio data to the audio codec 85 so that the audio data can be reproduced at step 871. Upon detecting the text data, the controller 10 outputs the text data to the display unit 60 so that the text data can be displayed at step 875.

After the controller 10 accesses a combined signal of a subsequent frame at step 879, the operations of the above-described steps 869 to 875 are repeatedly performed. Thus, the combined signals are consecutively reproduced through the display unit 60 and the speaker. The combined signals are reproduced in the form of moving pictures. When a combined signal of the last frame stored in the memory 30 is reproduced or a playback stop command is input from the user, the controller 10 detects the reproduced last frame or the received playback stop command and terminates the combined signal playback mode at step 877.

FIG. 24 is a block diagram illustrating components of an apparatus for generating and storing a combined signal in the mobile phone according to the procedure shown in FIG. 23. As the components shown in FIG. 24, a header analyzer 250, switches 261, 263 and 265 and a buffer unit 270 can be included in the controller 10.

Referring to FIG. 24, the header analyzer 250 analyzes combined signals stored in the memory 30. The header analyzer 250 analyzes a text header and image headers contained in a combined signal accessed in the memory 30 and generates a switch control signal for separating a text signal, JPEG image signals and audio signals from the combined signal. A common terminal is connected between the switch 261 and the memory 30. The first output terminal of the switch 261 is connected to a common terminal for the switch 263 switching the audio signal, the second output terminal of the switch 261 is connected to an image buffer 272, and the third output terminal of the switch 261 is connected to a text buffer 278. The text buffer 278 provided in the buffer unit 270 buffers a text signal output from the switch 261. The image buffer (1 mg_Buf) 272 provided in the buffer unit 270 buffers JPEG image data output from the switch 261. The first and second audio buffers (Aud_Buf) 274 and 276 buffer coded audio data. The common terminal for the switch 263 is connected to the first output terminal of the switch 261. The first output terminal of the switch 263 is connected to an input terminal of the first audio buffer 274, and the second output terminal of the switch 263 is connected to an input terminal of the second audio buffer 276. Furthermore, the first input terminal of the switch 265 is connected to an output terminal of the first audio buffer 274 and the second input terminal of the switch 265 is connected to an output terminal of the second audio buffer 276. A common terminal is connected between the switch 265 and the audio codec 85. The switches 263 and 265 are controlled by an output of the image buffer 272. The audio codec 85 decodes coded audio signals output from the switch 265 and outputs the decoded audio signals. The image codec 80 decodes JPEG image data output from the image buffer 272 and outputs the decoded image data.

The operations of the components shown in FIG. 24 will now be described. The header analyzer 250 reads a predetermined size of a combined signal stored in the memory 30 and analyzes headers of the combined signal. If a header's pattern signal indicates a text pattern, the header analyzer 250 couples the switch 261 to the text buffer 278. On the other hand, if a header's pattern signal indicates an image pattern, the header analyzer 250 couples the switch 261 to the image buffer 272. On the other hand, if the header's pattern signal indicates an audio pattern, the header analyzer 250 couples the switch 263 to the audio buffer 274 or 276. The image buffer 272 controls the switches 263 and 265 at a frame interval. When the first audio buffer 274 buffers an audio signal, the image buffer 272 allows the audio data stored in the second audio buffer 276 to be output. Alternatively, when the second audio buffer 276 buffers audio signals, the image buffer 272 allows the audio data stored in the first audio buffer 274 to be output.

As the header analyzer 250 performs the analysis operation for the combined signal, a text signal, moving picture signals and audio signals are separated so that the separated signals are applied to the controller 10, the image codec 80 and the audio codec 85 so that the separated signals can be reproduced.

Figure 25:
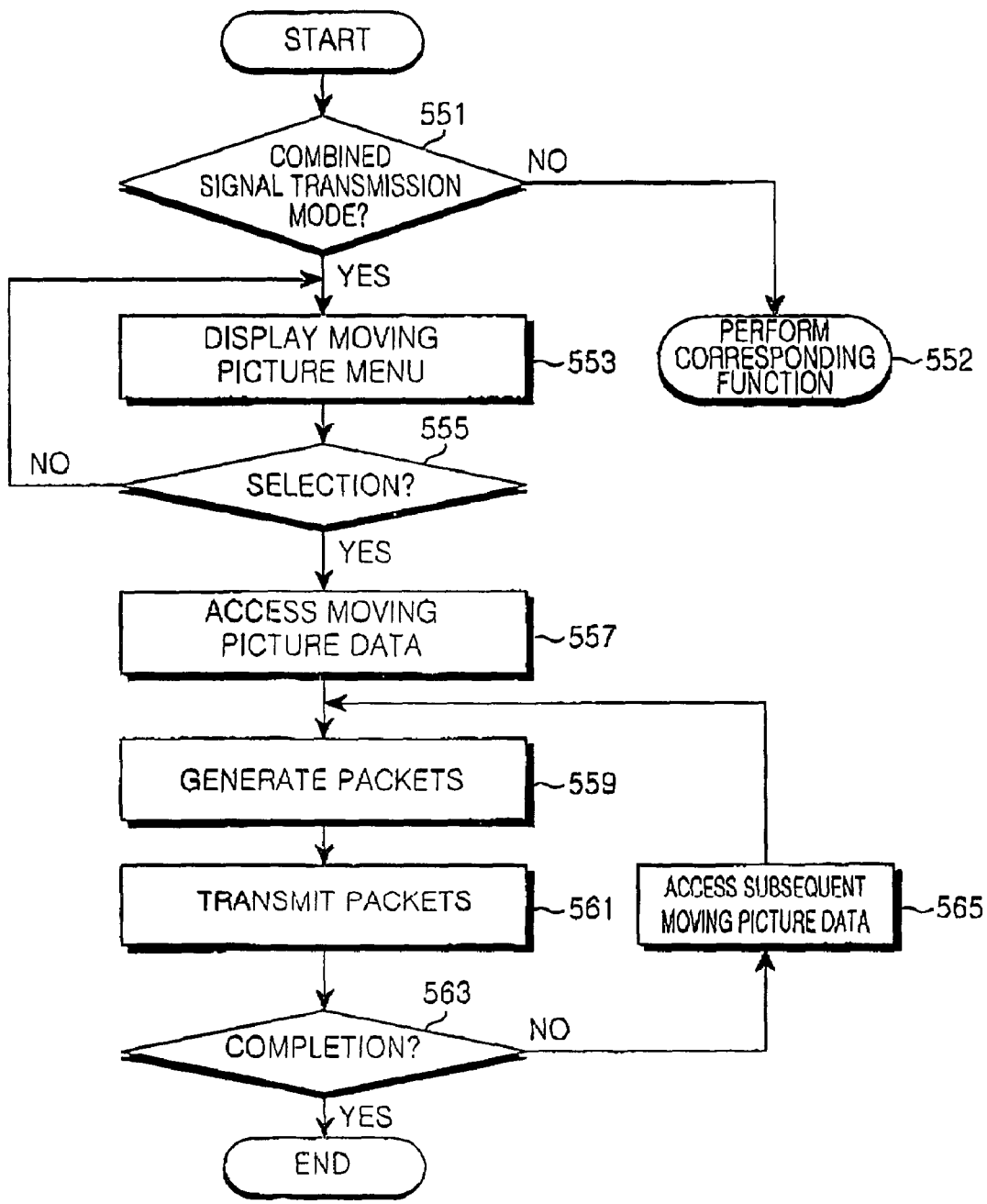
FIG. 25 is a flow chart illustrating a procedure for generating and transmitting a combined signal in the form of packets in accordance with another embodiment of the present invention.

FIG. 25 is a flow chart illustrating a procedure for transmitting a combined signal. The combined signal transmitted by the configuration shown in FIG. 13 can be a combined signal stored in the memory 30 through the procedure shown in FIG. 7, 8, 11, 12, 15 or 16. Furthermore, the combined signal transmitted by the procedure shown in FIG. 25 can be a combined signal in which moving picture signals are combined with a text signal and/or audio signals. As soon as the procedure for generating the combined signal is performed, the procedure shown in FIG. 25 can be performed.

Referring to FIG. 25, when the user inputs a combined signal transmission command through the key input unit 27, the controller 10 detects the input combined signal transmission command at step 551 and enables the display unit 60 to display a combined signal menu at step 553. If the input instructions are not detected, other corresponding functions are performed at step 552. The combined signal menu can contain information indicating the names of combined signals stored in the memory 30 or information indicating the names of the combined signals and place and time information of image capture associated with the combined signals. When the user selects a desired combined signal while the combined signal menu is displayed, the controller 10 detects the selected combined signal at step 555 and accesses a corresponding combined signal stored in the memory 30 at step 557.

The controller 10 segments the accessed combined signal so that the segmented combined signal can be transmitted in the form of packet data. A size of the packet data is fixed in predetermined length N, and image data of one frame can be divided into a plurality of packets. Furthermore, image/audio data can be mixed in one packet. The packet data is transmitted through the data processor 20. The data processor 20 carries out a channel coding and modulation operation for the received packet data and outputs a result of the channel coding and modulation operation. The RF module 23 converts the result of the channel coding and modulation operation into a radio signal and transmits the radio signal. When a packet transmission operation for the combined data is completely performed, the controller 10 repeats the operation for accessing combined data of a subsequent frame at step 565, generating packet data at step 559 and transmitting the packet data at step 561.

FIG. 25 shows the procedure for transmitting the combined data stored in the memory 30 as described above. When the combined data is generated and the generated combined data is stored in the memory 30 while the procedures shown in FIGS. 7 and 8 are performed, the generated combined data can be transmitted. In this case, the controller 10 enables the memory 30 to store combined data of one frame. The combined data can be transmitted in the form of packet data.

Figure 26:
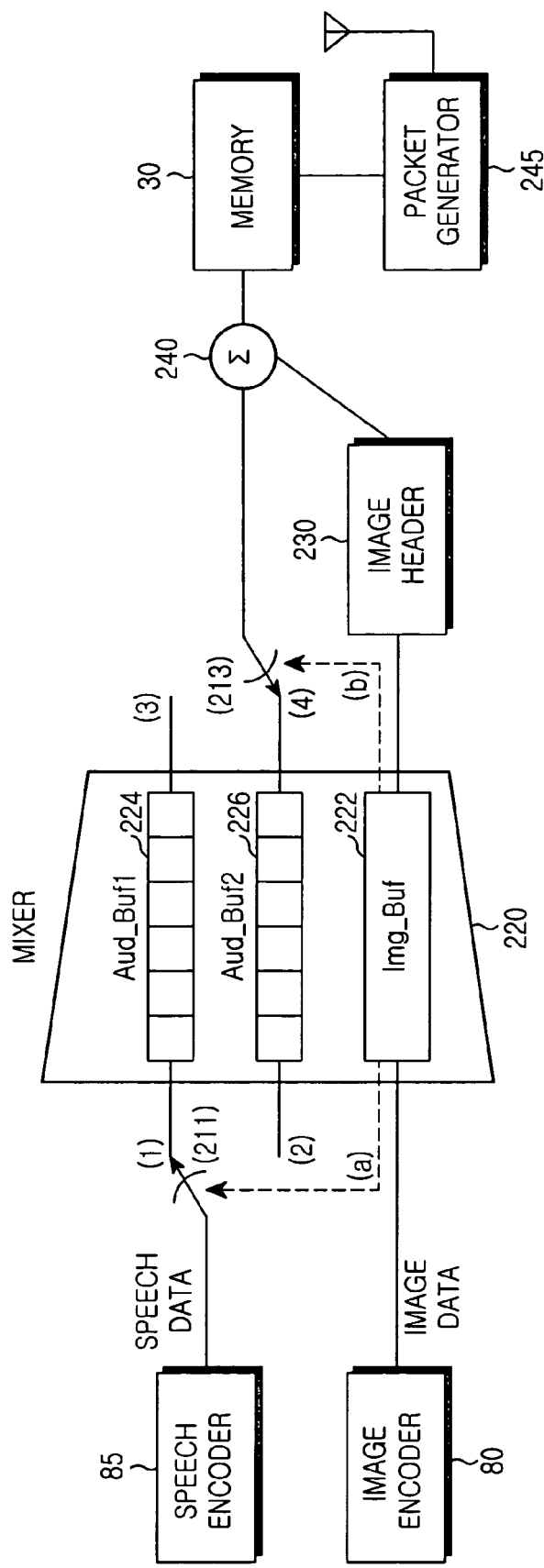
FIG. 26 is a block diagram illustrating components for generating and transmitting the combined signal in the form of the packets in accordance with another embodiment of the present invention.

FIG. 26 is a block diagram illustrating components for storing a combined signal and simultaneously transmitting the combined signal in the mobile phone. As the components shown in FIG. 26, a buffer unit 220, switches 211 and 213, a header generator 230, a combiner 240 and a packet generator 245 can be constituted in the controller 10. FIGS. 27A to 27E show formats of packet data for transmitting combined data.

A transmitter provided in the mobile phone shown in FIG. 9 combines or merges coded still pictures (JPEG images) consecutively output from the image codec or image encoder 80 and coded audio signals consecutively output from the audio codec or speech encoder 85 and stores a merged or combined signal. When the merged or combined signal is transmitted, the transmitter attaches predetermined format-based headers to the merged or combined signal and carries out a packetizing operation. Packet data for transmitting the coded audio data and JPEG image data is shown in FIGS. 27A to 27E.

Figure 27A:
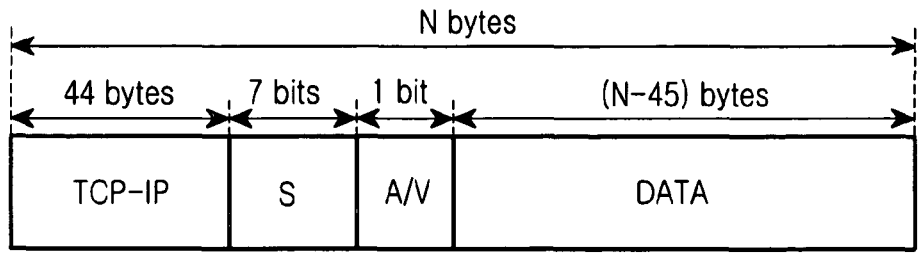
FIGS. 27A to 27E are block diagrams illustrating formats of the packets based upon the combined signal to be transmitted.

FIG. 27A shows the format of a packet based upon combined data transmitted through the RF module 23. The total size N of combined data of one frame can be decided, if necessary, and the total size N can be set within the range of approximately 200~1500 bytes. The length of a packet to be transmitted must be constant in every packet. Referring to the packet format, a TCP/IP header of 44 bytes and a sequence number S of 7 bits can be contained within the packet. The sequence number S indicates a sequence of generated packets. The sequence number may have one of a value 0 to a value 127. After the sequence number of the value 127, the sequence number of the value 0 is newly selected. A 1-bit A/V value subsequent to the sequence number S indicates whether the first data of a corresponding packet is audio or JPEG image data.

Figure 27B:
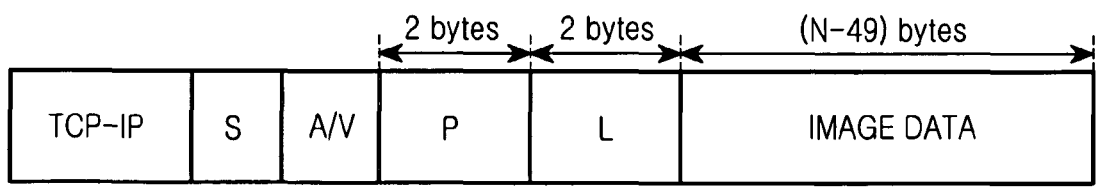
Figure 27C:
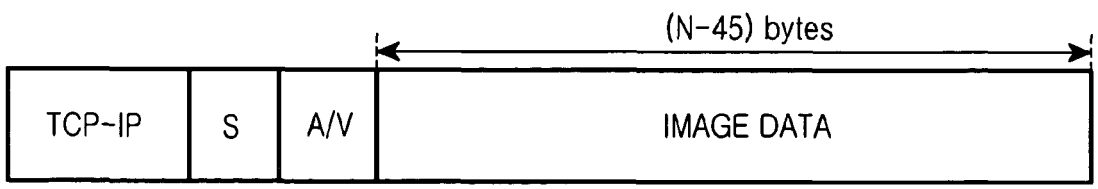

FIGS. 27A to 27C show JPEG image data formats. In the case of the JPEG image data, the size of one frame is set within the range of 5~10 Kbytes. In accordance with the embodiment of the present invention, the image data length of one frame is longer than that of packet data to be transmitted through the RF module 23. Thus, the JPEG image data of one frame must be transmitted through a plurality of packets. The first packet of the JPEG image data contains P and L values of the image header as shown in FIG. 27B. In FIG. 27B, the P value indicates a pattern signal used for discriminating audio data and JPEG image data in a receiver receiving packet data. In FIG. 27B, the L value indicates the total size of a JPEG image frame. The L value is used for reading JPEG image data corresponding to the L value after the receiver detects JPEG image data through the pattern signal. When the received and buffered data corresponds to the L value while the receiver consecutively receives and buffers data, the received JPEG image data is applied to the image codec 80 so that it can be decoded and reproduced. FIG. 27C shows the remaining packet format after the first packet of JPEG image data of one frame is transmitted. The remaining packet can be filled with JPEG image data without an image header.

Figure 27D:
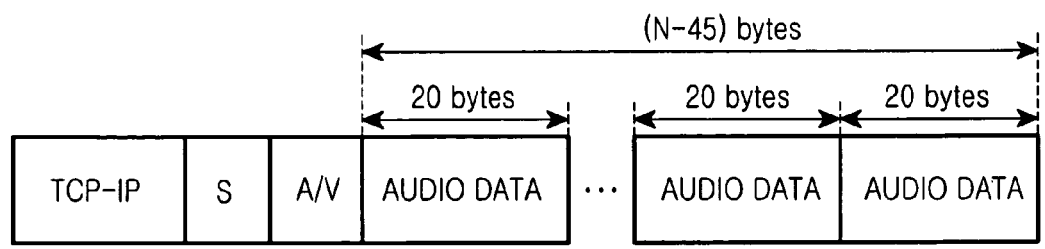
Figure 27E:
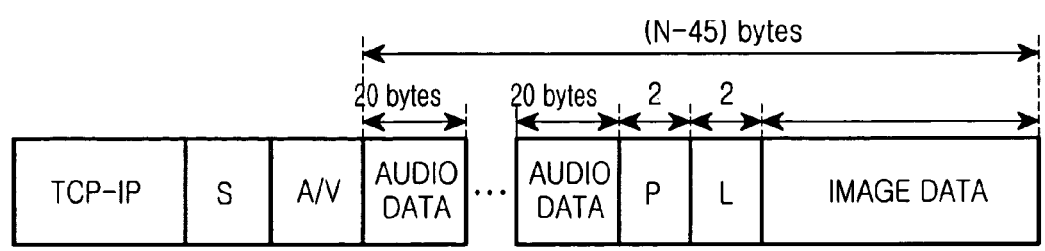

FIG. 27D shows an audio data format. In the embodiment of the present invention, it is assumed that the audio codec 85 is an 8 Kbps speech codec. Where the audio codec 85 is the 8 Kbps speech codec, coded audio data of one frame (20 bytes) is generated every 20 msec. At this time, until N−45 bytes corresponding to the maximum size of data are assembled in one packet, a plurality of coded audio frame data units are consecutively coupled to one another so that an audio packet can be generated. For example, where N is 200, a plurality of audio data units corresponding to 17 frames and a 3/4 frame (15 bytes) are assembled, such that one packet can be generated. Since the JPEG image data is typically inserted between the audio frames, a format in which audio data and JPEG image data are mixed is generated as shown in FIG. 27E.

Components for generating a combined signal in FIG. 26 include the audio codec 85, the image codec 80, the switches 211 and 213, the buffer unit 220, the header generator 230 and the combiner 240 as shown in FIG. 9. The operations of components for generating a combined signal in FIG. 26 are the same as those of the components shown in FIG. 9. FIG. 26 further includes a packet generator 245. The components shown in FIG. 26 perform a function of transferring the generated combined signal.

Referring to FIG. 26, audio data and JPEG image data are coded by the audio codec 85 and the image codec 80, respectively. The coded audio data and image data are input into the buffer unit 220 via corresponding paths. In the embodiment of the present invention, it is assumed that the first input of a moving picture mail is fixed to JPEG image data. The buffer unit 220 includes two audio buffers 224 and 226 and one image buffer 222. The procedure for generating a combined signal is the same as that shown in FIG. 9.

At the first step, JPEG image data of one frame is input into an image buffer (1 mg_Buf) 222. At the second step, the switch 211 is connected to a point (1) and coded audio data is input into the first audio buffer (Aud_Buf1) 224. At the third step, when the image buffer 222 is filled with JPEG image data of one frame, an image header is inserted into the JPEG image data, and the JPEG image data having the inserted image header is transmitted to the following stage. The header can contain a pattern signal P indicating the existence of JPEG image data and a length signal L indicating the length of JPEG image data. At the fourth step, the switch 211 is connected to a point (2) through a path (a). At the fifth step, the switch 213 is connected to a point (3) through a path (b). At the sixth step, the audio data output from the audio codec 85 is stored in the second audio buffer (Aud_Buf2) 226. At the seventh step, the audio data buffered in the first audio buffer (Aud_Buf1) 224 is transmitted to the following stage. At the eighth step, the operation returns to the first step and the above-described steps are repeatedly performed. At this time, the switches 211 and 213 can be connected to points different from the previous points.

The JPEG image data and audio data are sequentially generated and combined and a result of the combining operation based upon a format shown in FIG. 10B is stored in the memory 30. The packet generator 245 generates packets based upon the combined data stored in the memory 30 as shown in FIG. 27A to 27E and then the generated packets are transmitted through the data processor 20 and the RF module 23.

The combined data stored in the memory 30 contains image headers, JPEG image data and audio data as shown in FIG. 10B. The combined data is transmitted through a plurality of packets. After generating the packets from the combined data shown in FIG. 10B, the packet generator 245 inserts a TCP/IP header, a sequence number and an A/V bit into each data packet and arranges packet data after them. The TCP/IP header is located at the head of the packet data. It is assumed that the TCP/IP header consists of 44 bytes in the embodiment of the present invention. The sequence number indicates a sequence of generated packets. It is assumed that the sequence number consists of 7 bits. The sequence number may have one of a value 0 to a value 127. After the sequence number of the value 127, the sequence number of the value 0 is newly selected. The A/V bit indicates whether the first data of a corresponding packet is JPEG image data or audio data. It is assumed that the A/V bit is 1 bit. The TCP/IP header, the sequence number and the A/V bit are located at the head of every packet. It is assumed that the TCP/IP header, the sequence number and the A/V bit consist of 45 bytes in the embodiment of the present invention.

As shown in FIG. 27B, the combined data contains JPEG image data of one frame and audio data subsequent to the JPEG image data generated during one frame interval. Thus, the packet generator 245 generates JPEG image packet data and then generates audio packet data.

FIGS. 27B and 27C show formats of JPEG image data. The size of the JPEG image data of one frame corresponds to approximately 5~10 Kbytes. The image data of one frame is larger than one packet. The JPEG image data of one frame is constituted by a plurality of packets. Thus, the first frame of the JPEG image data contains an image header after the TCP/IP header, the sequence number and the A/V bit. Here, the image header includes a pattern signal P for discriminating audio data and JPEG image data and a length signal L indicating the total size of frame image data. After the receiver determines the existence of JPEG image data through the pattern signal P, and reads JPEG image data corresponding to the length signal L. FIG. 27C shows a format of packet data of the second packet or another packet subsequent to the first packet of the JPEG image data. The second packet or another packet can consist of JPEG image data without the image header.

After image packets shown in FIGS. 27B and 27C are generated and assembled, audio data is generated and assembled in the form of an audio packet shown in FIG. 27D. In this case, where the audio codec 85 is an 8 Kbps speech codec, audio data of one frame is generated every 20 msec. The packet generator 245 generates an audio packet in which audio frames are consecutively coupled to one another until the maximum length of N−45 bytes is assembled within one packet. When image and audio data units are packetized, packet data generated during frame boundary intervals can be assembled within one packet of audio and image data. In this case, the packet generator 245 can generate packet data as shown in FIG. 27E.

The data processor 20 carries out a channel coding and modulation operation for packet data generated by the packet generator 245 and a result of the channel coding and modulation operation is transmitted through the RF module 23.

It is assumed that a method for transmitting combined data generated in FIG. 26 transmits the combined data while generating the combined data. After the operations shown in FIGS. 7 and 9 are performed in the method, desired combined data is selected from combined data units stored in the memory 30 and the selected combined data is transmitted during the procedure shown in FIG. 25.

Figure 28:
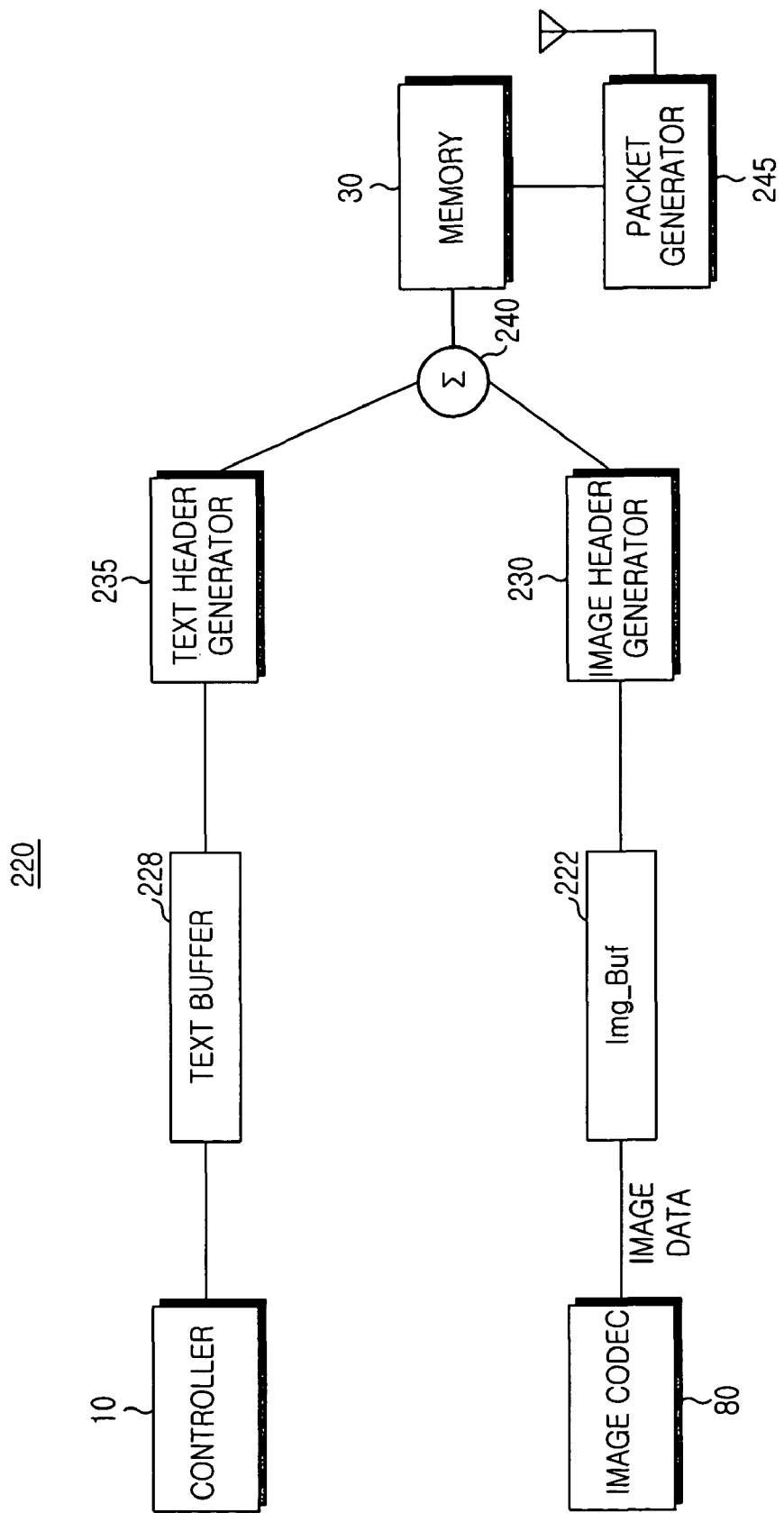
FIG. 28 is a block diagram illustrating components for generating and transmitting a combined signal in which text and moving picture signals are combined, in the form of packets in accordance with another embodiment of the present invention.
Figure 29A:
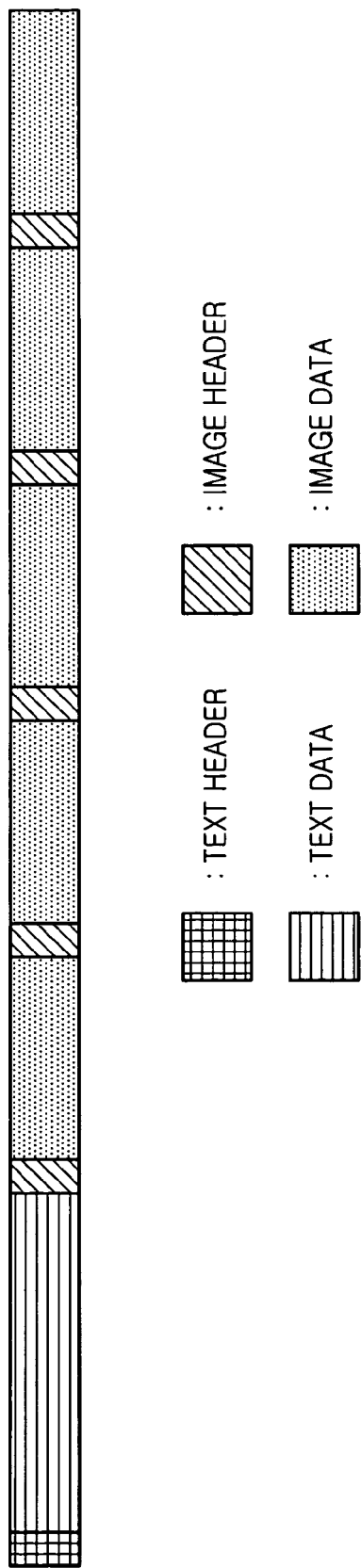
FIGS. 29A and 29B are block diagrams illustrating formats of the packets based upon the combined signal to be transmitted.
Figure 29B:
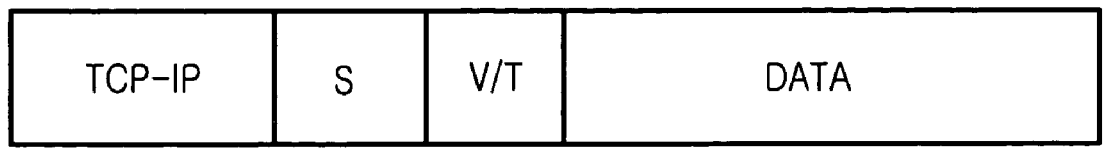

FIG. 28 is a block diagram illustrating components for generating, storing and transmitting combined signals in the mobile phone. As the components shown in FIG. 28, a buffer unit 220, switches 211 and 213, an image header generator 230, a text header generator 235, a combiner 240 and a packet generator 245 can be constituted in the controller 10. Furthermore, FIGS. 29A and 29B show a combined signal format and a transmission packet data format.

A transmitter provided in the mobile phone shown in FIG. 28 combines or merges coded still pictures (JPEG images) consecutively output from the image codec or image encoder 80 and coded audio signals consecutively output from the audio codec or speech encoder 85 and stores a merged or combined signal. When the merged or combined signal is transmitted, the transmitter attaches predetermined format-based headers to the merged or combined signal and carries out a packetization operation. A result of the packetization operation is transmitted.

Referring to FIG. 28, a screen image signal is coded by the image codec 80, and the coded image signal is input into the image buffer 222. The image header generator 230 generates an image header based upon the frame size and couples a corresponding screen image signal to the image header.

Then, the controller 10 calculates a playback time required for reproducing currently stored JPEG image signals and enables the display unit 60 to display the maximum length of a text signal. After confirming the maximum length of the text signal, the user inputs the text signal to be contained in the combined signal through the key input unit 27. The text signal is buffered in the text buffer 228, and the text header generator 235 generates a text header containing information indicating a text display type designated by the user and information indicating the length of the input text. The text header is inserted into the buffered text and the buffered text with the inserted text header is applied to the combiner 240. The combiner 240 combines consecutive JPEG image signals stored in the memory 30 with the text signal to generate the combined signal shown in FIG. 29A. At this time, the combining method arranges the text signal before a moving picture signal. The generated combined signal shown in FIG. 29A is stored in the memory 30.

The packet generator 245 generates a plurality of packets based upon the stored combined data, and the packets are transmitted through the data processor 20 and the RF module 23.

The procedure for transmitting a combined signal in which the text signal and the moving picture signals are combined will be described. First, the combined data stored in the memory 30 contains a text header, a text signal, image headers and JPEG image signals as shown in FIG. 29A. The combined data is transmitted through a plurality of packets. After generating the packets from the combined data shown in FIG. 29A, the packet generator 245 inserts a packet header consisting of a TCP/IP header, a sequence number and A/V/T bits into each data packet shown in FIG. 29B and arranges packet data after the packet header. The TCP/IP header is located at the head of the packet data. It is assumed that the TCP/IP header consists of 44 bytes in the embodiment of the present invention. The sequence number indicates a sequence of generated packets. It is assumed that the sequence number consists of 7 bits. The sequence number may have one of a value 0 to a value 127. After the sequence number of the value 127, the sequence number of the value 0 is newly selected. The A/V/T bits indicate whether the first data of a corresponding packet is text, JPEG image or audio data. It is assumed that the A/V/T bits are 2 bits. The TCP/IP header, the sequence number and the A/V/T bits are located at the head of every packet. It is assumed that the TCP/IP header, the sequence number and the A/V/T bits consist of 45 bytes in the embodiment of the present invention.

Figure 31A:
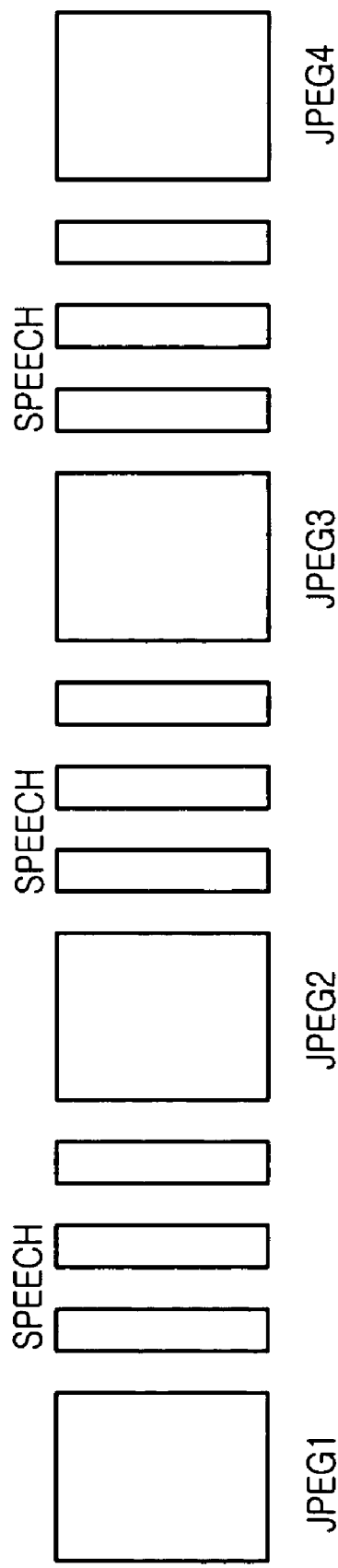
FIGS. 31A, 31B and 31C are block diagrams illustrating formats of the packets based upon the combined signal to be transmitted.

As shown in FIG. 31A, the combined signal contains a text signal and JPEG image data units of one frame subsequent to the text signal. Thus, the packet generator 245 first generates packet data of the text signal, and then generates packet data of JPEG image signals that are interlaced.

Figure 31B:
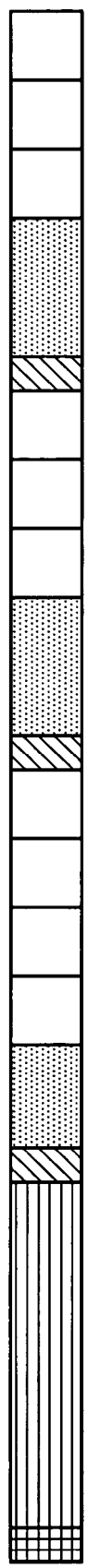

FIG. 31B shows the format of a packet based upon combined data transmitted through the RF module 23. The total size N of combined data of one frame to be transmitted can be decided, if necessary, and the total size N can be set within the range of approximately 200~1500 bytes. The size of a packet to be transmitted must be constant in every packet. Referring to the packet format, a TCP/IP header of 44 bytes and a sequence number S of 7 bits can be contained within the packet. The sequence number S indicates a sequence of generated packets. The sequence number may have one of a value 0 to a value 127. After the sequence number of the value 127, the sequence number of the value 0 is newly selected. A 1-bit A/V value subsequent to the sequence number S indicates whether the first data of a corresponding packet is audio or JPEG image data.

In the case of the JPEG image data, the size of one frame is set within the range of 5~10 Kbytes. In accordance with the embodiment of the present invention, the image data size of one frame is larger than that of packet data to be transmitted through the RF module 23. Thus, the JPEG image data of one frame must be transmitted through a plurality of packets. The first packet of the JPEG image data contains P and L values of the image header. The P value indicates a pattern signal used for discriminating audio data and JPEG image data in a receiver receiving packet data. The L value indicates the total size of a JPEG frame. The L value is used for reading JPEG image data corresponding to the L value after the receiver detects the existence of JPEG image data through the pattern signal. When the received and buffered data corresponds to the L value while the receiver consecutively receives and buffers data, the received JPEG image data is applied to the image codec 80 so that it can be decoded and reproduced. The remaining packet can be filled with JPEG image data without an image header after the first packet of JPEG image data of one frame is transmitted.

The data processor 20 carries out a channel coding and modulation operation for packet data units shown in FIG. 31B generated by the packet generator 245 and a result of the channel coding and modulation operation is transmitted through the RF module 23.

Figure 30:
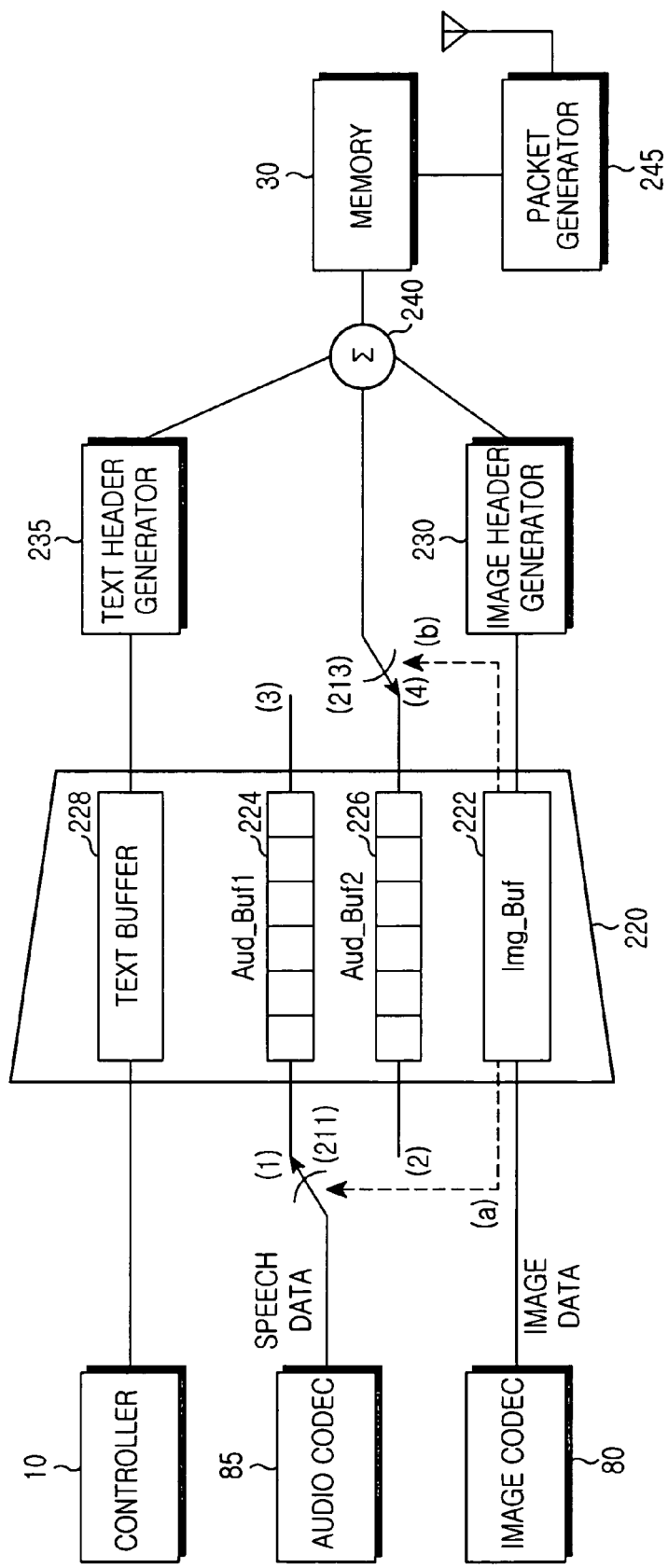
FIG. 30 is a block diagram illustrating components for generating and transmitting a combined signal in which text, audio and moving picture signals are combined, in the form of packets in accordance with another embodiment of the present invention.

FIG. 30 is a block diagram illustrating components for generating, storing and transmitting a combined signal in the mobile phone. As the components shown in FIG. 30, a buffer unit 220, switches 211 and 213, an image header generator 230, a text header generator 235, a combiner 240 and a packet generator 245 can be constituted in the controller 10. Furthermore, FIGS. 31A and 311B show a combined signal format and a transmission packet data format.

A transmitter provided in the mobile phone shown in FIG. 30 combines or merges coded still pictures (JPEG images) consecutively output from the image codec or image encoder 80 and coded audio signals consecutively output from the audio codec or speech encoder 85 and stores a merged or combined signal. When the merged or combined signal is transmitted, the transmitter attaches predetermined format-based packet headers to the merged or combined signal and carries out a packetization operation. A result of the packetization operation is transmitted.

Referring to FIG. 30, audio data and JPEG image data are coded by the audio codec 85 and the image codec 80, respectively. The coded audio data and image data are input into the buffer unit 220 via corresponding paths. In the embodiment of the present invention, it is assumed that the first input of moving picture mail is fixed as JPEG image data. The buffer unit 220 includes two audio buffers 224 and 226, one image buffer 222, and one text buffer 228.

The procedure for generating and transmitting a combined signal is as in the following.

At the first step, JPEG image data of one frame is input into an image buffer (Img_Buf) 222. At the second step, the switch 211 is connected to a point (1) and coded audio data is input into the first audio buffer (Aud_Buf1) 224. At the third step, when the image buffer 222 is filled with JPEG image data of one frame, an image header is inserted into the JPEG image data, and the JPEG image data having the inserted image header is transmitted to the following stage. The header can contain a pattern signal P indicating the existence of JPEG image data and a length signal L indicating the length of JPEG image data. At the fourth step, the switch 211 is connected to a point (2) through a path (a). At the fifth step, the switch 213 is connected to a point (3) through a path (b). At the sixth step, the audio data output from the audio codec 85 is stored in the second audio buffer (Aud_Buf2) 226. At the seventh step, the audio data buffered in the first audio buffer (Aud_Buf1) 224 is transmitted to the following stage. At the eighth step, the operation returns to the first step and the above-described steps are repeatedly performed. At this time, the switches 211 and 213 can be connected to points different from the previous points.

According to the above-described method, JPEG image data and audio data sequentially generated as shown in FIG. 31A are interlaced and combined, and a result of the interlac-ing and combining operation is temporarily stored in the memory 30. Then, the controller 10 calculates a playback time required for reproducing currently stored JPEG image signals and enables the display unit 60 to display the maximum length of a text signal. After confirming the maximum length of the text signal, the user inputs the text signal to be contained in the combined signal through the key input unit 27. The text signal is buffered in the text buffer 228, and the text header generator 235 generates a text header containing information indicating a text display type designated by the user and information indicating the length of the input text. The text header is inserted into the buffered text and the buffered text with the inserted text header is applied to the combiner 240. The combiner 240 combines a signal whose audio and JPEG image signals stored in the memory 30 are combined, with the text signal to generate a combined signal shown in FIG. 31B. The generated combined signal shown in FIG. 31B is stored in the memory 30. The packet generator 245 generates packets based upon the combined data stored in the memory 30 and then the generated packets are transmitted through the data processor 20 and the RF module 23.

Figure 31C:

The combined data stored in the memory 30 contains a text header, a text signal, an image header, JPEG image data and audio data as shown in FIG. 31B. The combined data is transmitted through a plurality of packets. After generating the packets from the combined data shown in FIG. 31B, the packet generator 245 inserts a packet header consisting of a TCP/IP header, a sequence number and A/V/T bits into each data packet and arranges packet data after the packer header as shown in FIG. 31C. The TCP/IP header is located at the head of the packet data. It is assumed that the TCP/IP header consists of 44 bytes in the embodiment of the present invention. The sequence number indicates a sequence of generated packets. It is assumed that the sequence number consists of 7 bits. The sequence number may have one of a value 0 to a value 127. After the sequence number of the value 127, the sequence number of the value 0 is newly selected. The A/V/T bits indicate whether the first data of a corresponding packet is text, JPEG image or audio data. It is assumed that the A/V/T bits are 2 bits. The TCP/IP header, the sequence number and the AN/T bits are located at the head of every packet. It is assumed that the TCP/IP header, the sequence number and the A/V/T bits consist of 45 bytes in the embodiment of the present invention.

As shown in FIG. 31B, the combined signal contains a text signal and JPEG image data of one frame and audio data for the one frame image data that are subsequent to the text signal. Thus, the packet generator 245 first generates packet data of the text signal, and generates packet data of audio and JPEG image signals that are interlaced.

FIG. 31C shows the format of a packet based upon combined data transmitted through the RF module 23. The total size N of combined data of one frame to be transmitted can be decided, if necessary, and the total size N can be set within the range of approximately 200~1500 bytes. The length of a packet to be transmitted must be constant in every packet. Referring to the packet format, a TCP/IP header of 44 bytes and a sequence number S of 7 bits can be contained within the packet. The sequence number S indicates a sequence of generated packets. The sequence number may have one of a value 0 to a value 127. Initially, a packet corresponding to the value 0 is inserted. A 1-bit A/V value subsequent to the sequence number S indicates whether the first data of a corresponding packet is audio or JPEG image data.

In the case of the JPEG image data, the length of one frame is set within the range of 5~10 Kbytes. In accordance with the embodiment of the present invention, the image data length of one frame is longer than that of packet data to be transmitted through the RF module 23. Thus, the JPEG image data of one frame must be transmitted through a plurality of packets. The first packet of the JPEG image data contains P and L values of the image header. The P value indicates a pattern signal used for discriminating audio data and JPEG image data in a receiver receiving packet data. The L value indicates the total length of a JPEG frame. The L value is used for reading JPEG image data corresponding to the L value after the receiver detects JPEG image data through the pattern signal. When the received and buffered data corresponds to the L value while the receiver consecutively receives and buffers data, the received JPEG image data is applied to the image codec 80 so that it can be decoded and reproduced. The remaining packet can be filled with JPEG image data without an image header after the first packet of JPEG image data of one frame is transmitted.

It is assumed that the audio codec 85 is an 8 Kbps speech codec. Where the audio codec 85 is the 8 Kbps speech codec, coded audio data of one frame (20 bytes) is generated every 20 msec. At this time, until N–45 bytes corresponding to the maximum size of data are assembled in one packet, a plurality of coded audio frame data units are consecutively coupled to one another so that an audio packet can be generated. For example, where N is 200, a plurality of audio data units corresponding to 17 frames and a ¾ frame (15 bytes) are assembled, such that one packet can be generated. Since the text signal is typically arranged at the head of the combined data and the JPEG image data is typically inserted between the audio frames, a format in which a set of the text signal and JPEG image data and a set of audio data and JPEG image data are mixed is generated as shown in FIG. 31B.

The data processor 20 carries out a channel coding and modulation operation for packet data units shown in FIG. 31B generated by the packet generator 245 and a result of the channel coding and modulation operation is transmitted through the RF module 23.

Figure 32:
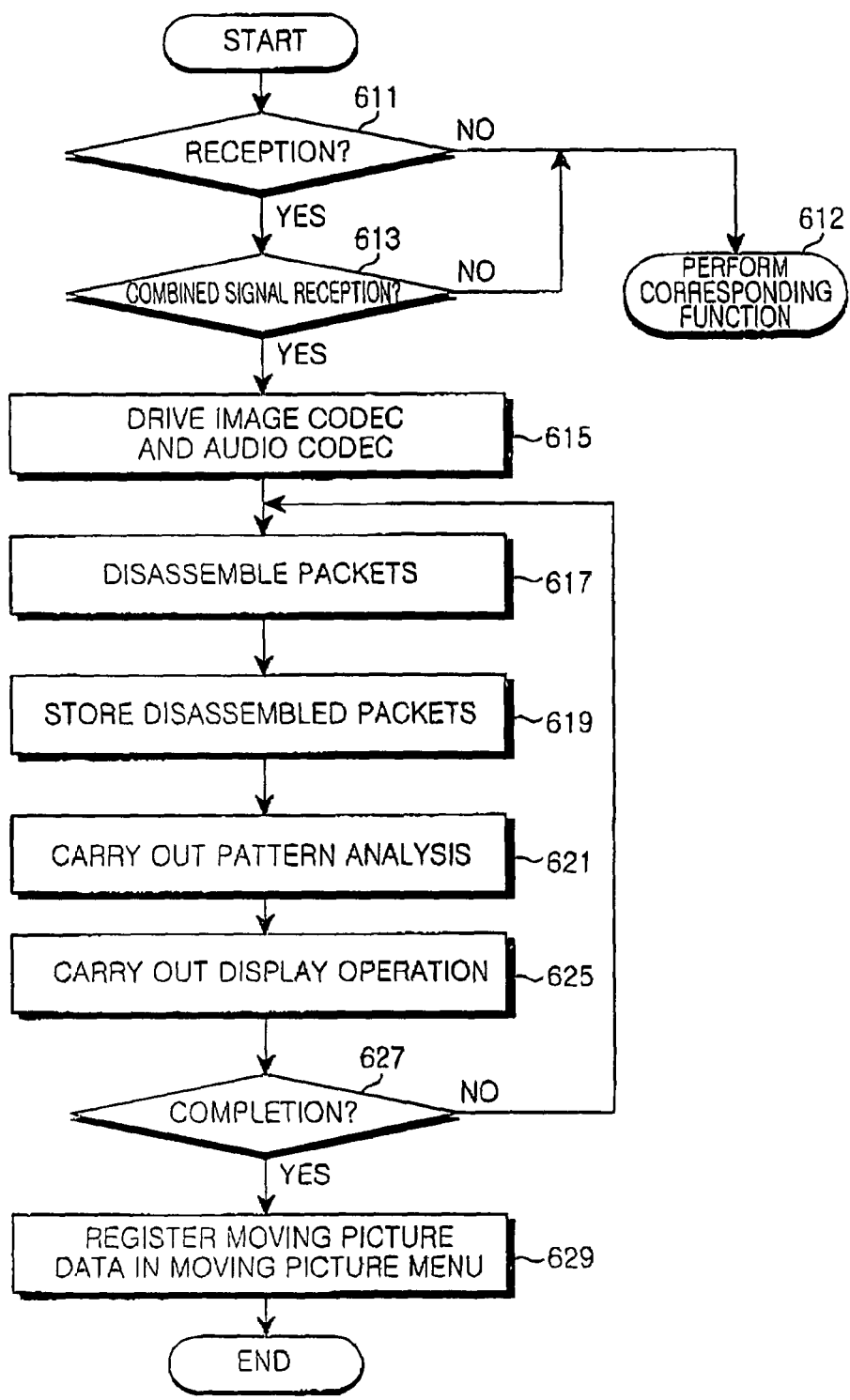
FIG. 32 is a flow chart illustrating a procedure for disassembling received packets based upon a combined signal and storing the disassembled packets in accordance with another embodiment of the present invention.
Figure 33:
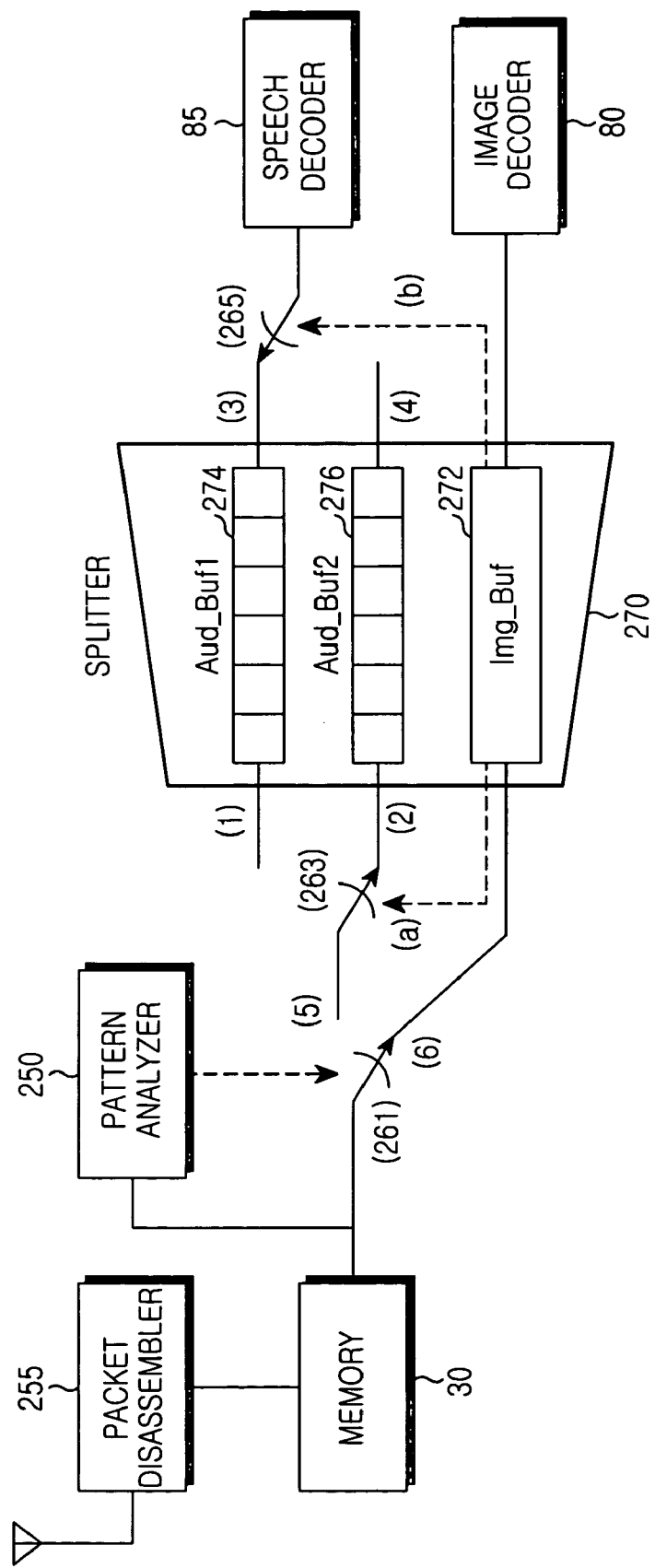
FIG. 33 is a block diagram illustrating components for disassembling the received packets based upon the combined signal and storing and reproducing the disassembled packets in the form of the combined signal in accordance with another embodiment of the present invention.
Figure 34A:
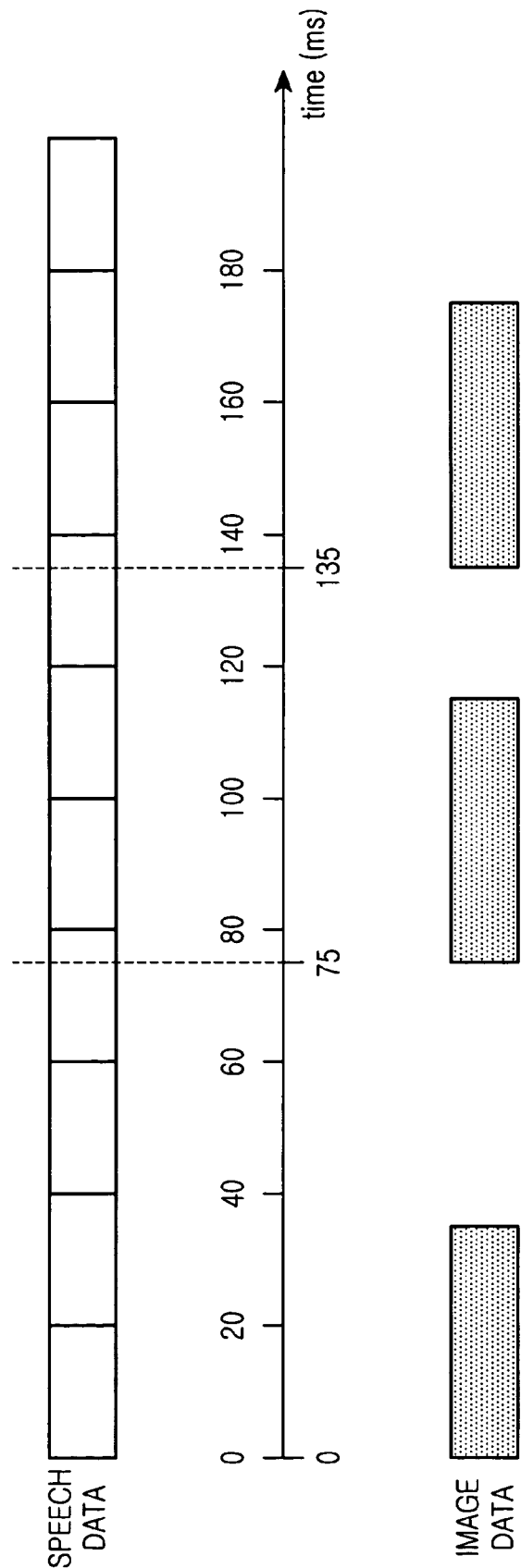
FIGS. 34A, 34B and 34C are block diagrams illustrating formats for disassembling packets based upon a combined signal and generating the combined signal.
Figure 34B:
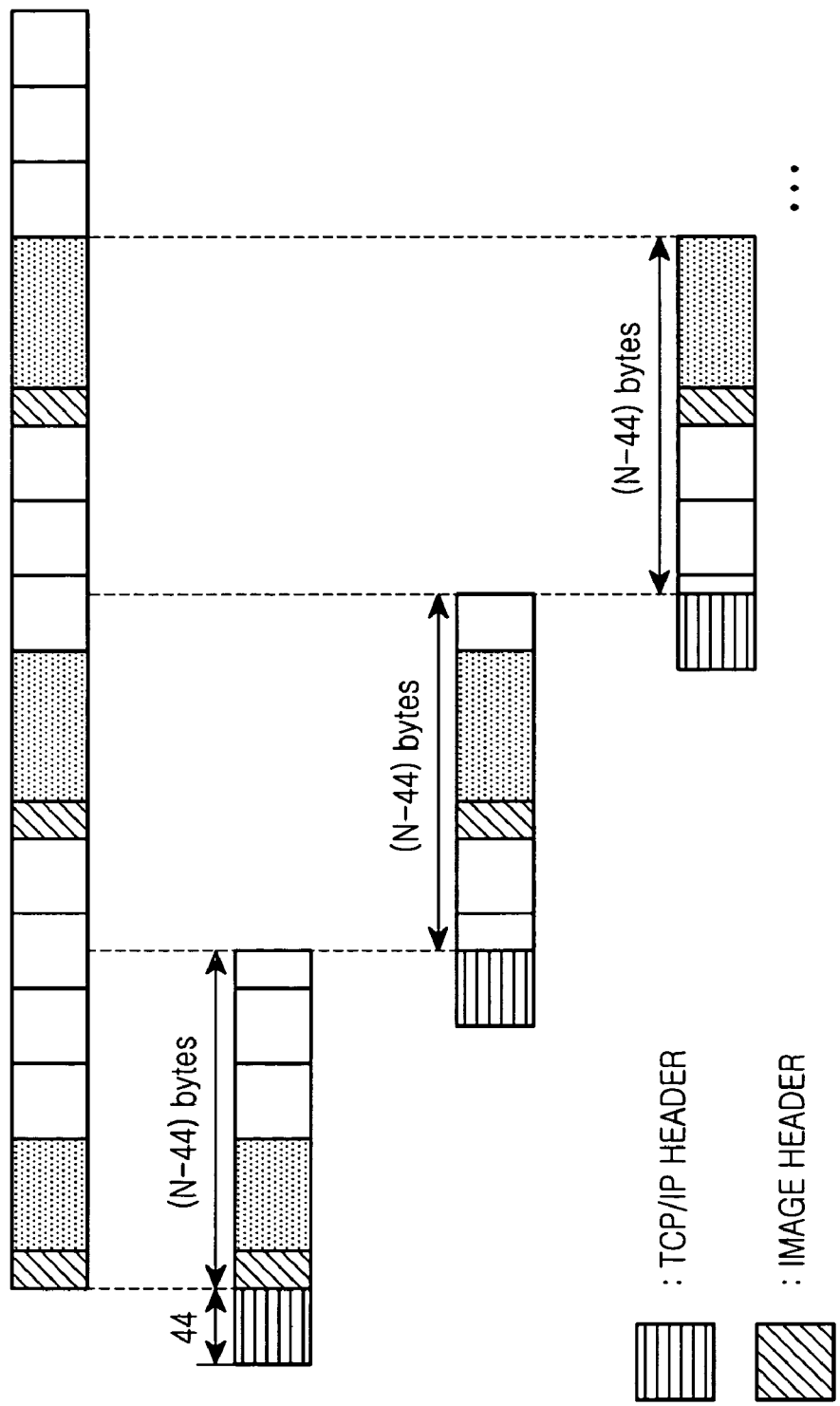
Figure 34C:
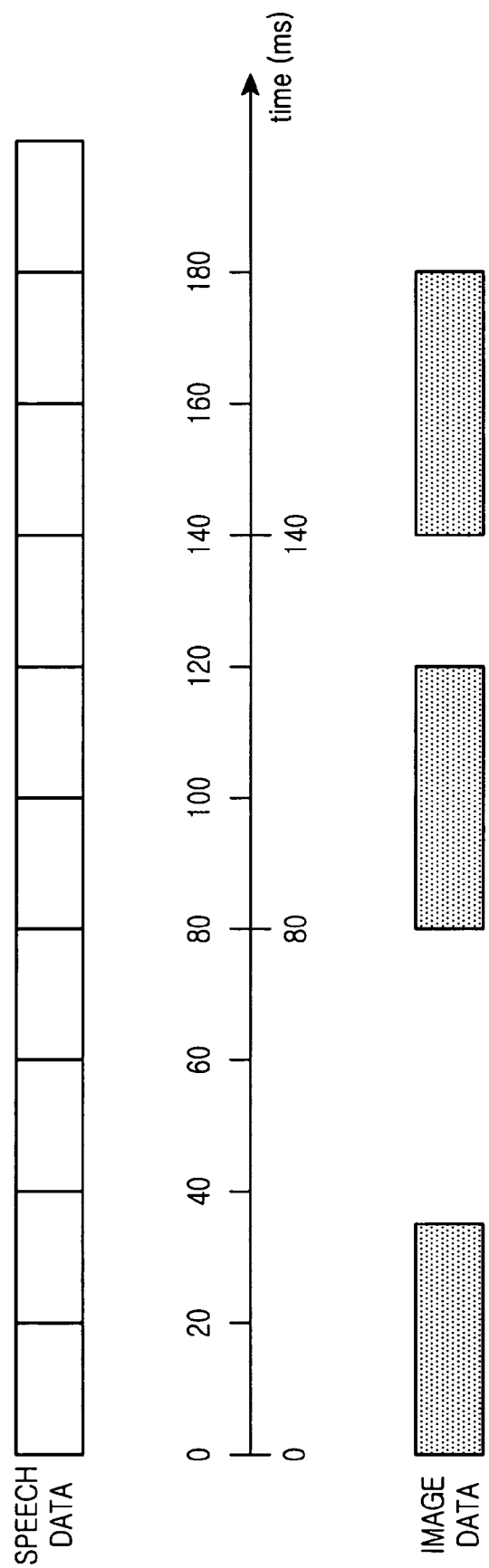

FIG. 32 is a flow chart illustrating a procedure for receiving a combined signal from a base station, storing the received combined signal in the memory 30, and reproducing the stored combined signal. FIG. 33 is a block diagram illustrating components for receiving, storing and reproducing a combined signal in the mobile phone. As the components shown in FIG. 33, a packet disassembler 255, a packet analyzer 250, switches 261, 263 and 265 and a buffer unit 270 can be constituted in the controller 10. FIGS. 34A to 34C are views explaining a procedure for disassembling packet data and generating a combined signal.

When data is received from the base station as shown in FIG. 32, the controller 10 detects the received data at step 611 and determines whether the received data is a combined signal at step 613. If the input instructions are not detected, other corresponding functions are performed at step 612. If the received data is a combined signal as a result of the determination at the above step 613, the controller 10 drives the image codec 80 and the audio codec 85. Then, the controller 10 disassembles packet data and enables the memory 30 to store the disassembled packet data. Then, the controller 10 analyzes a pattern of the combined signal and reproduces the combined signal.

Since the received combined signal is received in a packet format, the controller 10 disassembles a packet at step 617. After the packets are disassembled at the above step 617, the disassembled packets are stored in the memory 30 at step 619.

Then, the controller 10 analyzes headers of the combined signal stored in the memory 30 and separates JPEG image data and audio data and/or text data at step 621. Upon detecting the JPEG image data, the controller 10 transmits the detected JPEG image data to the image codec 80. Upon detecting the audio data, the controller 10 transmits the detected audio data to the audio codec 85. Upon detecting the text data, the controller 10 transmits the detected text data to the display unit 60. The JPEG image data is processed through the display screen generator of the image processor 50 and is displayed on the display unit 60. Further, the audio processor 25 reproduces the audio data and a speaker outputs the reproduced audio data. Furthermore, the text data is displayed on the display unit 60. While the above steps 617 to 627 are repeated, the controller 10 disassembles subsequently received packet data and reproduces a combined signal stored in units of frames by the memory 30. When the combined signal is completely received, the controller 10 detects the completely received combined signals at the above step 627. The controller 10 enables the display unit 60 to display a moving picture menu necessary for inputting names of the received moving picture signal at step 629. A moving picture menu is registered according to input moving picture information and then a moving picture reception mode is terminated.

FIG. 33 is a block diagram illustrating components for receiving, storing and reproducing a combined signal in which moving picture and audio signals are combined in the mobile phone. As the components shown in FIG. 33, a packet disassembler 255, a header analyzer 250, switches 261, 263 and 265 and a buffer unit 270 can be constituted in the controller 10.

The components shown in FIG. 33 will be described. Packet data is processed through the RF module 23 and the data processor 20. The packet disassembler 255 receives the processed packet data. At this time, received packets have formats shown in FIGS. 27A to 27E. The packet disassembler 255 removes a TCP/IP header from a received packet. The packet disassembler 255 can sequentially process the packets according to sequence numbers of the received packets. An audio packet or a JPEG image packet can be discriminated by an A/V bit. Thus, the packet disassembler 255 can disassemble the received packets according to a format shown in FIG. 10B. The received data is stored in the memory 30. A result of the above-described operation is shown in FIGS. 34A to 34C.

The memory 30 stores a combined signal shown in FIG. 10B that is output from the packet disassembler 255. The header analyzer 250 analyzes the combined signal stored in the memory 30. The header analyzer 250 analyzes headers of a combined signal accessed in the memory 30 and generates a switch control signal for separating the combined signal into JPEG image and audio signals. A common terminal is connected between the switch 261 and the memory 30. The first output terminal of the switch 261 is connected to a common terminal for the switch 263 switching the audio signals, and the second output terminal of the switch 261 is connected to an image buffer 272. The image buffer (Img_Buf) 272 provided in the buffer unit 270 buffers JPEG image data output from the switch 261. The first and second audio buffers (Aud_Buf) 274 and 276 buffer coded audio data. The common terminal for the switch 263 is connected to the first output terminal of the switch 261. The first output terminal of the switch 263 is connected to an input terminal of the first audio buffer 274, and the second output terminal of the switch 263 is connected to an input terminal of the second audio buffer 276. Furthermore, the first input terminal of the switch or speech output switch 265 is connected to an output terminal of the first audio buffer 274 and the second input terminal of the switch 265 is connected to an output terminal of the second audio buffer 276. A common terminal is connected between the switch 265 and the audio codec or speech decoder 85. The switches 263 and 265 are controlled by an output of the image buffer 272. Thus, the buffer unit 270 performs a splitter function for splitting an audio signal and a JPEG image signal from the combined signal. The audio codec or speech decoder 85 decodes coded audio signals output from the switch 265 and outputs the decoded audio signals. The image codec (or JPEG decoder) 80 decodes JPEG image data output from the image buffer 272 and outputs the decoded image data.

Referring to FIG. 33, the packet disassembler 255 removes TCP/IP headers from the received packets. Audio data and image data are split in FIG. 33, and are decoded by the audio codec 85 and the image codec 80 shown in FIG. 33. The packet disassembler 255 disassembles the received packets and the disassembled packets are stored in the memory 30. Then, the header analyzer 250 analyzes the disassembled packets. The operations of other components shown in FIG. 33 are the same as those of other components shown in FIG. 20.

In an embodiment of the present invention, a combined signal can be generated after audio data and consecutive image data are combined. The generated combined signal is separated into the image data and the audio data so that the image and audio data can be simultaneously reproduced. The generated combined signal can be transmitted to another terminal or server through a base station in the form of transmission packets. The packets based upon the combined signal are received from another terminal or server and the received packets can be disassembled and reproduced.

Figure 35:
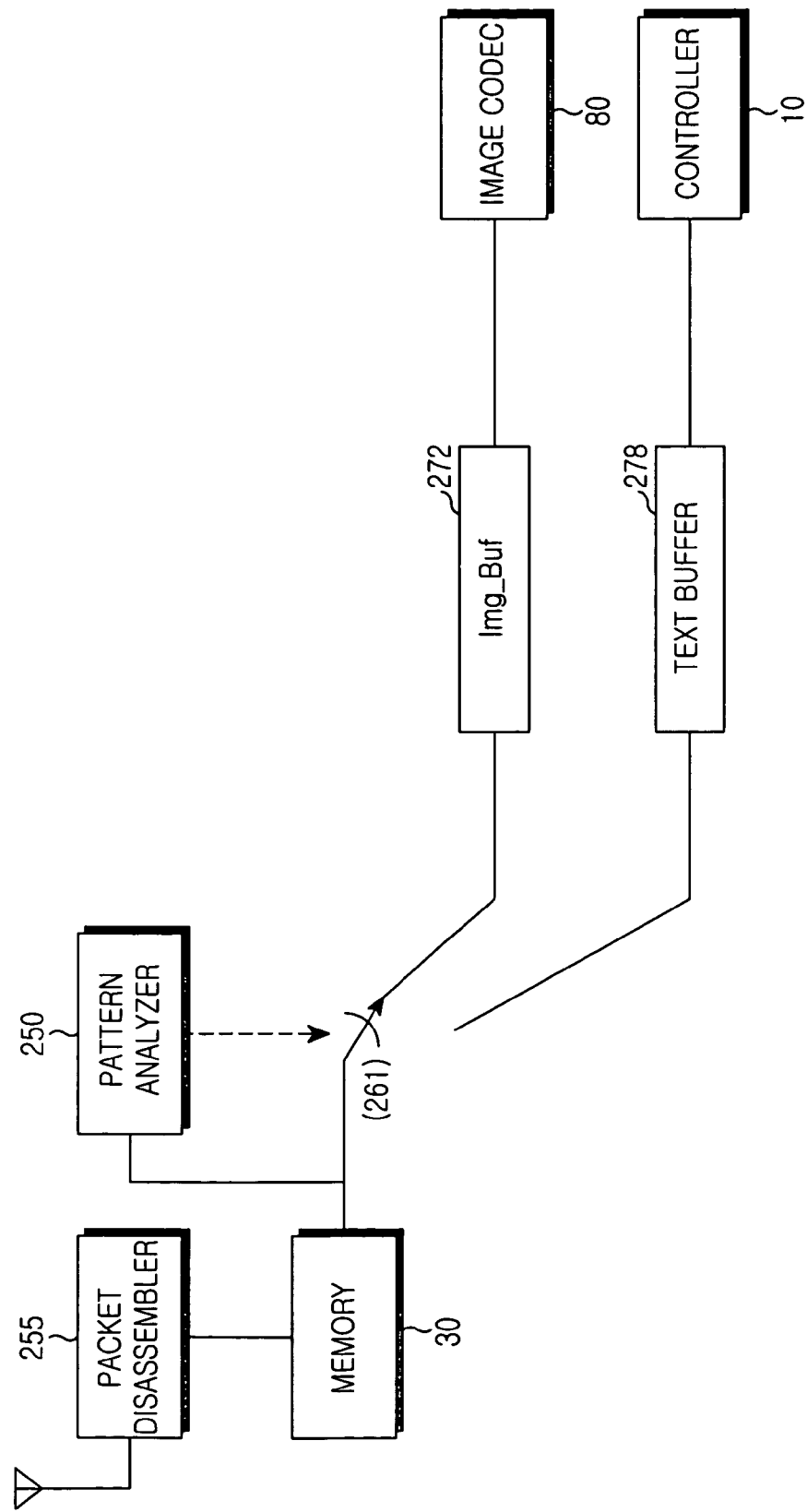
FIG. 35 is a block diagram illustrating components for receiving and disassembling packets based upon a combined signal in which text and moving picture signals are combined in accordance with another embodiment of the present invention.

FIG. 35 is a block diagram illustrating components for receiving, storing and reproducing a combined signal in which moving picture and text signals are combined, in the mobile phone. As the components shown in FIG. 35, a packet disassembler 255, a header analyzer 250, switches 261, 263 and 265 and a buffer unit 270 can be constituted in the controller 10.

The components shown in FIG. 33 will be described. Packet data is processed through the RF module 23 and the data processor 20. The packet disassembler 255 receives the processed packet data. At this time, received packets have formats shown in FIG. 29B. The packet disassembler 255 removes a TCP/IP header from a received packet. The packet disassembler 255 can sequentially process the packets according to sequence numbers of the received packets. A text packet or a JPEG image packet can be discriminated by a V/T bit. Thus, the packet disassembler 255 can disassemble the received packets and the received data is stored in the memory 30. The disassembled packets are stored in the memory 30 in a format shown in FIG. 29A.

The header analyzer 250 analyzes the combined signals stored in the memory 30. The header analyzer 250 analyzes headers of a combined signal accessed in the memory 30 and generates a switch control signal for separating the combined signal into JPEG image and text signals. A common terminal is connected between the switch 261 and the memory 30. The first output terminal of the switch 261 is connected to an image buffer 272 and the second output terminal of the switch 261 is connected to a text buffer 278. The text buffer 278 provided in the buffer unit 270 buffers a text signal output from the switch 261. The image buffer (Img_Buf) 272 provided in the buffer unit 270 decodes JPEG image data output from the image buffer 272 and outputs the decoded JPEG image data.

The packet disassembler 255 shown in FIG. 35 removes TCP/IP headers from the received packets. Audio data and image data are split in FIG. 36, and are decoded by the audio codec 85 and the image codec 80 shown in FIG. 36. The packet disassembler 255 disassembles the received packets and the disassembled packets are stored in the memory 30. Then, the header analyzer 250 analyzes the disassembled packets. The operations of other components shown in FIG. 36 are the same as those of other components shown in FIG. 22.

Figure 36:
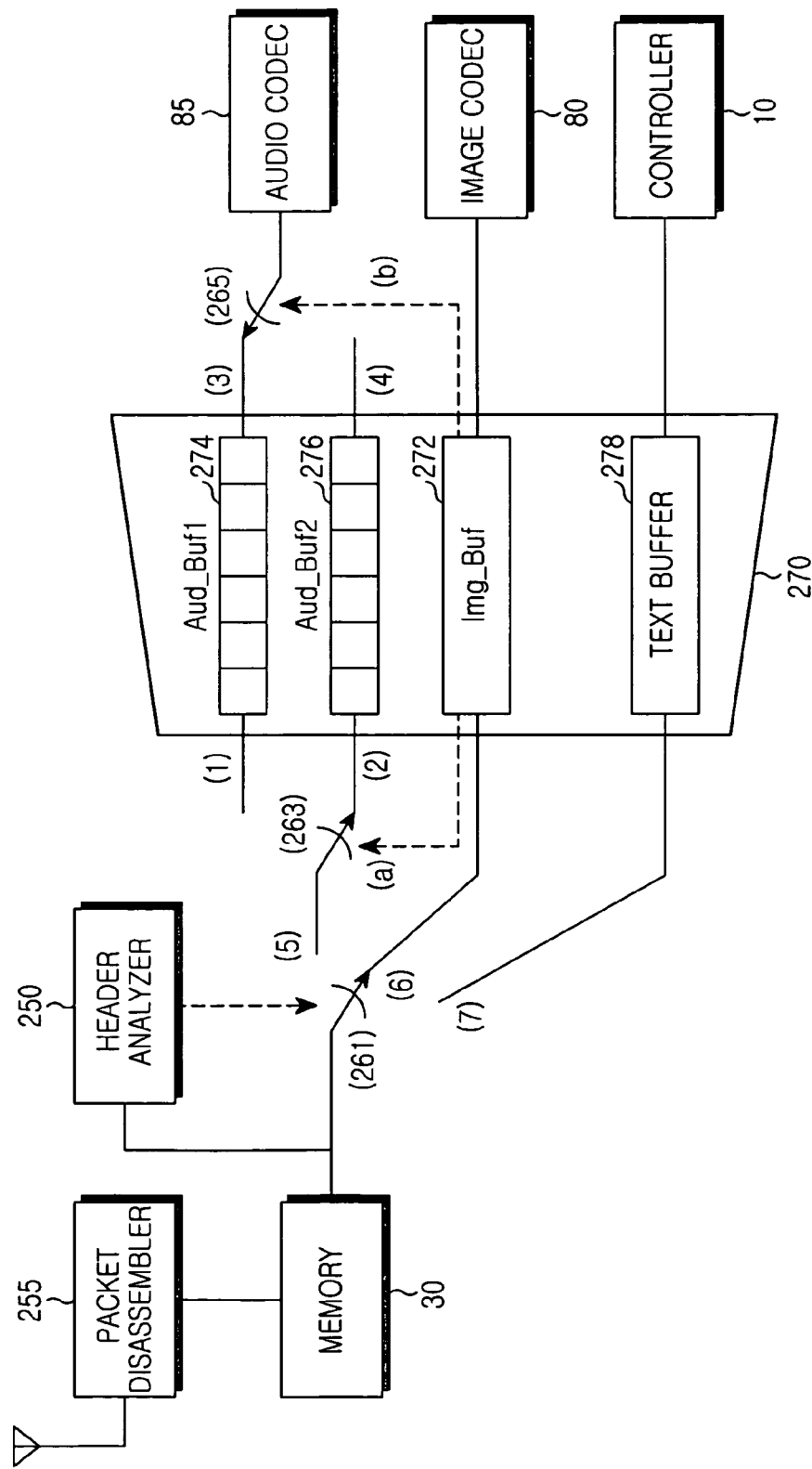
FIG. 36 is a block diagram illustrating components for receiving and disassembling packets based upon a combined signal in which text, audio and moving picture signals are combined in accordance with another embodiment of the present invention.

FIG. 36 is a block diagram illustrating components for receiving, storing and reproducing a combined signal in which moving picture, audio and text signals are combined, in the mobile phone. As the components shown in FIG. 36, a packet disassembler 255, a header analyzer 250, switches 261, 263 and 265 and a buffer unit 270 can be constituted in the controller 10. It is assumed that the combined signal shown in FIG. 36 is a signal in which text, JPEG image and audio signals are combined.

The components shown in FIG. 36 will be described. Packet data is processed through the RF module 23 and the data processor 20. The packet disassembler 255 receives the processed packet data. At this time, received packets are based upon a format shown in FIG. 31B. The packet disassembler 255 removes a TCP/IP header from a received packet. The packet disassembler 255 can sequentially process the packets according to sequence numbers of the received packets. A text packet, an audio packet or a JPEG image packet can be discriminated by A/V/T bits. Thus, the packet disassembler 255 can disassemble the received packets and the received data is stored in the memory 30. The disassembled packets are stored in the memory 30 in a format shown in FIG. 31A.

The header analyzer 250 analyzes the combined signals stored in the memory 30. The header analyzer 250 analyzes headers of a combined signal accessed in the memory 30 and generates a switch control signal for separating the combined signal into a text signal, JPEG image signals and audio signals. A common terminal is connected between the switch 261 and the memory 30. The first output terminal of the switch 261 is connected to a common terminal for the switch 263 switching the audio signal, the second output terminal of the switch 261 is connected to an image buffer 272, and the third output terminal of the switch 261 is connected to a text buffer 278. The text buffer 278 provided in the buffer unit 270 buffers a text signal output from the switch 261. The image buffer (Img_Buf) 272 provided in the buffer unit 270 buffers JPEG image data output from the switch 261. The first and second audio buffers (Aud_Buf) 274 and 276 buffer coded audio data. The common terminal for the switch 263 is connected to the first output terminal of the switch 261. The first output terminal of the switch 263 is connected to an input terminal of the first audio buffer 274, and the second output terminal of the switch 263 is connected to an input terminal of the second audio buffer 276. Furthermore, the first input terminal of the switch 265 is connected to an output terminal of the first audio buffer 274 and the second input terminal of the switch 265 is connected to an output terminal of the second audio buffer 276. A common terminal is connected between the switch 265 and the audio codec 85. The switches 263 and 265 are controlled by an output of the image buffer 272. The audio codec 85 decodes a coded audio signal output from the switch 265 and outputs the decoded audio signal. The image codes 80 decodes JPEG image data output from the image buffer 272 and outputs the decoded image data.

Referring to FIG. 36, the packet disassembler 255 removes TCP/IP headers from the received packets. Audio data and image data split by a splitter shown in FIG. 36 are decoded by the audio codec 85 and the image codec 80 shown in FIG. 36.

The packet disassembler 255 disassembles the received packets and the disassembled packets are stored in the memory 30. Then, the header analyzer 250 analyzes the disassembled packets. The operations of other components shown in FIG. 36 are the same as those of other components shown in FIG. 24.

Figure 37:
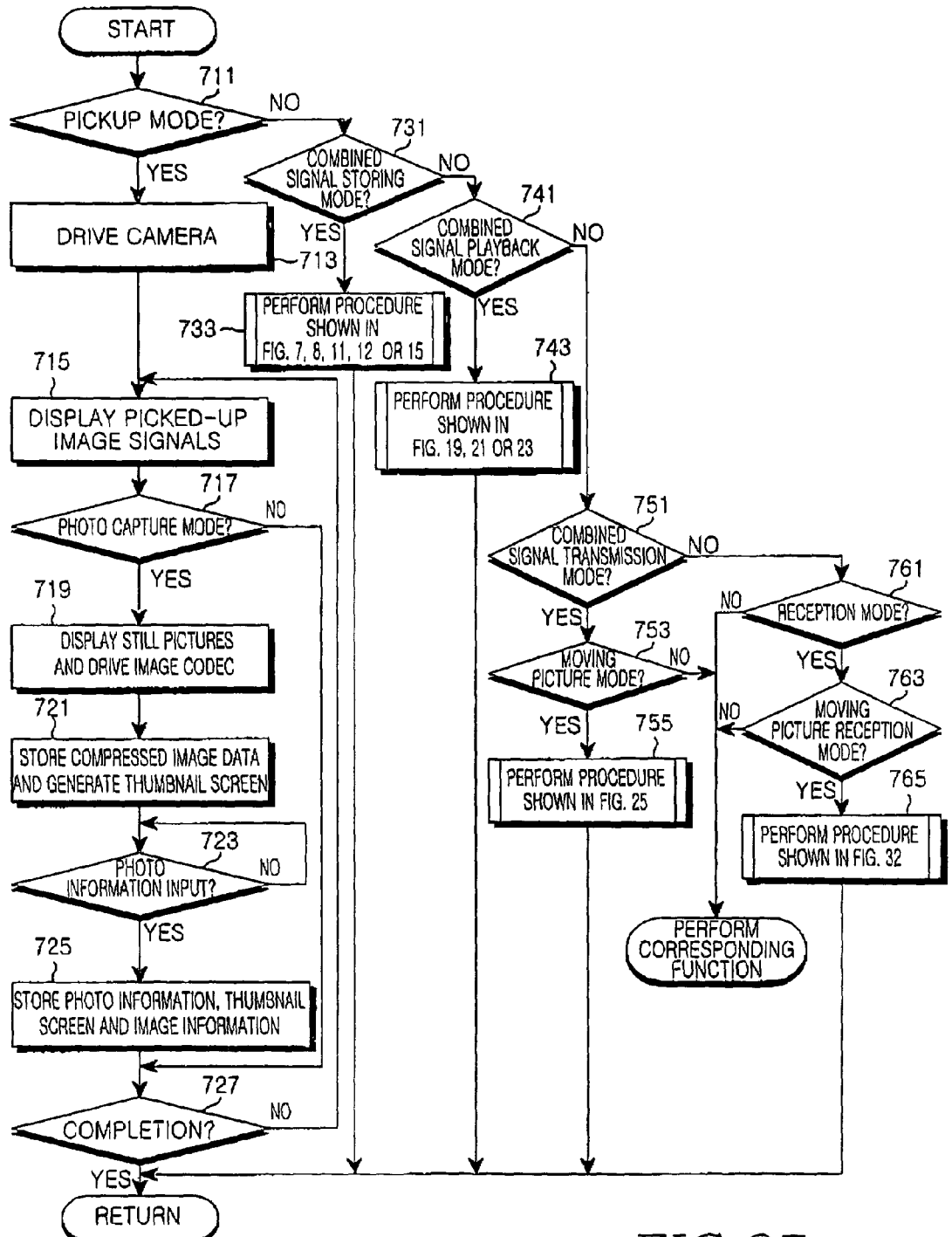
FIG. 37 is a flow chart illustrating a procedure for generating, reproducing, transmitting and receiving a combined signal in accordance with another embodiment of the present invention.

FIG. 37 is a flow chart illustrating another procedure for performing the above-described operation in the mobile phone equipped with a camera and an image codec for coding still pictures.

Referring to FIG. 37, the user generates key data for driving the camera module 40 through the key input unit 27 when the camera module 40 picks up images and the display unit 60 displays the captured images. At this time, a key for driving the capture mode is positioned on a navigation key of the key input unit 27 or can be displayed in the form of a menu. When the capture mode is selected, the controller 10 detects the selected capture mode at step 711, and controls the camera module 40 and the image processor 50 to activate a path capable of receiving captured image signals at step 713. In the capture mode, the camera module 46 generates the captured image signals and synchronous signals HREF and VREF. The synchronous signal HREF can be a horizontal synchronous signal and the synchronous signal VREF can be a vertical synchronous signal, that is, a frame synchronous signal.

The vertical synchronous signal VREF indicates a frame start time point. When the vertical synchronous signal VREF is generated, the selector 319 selects an output of the LCD interface 317. The screen display generator of the image processor 50 processes image data output from the camera module 40 in units of lines (or frames) and the processed image data is sent to the display unit 60. The scaler 315 scales data of a CIF image size output from the camera module 40 on the basis of a screen size of the display unit 60. The converter 315 converts image signals based upon the YUV format into the RGB format, and outputs the image signals based upon the RGB format. While the LCD interface 317 buffers the image signals received in the units of lines, the image signals are output to the display unit 60 on the basis of a display timing of the display unit 60. An operation for displaying the image signals from the camera module 40 is repeated in the units of lines until the image signals of one frame are completely transmitted.

While a preview screen is displayed at step 715, the image signals captured by the camera module 40 are displayed in the form of moving pictures and user data output from the controller 10 is displayed. In a state where the preview screen is displayed on the display unit 60, the user confirms the displayed moving pictures and can input a photo capture command for acquiring a still picture at a specific time. The photo capture command can be implemented using a specific function key arranged on the key input unit 27 or can be selected using a menu key displayed on the display unit 60. When the photo capture command is generated, the controller 10 detects the generated photo capture command at step 717. The controller 10 drives the image codec 80 of the image processor 50 so that image data of a selected frame is coded into JPEG image data. The JPEG coded image data is displayed as a still picture on the display unit 60. At step 721, the JPEG coded image data from the image codec 80 is stored in the memory 30, and a thumbnail generator generates a thumbnail screen from the JPEG coded image data. Then, the controller 10 enables the display unit 60 to display a menu for guiding an input of photo information. When the photo information is input, the controller 10 detects the input photo information at step 723 and stores and registers the JPEG image data along with the thumbnail screen and a photo name at step 725.

When the photo capture mode is terminated or a request of the capture mode termination is generated in a preview screen display state, the controller 10 detects the request and terminates the capture mode at step 727.

In the capture mode, a preview screen is displayed or a still picture is captured and stored.

When the user requests that a combined-signal storing mode be carried out, the controller 10 detects the request and performs the combined-signal storing mode at step 731. When the combined-signal storing mode is selected, the controller 10 can guide an operating mode for combining moving picture signals with audio signals, an operating mode for combining moving picture signals with a text signal and an operating mode for combining moving picture signals with audio and text signals. When the user selects a corresponding combined-signal storing mode, the controller 10 enables a JPEG coding operation for image data captured by the camera module 40 to be carried out in units of frames while the processes shown in FIG. 7 or 8, FIG. 11 or 12 and FIG. 15 or 16 are performed at step 733. The JPEG frame image is a still picture. However, the image codec 80 consecutively generates JPEG image frames in the form of moving pictures. A combined signal in which the JPEG image data generated in the form of moving pictures is combined with audio data and/or text data relating to the image data is generated and the generated combined signal is stored in the memory 30.

Furthermore, when the user selects a combined signal stored in the memory 30 and requests that the selected combined signal be reproduced, the controller 10 detects the request at step 741 and enables the selected combined signal to be reproduced at step 743. At this time, if the combined signal is a signal in which moving picture signals are combined with audio signals, the controller 10 enables the combined signal to be reproduced while the procedure shown in FIG. 19 is performed at the above step 743. On the other hand, if the combined signal is a signal in which moving picture signals are combined with a text signal, the controller 10 enables the combined signal to be reproduced while the procedure shown in FIG. 21 is performed at the above step 743. On the other hand, if the combined signal is a signal in which moving picture signals are combined with audio and text signals, the controller 10 enables the combined signal to be reproduced while the procedure shown in FIG. 23 is performed at the above step 743. When the combined signal is reproduced, JPEG image, audio and text signals are separated from the combined signal and are reproduced through corresponding decoders.

The combined signals stored in the memory 30 can be transmitted to another terminal or server. In a transmission method, the combined signals can be transmitted immediately after the combined signals are generated. Alternatively, the combined signals are stored and can be selectively transmitted if necessary. When the user requests that moving picture signals be transmitted, the controller 10 detects the request at steps 751 and 753. The moving picture signals are transmitted while the procedure shown in FIG. 25 is performed at step 755.

Furthermore, where the mobile phone equipped with the image codec and the audio codec is used, it can receive and reproduce the combined signal from another terminal or server. Thus, when the combined signal is received, the controller 10 detects the received combined signal at steps 761 and 763. The combined signal is received and reproduced while the procedure shown in FIG. 32 is performed at step 765.

As apparent from an above description, the present invention enables a mobile terminal to consecutively code image signals captured by a camera and generate moving picture signals. Furthermore, the mobile terminal can combine the moving picture signals with audio signals and/or a text signal and generate at least one combined signal. The combined signal is reproduced or transmitted to another terminal or server. A received combined signal can be stored and reproduced. Thus, the mobile terminal allows the user to generate and edit moving picture mail. The generated moving picture mail is transmitted or received moving picture mail can be reproduced.

Although the embodiments of the present invention have been disclosed for illustrative purposes, those skilled in the art will appreciate that various modifications, additions and substitutions are possible, without departing from the scope of the invention.

What is claimed is:

1. A method for generating a combined signal in a mobile terminal equipped with a camera and an image codec, comprising the steps of:
   (a) coding each of one or more image signals captured by the camera into still pictures based upon a frame size via the image codec, inserting an image header containing image pattern information and frame size information into each of the coded image signals, and generating moving picture signals based on the coded image signals;
   (b) after generating the moving picture signals, generating at least one text signal;
   (c) combining the moving picture signals with a text signal; and
   (d) storing a combined signal representative of a result of the combining in a memory, wherein the step (b) comprises the steps of:
   (b-1) deciding maximum length of displayable text according to a playback time required for reproducing the obtained moving picture signals and displaying the reproduced moving picture signals;
   (b-2) generating a text header containing information indicating a size of the received text signal and a text pattern signal; and
   (b-3) inserting the text header into the text signal and generating the text signal having the inserted text header.

2. The method as set forth in claim 1, wherein the step (b-1) comprises the steps of:
   allowing a text signal generator to determine the playback time required for reproducing the obtained moving picture signals; and
   deciding the maximum length of displayable text according to the playback time and a display type designated by a user, and
   wherein the step (b-2) comprises the step of:
   generating the text header containing the information indicating the size of the received text signal and information of the display type.

3. The method as set forth in claim 1, wherein the step (a) comprises the steps of:
   (a-1) compressing and coding the image signals based upon the frame size;
   (a-2) generating the image header containing information indicating a size of each compressed and coded image signal and an image pattern signal;
   (a-3) inserting the image header into each compressed and coded image signal and generating a still picture signal based upon the frame size; and
   (a-4) repeating an operation for generating the still picture signal and generating the moving picture signals.

4. The method as set forth in claim 3, wherein the compressed and coded image signals are Joint Photographic Expert Group (JPEG) coded image signals.

5. The method as set forth in claim 1, wherein the step (d) comprises the step of:
   setting a combined signal menu to register a name of the combined signal and a place and time of image capture associated with the combined signal.

* * * * *